US012206639B2

(12) United States Patent
Ma

(10) Patent No.: US 12,206,639 B2
(45) Date of Patent: Jan. 21, 2025

(54) CONTENT PUSHING METHOD, APPARATUS, STORAGE MEDIUM, AND CHIP SYSTEM

(71) Applicant: Huawei Technologies Co., Ltd., Shenzhen (CN)

(72) Inventor: Zhiwei Ma, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/304,941

(22) Filed: Apr. 21, 2023

(65) Prior Publication Data
US 2023/0262017 A1    Aug. 17, 2023

Related U.S. Application Data

(63) Continuation of application No. PCT/CN2021/116865, filed on Sep. 7, 2021.

(30) Foreign Application Priority Data

Oct. 22, 2020 (CN) .......................... 202011142477.5
Dec. 17, 2020 (CN) .......................... 202011502425.4

(51) Int. Cl.
*H04L 51/222*  (2022.01)
*H04L 51/02*  (2022.01)
*H04L 51/216*  (2022.01)
*H04L 51/224*  (2022.01)

(52) U.S. Cl.
CPC ............ *H04L 51/222* (2022.05); *H04L 51/02* (2013.01); *H04L 51/216* (2022.05); *H04L 51/224* (2022.05)

(58) Field of Classification Search
CPC ...... H04L 51/222; H04L 51/02; H04L 51/216; H04L 51/224
See application file for complete search history.

(56) References Cited

U.S. PATENT DOCUMENTS

| 8,490,003 | B2 | 7/2013 | Khadilkar et al. |
| 11,128,715 | B1* | 9/2021 | Al Majid .............. H04L 67/306 |
| 2014/0130076 | A1 | 5/2014 | Moore et al. |
| 2014/0243023 | A1 | 8/2014 | Zhou |
| 2017/0339081 | A1* | 11/2017 | Beust .................. H04L 65/1069 |
| 2018/0176297 | A1* | 6/2018 | DiVincenzo ........ H04L 67/1014 |
| 2019/0171845 | A1 | 6/2019 | Dotan-Cohen et al. |
| 2019/0222540 | A1* | 7/2019 | Relangi ............. H04M 3/42042 |

(Continued)

FOREIGN PATENT DOCUMENTS

| CN | 1996846 A | 7/2007 |
| CN | 103369462 A | 10/2013 |

(Continued)

*Primary Examiner* — Chirag R Patel
(74) *Attorney, Agent, or Firm* — Conley Rose, P.C.

(57) ABSTRACT

A content pushing method includes that a terminal device obtains first information, where the first information includes location information of the terminal device. When the first information meets a preset first condition, the terminal device displays second information. The second information includes to-be-pushed content associated with the first information or a link of the to-be-pushed content. The first condition includes that a location corresponding to the location information of the terminal device is in a first area, and a type of the first area is one of preset area types.

17 Claims, 33 Drawing Sheets

(56) References Cited

U.S. PATENT DOCUMENTS

| | | | | |
|---|---|---|---|---|
| 2019/0325863 A1* | 10/2019 | Martin | ................... | G10L 15/16 |
| 2019/0342223 A1* | 11/2019 | Dhanabalan | ............ | H04L 67/10 |
| 2020/0366750 A1* | 11/2020 | Gelfenbeyn | ............ | H04L 67/55 |
| 2021/0406291 A1* | 12/2021 | Mazars | ............... | G06F 16/3329 |
| 2022/0021742 A1 | 1/2022 | Zhang | | |

FOREIGN PATENT DOCUMENTS

| | | | |
|---|---|---|---|
| CN | 103379013 | A | 10/2013 |
| CN | 104199936 | A | 12/2014 |
| CN | 104346471 | A | 2/2015 |
| CN | 104639664 | A | 5/2015 |
| CN | 105991674 | A | 10/2016 |
| CN | 108076145 | A | 5/2018 |
| CN | 108322611 | A | 7/2018 |
| CN | 109345680 | A | 2/2019 |
| CN | 109492152 | A | 3/2019 |
| TW | 201939397 | A | 10/2019 |
| WO | 2017175950 | A1 | 10/2017 |
| WO | 2020207413 | A1 | 10/2020 |

\* cited by examiner

CONTENT PUSHING METHOD, APPARATUS, STORAGE MEDIUM, AND CHIP SYSTEM

CROSS-REFERENCE TO RELATED APPLICATIONS

This is a continuation of International Patent Application No. PCT/CN2021/116865 filed on Sep. 7, 2021, which claims priority to Chinese Patent Application No. 202011142477.5 filed on Oct. 22, 2020 and Chinese Patent Application No. 202011502425.4 filed on Dec. 17, 2020. The disclosures of the aforementioned applications are hereby incorporated by reference in their entireties.

TECHNICAL FIELD

This disclosure relates to the communication field, and in particular, to a content pushing method, an apparatus, a storage medium, and a chip system.

BACKGROUND

Human-computer dialogs have been widely applied to people's daily life, such as a chatbot, a customer service robot, a smart speaker, and a voice assistant. Human-computer dialogs have a wide range of application scenarios, and may be directly used in specific service processing, for example, a hotel booking service, a flight booking service, and a train ticket booking service.

In the conventional technology, a user needs to wake up a chatbot in a mobile phone in a specific manner, and a system provides a dedicated fixed interface for human-computer dialogs. When the user wakes up the chatbot, the terminal device may open the fixed interface, and the user may talk with the chatbot on the interface.

Specific steps of an existing human-computer interaction scenario are as follows. At a first step, the user wakes up the chatbot in the mobile phone in a preset manner. At a second step, the terminal device opens the fixed interface for chatting with the chatbot. At a third step, the user enters a command, for example, a voice command or a text command.

The command includes an intent and content of a slot. The intent corresponds to a function, and the slot corresponds to a parameter required for implementing the function. For example, if the user enters a command "query the weather condition in Jiading District of Shanghai", it may be recognized, according to the command, that an intent of the user is "querying the weather condition", and a slot corresponding to the intent includes a place. It may be determined, according to the command, that content of the slot "place" is "Shanghai Jiading". In other words, the "place" is the slot corresponding to the intent "querying the weather condition", and the slot may be referred to as an entity. At a fourth step, the chatbot parses the command entered by the user, to understand the intent of the command of the user. That is, the chatbot needs to understand the function required by the user. Further, the chatbot needs to recognize the content of the slot. The recognition of the content of the slot is word extraction and matching. At a fifth step, response information is generated based on the intent of the command entered by the user.

It can be learned from the foregoing content that, in the human-computer interaction scenario, the user needs to perform a large quantity of operations, for example, the user needs to enter a command.

SUMMARY

This disclosure provides a content pushing method, an apparatus, a storage medium, and a chip system, to reduce a quantity of interactions between a user and a terminal device.

According to a first aspect, in this disclosure, a terminal device obtains first information, where the first information includes location information of the terminal device. When the first information meets a preset first condition, the terminal device displays second information. The second information includes to-be-pushed content associated with the first information or a link of the to-be-pushed content. The first condition may include: A location corresponding to the location information of the terminal device is in a first area, and a type of the first area is one of preset area types. Because the second information may be pushed based on the location information of the terminal device, a query step in a process in which a user actively queries the second information may be reduced. In this way, a quantity of times of entering a command by the user can be reduced, and a quantity of interactions between the user and the terminal device can be reduced.

In a possible implementation, the terminal device may predict an intent of the user based on the first information. In this embodiment of this disclosure, an intent of the user that is predicted actively based on information is referred to as a predicted intent. Further, the terminal device may send, to a first server, a first request used to request the first server to execute a predicted intent, and receive a first response returned by the first server. The first response includes the second information obtained after the first server executes the predicted intent. Then, a first message is sent to an interface module of a MeeTime application of the terminal device, so that the terminal device displays the second information on a chat interface of the MeeTime application. The predicted intent of the user may be determined based on the first information of the terminal device, and a result of executing the predicted intent may be displayed. In this way, a quantity of times of entering a command by the user can be reduced, and a quantity of interactions between the user and the terminal device can be reduced.

In a possible implementation, when the type of the first area is a scenic spot, the second information includes a scenic spot guide of the first area. When it is determined that a location of the terminal device belongs to the scenic spot, the scenic spot guide is pushed to the user actively. For example, the scenic spot guide may be pushed to the user by using the MeeTime application. In this way, a step of querying the scenic spot guide by the user is reduced, and information related to a current situation of the user may be directly obtained.

In a possible implementation, the second information is from the first server. In a possible implementation, the terminal device sends the first request to the first server, where the first request is used to request to obtain the second information. The terminal device receives the first response, where the first response includes the second information. For example, if the first request is used to request to query the scenic spot guide of the scenic spot in which the terminal device is currently located, the server returns the scenic spot guide of the scenic spot as the second information to the terminal device. In another possible implementation, querying the scenic spot guide may be understood as predicting an intent. To be specific, the terminal device predicts, based on the current location of the terminal device, that the user wants to query the scenic spot guide, and then the terminal device sends the first request to the server. In a possible implementation, it may also be understood that the first request is used to request the first server to execute the predicted intent, that is, the first server queries the scenic spot guide of the scenic spot, for example, may query the scenic spot guide of the scenic spot from a database, to return, to the terminal device as the second information, the scenic spot guide of the scenic spot obtained by executing the predicted intent. In a manner of querying the second information from the first server, storage space of the terminal device may be saved, and the second information with new content may be obtained.

In a possible implementation, the second information is from information prestored in the terminal device. In this way, a speed of obtaining the second information by the terminal device can be improved.

In a possible implementation, the terminal device may display the second information on the chat interface of the MeeTime application. For example, the terminal device may display the second information on a chat interface of the MeeTime application of a first user, where the first user is a user that logs in to the MeeTime application on the terminal device. In a possible implementation, a smart assistant is integrated into the MeeTime application. The smart assistant may be displayed in contact information of the MeeTime application. In this case, the second information may be displayed on a first chat interface of the MeeTime application of the terminal device. The second information is displayed on the first chat interface as chat content sent by the smart assistant. It may be learned that the smart assistant performs humanization processing in the MeeTime application. The user may chat with the smart assistant by using the MeeTime application, and the terminal device may actively push the second information as the smart assistant. According to another aspect, in this disclosure, the user does not need to actively wake up the smart assistant. In this way, a quantity of interactions between the user and the terminal device can be further reduced.

In a possible implementation, the method further includes: The terminal device autonomously obtains a chat record in the MeeTime application, analyzes the chat record to predict a predicted intent of the user, and displays, based on the predicted intent by using the MeeTime application, to-be-pushed content or a link of the to-be-pushed content associated with the predicted intent. In this implementation, the chat record in the MeeTime application may be autonomously analyzed, to predict the predicted intent of the user, and then content is pushed. It can be learned that, in this solution, the user does not need to actively wake up the smart assistant to query the smart assistant. In this solution, a quantity of times of entering a command by the user can be reduced, and a quantity of interactions between the user and the terminal device can be reduced.

In a possible implementation, the MeeTime application includes one or more chat groups, and one chat group includes at least two users. The terminal device may obtain a chat record in the chat group, analyze the chat record, predict a predicted intent of a user, and then push content or a link of the content on a chat interface of the chat group as the smart assistant. In this way, information actively pushed by the smart assistant may be viewed by each user in the group, so that communication between the two users in the group can be reduced.

In a possible implementation, the MeeTime application includes at least one chat group. The terminal device determines a first chat group that meets a preset second condition. The terminal device displays the second information on a chat interface of the first chat group.

In a possible implementation, the second condition may include: Members of the first chat group include the first user and N second users, a distance between each second user of M second users of the N second users and the first user is not greater than a distance threshold, where N is a positive integer greater than 1, M is a positive integer not greater than N, and a ratio of M to N is not less than a preset value. In a possible implementation, the preset value may be set to 50%. It can be seen that, if locations of at least half of second users in one group are close to a location of the first user, it may be predicted that most people in the group are in a same scenario. In this case, information may be directly pushed to a chat interface of the chat group, so that all members of the chat group can view the information. This saves an operation of sending the second information to another user separately. In this way, a quantity of interactions between the user and the terminal device can be further reduced.

In a possible implementation, the second condition may include: Subscription information corresponding to the first chat group includes a type of the second information. In this way, because the user subscribes to the type of the second information in the first chat group, when obtaining the second information, the terminal device may push the second information to the first chat group.

In a possible implementation, the second condition may include: A chat record in a preset time period of the first chat group relates to the first area. In a possible implementation, the terminal device may autonomously obtain the chat record in the first chat group, and then perform semantic analysis on the chat record, to determine whether a word related to the first area appears in the chat record in the preset time period of the first chat group. If yes, it may be inferred that most members in the first chat group may be located in the first area. Based on this, the second information may be pushed in the first chat group. This further reduces a quantity of interactions between the user and the terminal device.

In a possible implementation, the second condition includes: A tag value of the first chat group matches the type of the second information. For example, a chat group in the MeeTime application may have a tag value, and the tag value may display a social relationship between members of the group. For example, the tag value may be a family group, a work group, a tour pal group, or the like. The tag value may be entered by the user, or may be inferred based on chat content between the members, or may be inferred based on the social relationship between the members. When a tag value of a group matches a type of information, the information may be suitable for being published to the group. For example, if a type of information is health data of a family member, the information may be pushed to a chat group of a family group. For another example, when a type of information is a scenic spot guide, the information may be pushed to a tour pal group. A type of information that matches a tag value of a chat group may be preset.

In a possible implementation, after the terminal device displays the second information on the chat interface of the first chat group, the terminal device sends a second request to a second server, where the second request carries the second information, and the second request is used to request the second server to display the second information on terminal devices on which the N second users log in. In this way, the N second users may view the second information on the devices on which the N second users log in.

In a possible implementation, the terminal devices on which the N second users log in include at least one of the following content: a smartphone, a smart screen, a smart speaker, a smart band, and a tablet computer. In this way, a large quantity of terminal device types can be compatible.

In a possible implementation, a chat interface of the MeeTime application further includes a third chat interface for chatting between the first user and a second device, and the second device is one of a smartphone, a smart screen, a smart speaker, a smart band, or a tablet computer. The method further includes: The first user sends third information on the third chat interface, and the terminal device sends the third information to the second device, to display the third information on a display of the second device. For example, if the terminal device is a smartphone of the user, the user may add another device, such as a smart screen, a smart speaker, or a smart band, to the MeeTime application by using the MeeTime application. When the user wants to display information on the smart screen, the user may open a chat interface for chatting with the smart screen by using the MeeTime application of the smartphone, and send information such as a picture on the chat interface, to implement projection. It can be learned that, a projection solution in this manner is simple, for the user, it is similar to a chat with the smart screen. This can simplify user operations.

According to a second aspect, in this disclosure, a first server receives a first request, where the first request is used to request to obtain second information. The first server uses a second response to carry the second information, and sends the second response to a terminal device. In this way, a basis can be laid for the terminal device to display the second information.

In a possible implementation, the first request received by the first server may be used to request the first server to execute a predicted intent. The first server executes the predicted intent, and obtains the second information. The first server uses the second response to carry the second information, and sends the second response to the terminal device. For example, if the first request is used to request to query a scenic spot guide of a scenic spot in which the terminal device is currently located, the first server returns the scenic spot guide of the scenic spot as the second information to the terminal device. In another possible implementation, querying the scenic spot guide may be understood as predicting an intent. To be specific, the terminal device predicts, based on a current location of the terminal device, that a user wants to query the scenic spot guide, and then sends the first request to the first server. In a possible implementation, it may also be understood that the first request is used to request the first server to execute the predicted intent, that is, the first server queries the scenic spot guide of the scenic spot, for example, may query the scenic spot guide of the scenic spot from a database, to return, to the terminal device as the second information, the scenic spot guide of the scenic spot obtained by executing the predicted intent.

Corresponding to any content pushing method in the first aspect and the second aspect, this disclosure further provides a communication apparatus. The communication apparatus may be any transmitting end device or receiving end device that performs data transmission in a wireless manner, for example, a communication chip, a terminal device, or a server (a first server or a second server). In a communication process, a transmitting end device and a receiving end device are opposite to each other. In some communication processes, the communication apparatus may be used as the foregoing server or a communication chip that may be used in the server. In some communication processes, the communication apparatus may be used as the foregoing terminal device or a communication chip that may be used in the terminal device.

According to a third aspect, a communication apparatus is provided, including a communication unit and a processing unit, to perform any implementation of any content pushing method according to the first aspect and the second aspect. The communication unit is configured to perform functions related to sending and receiving. Optionally, the communication unit includes a receiving unit and a sending unit. In a design, the communication apparatus is a communication chip, and the communication unit may be an input/output circuit or a port of the communication chip.

In another design, the communication unit may be a transmitter and a receiver, or the communication unit may be a transmitter machine and a receiver machine.

Optionally, the communication apparatus further includes modules that may be configured to perform any implementation of any content pushing method in the first aspect and the second aspect.

According to a fourth aspect, a communication apparatus is provided. The communication apparatus is the foregoing terminal device or server (the first server or the second server). The communication apparatus includes a processor and a memory. Optionally, the communication apparatus further includes a transceiver. The memory is configured to store a computer program or instructions. The processor is configured to invoke the computer program or the instructions from the memory and run the computer program or the instructions. When the processor executes the computer program or the instructions in the memory, the communication apparatus is enabled to perform any implementation of any content pushing method according to the first aspect and the second aspect.

Optionally, there are one or more processors, and there are one or more memories.

Optionally, the memory may be integrated with the processor, or the memory and the processor are separately disposed.

Optionally, the transceiver may include a transmitter machine (transmitter) and a receiver machine (receiver).

According to a fifth aspect, a communication apparatus is provided, and includes a processor. The processor is coupled to a memory, and may be configured to perform the method according to either of the first aspect and the second aspect and any one of the possible implementations of the first aspect and the second aspect. Optionally, the communication apparatus further includes the memory. Optionally, the communication apparatus further includes a communication interface, and the processor is coupled to the communication interface.

In an implementation, the communication apparatus is a terminal device. When the communication apparatus is a terminal device, the communication interface may be a transceiver or an input/output interface. Optionally, the transceiver may be a transceiver circuit. Optionally, the input/output interface may be an input/output circuit.

In another implementation, the communication apparatus is a server (a first server or a second server). When the communication apparatus is a server (a first server or a second server), the communication interface may be a transceiver or an input/output interface. Optionally, the transceiver may be a transceiver circuit. Optionally, the input/output interface may be an input/output circuit.

In still another implementation, the communication apparatus is a chip or a chip system. When the communication apparatus is a chip or a chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to a sixth aspect, a system is provided. The system includes the foregoing terminal device and server (the first server or the second server).

According to a seventh aspect, a computer program product is provided. The computer program product includes a computer program (which may also be referred to as code or an instruction). When the computer program is run, a computer is enabled to perform the method according to any possible implementation of the foregoing first aspect, or the computer is enabled to perform the method according to any implementation of the foregoing first aspect and the foregoing second aspect.

According to an eighth aspect, a computer-readable storage medium is provided. The computer-readable storage medium stores a computer program (which may also be referred to as code or an instruction). When the computer program is run on a computer, the computer is enabled to perform the method according to any possible implementation of the foregoing first aspect, or perform the method according to any implementation of the first aspect and the second aspect.

According to a ninth aspect, a chip system is provided. The chip system may include a processor. The processor is coupled to a memory, and may be configured to perform the method in any one of the first aspect and the second aspect and any possible implementation of the first aspect and the second aspect. Optionally, the chip system further includes: a memory, where the memory is configured to store a computer program (which may also be referred to as code or an instruction); and a processor, configured to invoke the computer program from the memory and run the computer program, to enable a device on which the chip system is installed to perform the method in any one of the first aspect and the second aspect and any possible implementation of the first aspect and the second aspect.

According to a tenth aspect, a processing apparatus is provided, and includes an input circuit, an output circuit, and a processing circuit. The processing circuit is configured to receive a signal by using the input circuit, and transmit a signal by using the output circuit, so that the method in either of the first aspect and the second aspect and any one of the possible implementations of the first aspect and the second aspect is implemented.

In a specific implementation process, the foregoing processing apparatus may be a chip, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the circuits are not limited in embodiments of this disclosure.

DESCRIPTION OF EMBODIMENTS

Figure 1A:
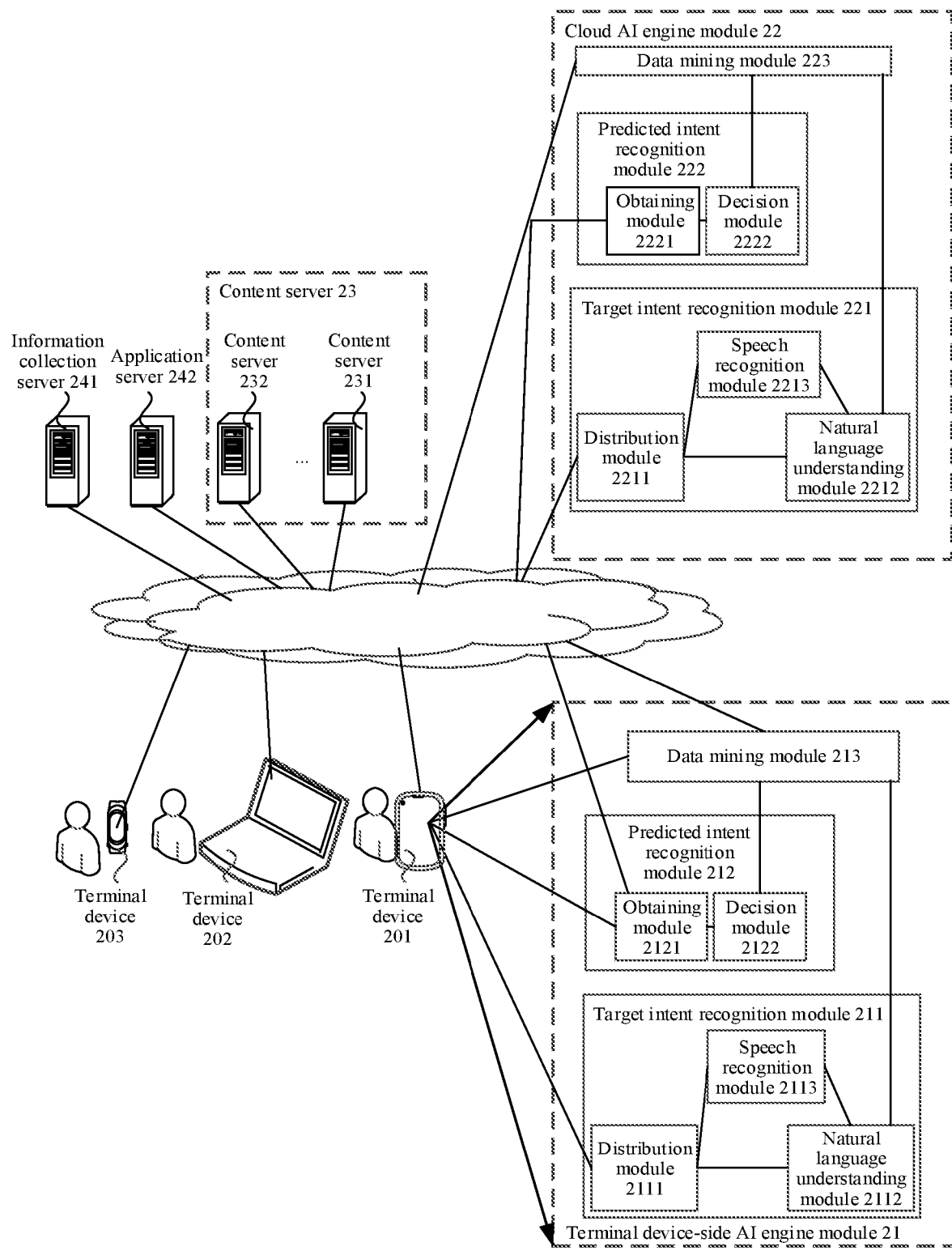
FIG. 1A is a schematic diagram of a system architecture according to an embodiment of this disclosure.

The following first explains terms in embodiments of this disclosure.

(1) Terminal Device

In embodiments of this disclosure, there may be two types of terminal devices. A first-type terminal device needs to have a display, and may be configured to display, on the display, information sent by a smart assistant. A second-type terminal device may be configured to collect user information, that is, may obtain the user information from the terminal device. The second-type terminal device may have a display, or may not have a display.

In some embodiments of this disclosure, the first-type terminal device may be a mobile phone, a tablet computer, a computer, a wearable device (such as a smartwatch) having a display and a wireless communication function, a smart screen, a smart router having a display, a vehicle-mounted device having a display and a wireless communication function, a smart speaker having a display and a wireless communication function, or the like. In some embodiments of this disclosure, the second-type terminal device may be a mobile phone, a tablet computer, a computer, a wearable device (such as a smartwatch) with a wireless communication function, a vehicle-mounted device with a wireless communication function, a smart speaker with a wireless communication function, a smart screen, a smart router, or the like.

In a possible implementation, one terminal device may belong to both the first-type terminal device and the second-type terminal device. In other words, one terminal device may be configured to obtain user information from the terminal device, or may be configured to display information sent by the smart assistant. In another possible implementation, one terminal device may belong to only the second-type terminal device, but does not belong to the first-type terminal device. In other words, the terminal device may be configured to obtain only user information from the terminal device, but cannot display information pushed by the smart assistant. For example, a smart band without a screen may collect only data such as a heartbeat of the user from the smart band, but cannot display information pushed by the smart assistant.

(2) User Command

In the field of human-machine dialog, a user command is entered by a user, and may also be referred to as a user requirement, a command, a command of the user, or the like.

In embodiments of this disclosure, the user command may be one of or a combination of a voice, an image, a video, audio and video, a text, and the like. For example, the user command is a voice entered by the user by using a microphone. In this case, the user command may also be referred to as a "voice command". For another example, the user command is a text entered by the user by using a keyboard or a virtual keyboard. In this case, the user command may also be referred to as a "text command". For still another example, the user command is an image entered by the user by using a camera, and "Who is the person in the image?" is entered by using a virtual keyboard. In this case, the user command is a combination of an image and a text. For yet another example, the user command is a segment of audio and video entered by the user by using a camera and a microphone. In this case, the user command may also be referred to as an "audio and video command".

(3) Speech Recognition

A speech recognition technology is also referred to as automatic speech recognition (ASR), computer speech recognition, or speech to text (STT) recognition, and is a method for converting a human voice into a corresponding text by using a computer. When a user command is a voice command or a command including a voice, the user command may be converted into a text by using the ASR.

(4) Natural Language Understanding (NLU)

Natural language understanding is to expect a smart assistant to have a language understanding capability of a normal person like human. An important function of natural language understanding is intent recognition.

(5) Intent, Predicted Intent, and Target Intent

An intent corresponds to a function, that is, a function required by a user. In embodiments of this disclosure, for differentiation, intents are classified into predicted intents and target intents. In embodiments of this disclosure, when it is referred to as an intent, related descriptions of the intent are all applicable to a predicted intent and a target intent. It may also be understood that the intent is a superior concept of the predicted intent and the target intent.

The predicted intent in embodiments of this disclosure refers to a function that may be required by the user and that is predicted based on obtained user data without entering a command by the user. For example, if current location information of the user is obtained, and it is determined, through analysis, that the user is currently located in the Imperial Palace and the Imperial Palace is a scenic spot, it may be predicted that an intent of the user is "querying a scenic spot guide", it may be determined, based on a preset correspondence between an intent and a slot, that a slot corresponding to the intent is a "place", and it may be determined, based on the current location information of the user, that information about the slot is "the Imperial Palace".

In the example, the intent "querying a scenic spot guide" that is predicted is a predicted intent. It can be learned that during intent prediction, the user does not need to enter a command, and the intent can be predicted only based on obtained user information. This can reduce a quantity of interactions between the user and a terminal device.

The target intent in embodiments of this disclosure is an intent that is determined through analysis based on a user command. In a possible implementation, the user may enter a user command, and then a function required by the user is recognized from the user command. Intent recognition may be understood as semantic expression classification. In other words, intent recognition is a classifier (also referred to as an intent classifier) that determines an intent of a user command. Commonly used intent classifiers for intent recognition include a support vector machine (SVM), a decision tree, and a deep neural network (DNN). The deep neural network may be a convolutional neural network (CNN), a recurrent neural network (RNN), or the like, and the RNN may include a long short-term memory (LSTM) network, a stacked recurrent neural network (SRNN), or the like.

A general process of recognizing a "target intent" based on a "user command" includes: first, preprocessing the user command (that is, a group of word sequences), for example, removing a punctuation mark and a stop word of a corpus; then, generating a word vector (word embedding) based on a preprocessed corpus by using a word embedding algorithm, for example, a word2vec algorithm; and further, performing feature extraction and intent classification by using an intent classifier (for example, an LSTM). In embodiments of this disclosure, the intent classifier is a trained model, and can recognize intents in one or more scenarios, or recognize any intent. For example, the intent classifier can recognize an intent in an air ticket booking scenario, including booking an air ticket, filtering an air ticket, querying an air ticket price, querying air ticket information, returning an air ticket, changing an air ticket, and querying a distance to an airport.

(6) Slot

In some embodiments, a terminal device may store <intent, slot>, that is, the terminal device stores a correspondence between an intent and a slot, so that the terminal device can quickly determine, based on an intent, a slot corresponding to the intent. It should be understood that one intent may correspond to one or more slots, or may not correspond to a slot. The Table shows an example of a schematic table of a structure of several possible correspondences between intents and slots.

TABLE

Table of correspondences between intents and slots

| Intent | Slot | | |
|---|---|---|---|
| Query a scenic spot guide | Place | | |
| Query a cinema | Place | | |
| Query a hotel | Place | | |
| Send a conference reminder | Time | | |
| Send a physical health report of a first user | Time | | |
| Book an air ticket | Departure place | Landing place | Travel time |

The foregoing stored correspondences between intents and slots may be stored by using a map data structure, where map is a container that stores elements based on a key, and is implemented by using an array and a linked list.

The foregoing descriptions are provided by using an example in which the terminal stores the correspondence between an intent and a slot. It should be understood that in another implementation, the correspondence between an intent and a slot may be stored in a server (for example, a cloud server). This is not limited in embodiments of this disclosure.

In embodiments of this disclosure, both a predicted intent and a target intent belong to an intent. In a possible implementation, a slot corresponding to a predicted intent may be determined based on the correspondence between an intent and a slot. In another possible implementation, a slot corresponding to a target intent may be determined based on the correspondence between an intent and a slot.

If an intent is a predicted intent, a slot may be filled based on obtained user information. For example, in the foregoing example, information about the slot "place" may be filled as "the Imperial Palace" based on the information about the current location of the user. If an intent is a target intent, a slot may be filled based on at least a "user command".

One or more slots may be configured for an intent. For example, in an intent "querying a scenic spot guide", there is one slot, that is, a "place". For another example, in an intent "booking an air ticket", there are three slots: "departure time", a "departure place", and a "destination".

To accurately recognize a slot, a slot type is used. For example, if the user wants to accurately recognize three slots: "departure time", a "departure place", and a "destination", corresponding slot types, that is, "time" and a "city name", are required. The slot type is a structured knowledge base of specific knowledge, for recognizing and converting slot information expressed colloquially by the user. From the perspective of a programming language, intent+slot may be considered as a function to describe a user requirement, where the intent corresponds to a function, the slot corresponds to a parameter of the function, and slot_type corresponds to a type of the parameter.

Slots configured for one intent may be divided into necessary slots and optional slots, where the necessary slot is a slot that needs be filled to execute a user command, and the optional slot is a slot that may be selectively filled or not filled to execute a user command. Unless otherwise specified, the slot in this disclosure may be a necessary slot or an optional slot, or may be a necessary slot.

In the foregoing example of "booking an air ticket", three core slots are defined, respectively: "departure time", a "departure place", and a "destination". If content that needs to be entered by the user to book an air ticket is fully considered, more slots can be certainly thought of, such as a quantity of passengers, an airline company, an airport of departure, and an airport of landing. A slot designer may design the slots based on a granularity of the intent.

(7) Instant Messaging

Instant messaging (IM) is a service in which Internet messages are sent and received in real time. Users can chat with each other by using an instant messaging application. The instant messaging application may support chat between two persons, or may support direct one-to-one chat between a user and a smart assistant, or may support a group chat of a group. One group may contain three or more members. The smart assistant may also participate in a group chat of a group. The smart assistant may publish a message on a group chat interface.

With the development of smart electronic devices, various instant messaging applications (Applications, apps) emerge, and users can communicate with others in real time through instant messaging. There are a plurality of instant messaging apps, for example, a MeeTime™ application of Huawei and WeChat™. In embodiments of this disclosure, the MeeTime application app is used as an example for description. In a possible implementation, a user may perform registration on the MeeTime application app, for example, may perform registration by using a mobile phone number. After the registration succeeds, the user and other users who have registered with the MeeTime application may add each other as friends, and the users who add each other as friends may communicate with each other by using the MeeTime application.

(8) Smart Assistant

In embodiments of this disclosure, the smart assistant does not need to be separately added, and may be integrated into a system layer of a terminal device. In this implementation, operation steps that need to be performed when a user interacts with the smart assistant can be further reduced.

In a possible implementation, after inferring a predicted intent of the user based on obtained user data, and obtaining, from a content server, content that meets the predicted intent, a cloud AI engine module or a terminal device-side AI engine module may return the content to the terminal device, and the terminal device side may display the content on a chat interface as the smart assistant.

In another possible implementation, several manners of waking up the smart assistant may be preset (for example, @name of the smart assistant on a chat interface, or directly calling the name of the smart assistant). The user may wake up the smart assistant in the preset manner and publish a user command, so that after the cloud AI engine module or the terminal device-side AI engine module determines a target intent of the user based on the obtained user command, and obtains content that meets the target intent from the content server, the cloud AI engine module or the terminal device-side AI engine module may return the content to the terminal device, and the terminal device side may display the content on the chat interface as the smart assistant.

In embodiments of this disclosure, the smart assistant may also be referred to as a chatbot. In embodiments of this disclosure, an example in which the name of the smart assistant is "Celia" is used for description. In actual application, the smart assistant may also have another name. This is not limited in embodiments of this disclosure.

(9) User Interface (UI)

The user interface is a medium interface for interaction and information exchange between an application or an operating system and a user, and implements conversion between an internal form of information and a form that can be accepted by the user.

A user interface of an application is source code written in a specific computer language, for example, Java or an Extensible Markup Language (XML). Interface source code is parsed and rendered on an electronic device, and is finally presented as content that can be identified by the user, for example, a control such as a picture, a text, or a button.

For example, in a scenario of querying a cinema, a plurality of cards may be displayed on a graphical user interface (GUI), which may also be referred to as displaying a query result in a form of a card. An example in which one cinema card is a control is used for description. One cinema card may be used to describe one cinema, and information about a cinema displayed on one cinema card may not be all information corresponding to the control. When the cinema card is tapped, a terminal device may output detailed information about the cinema specified by the cinema card, and GUI information corresponding to the control is the detailed information about the cinema. In a possible implementation, information about a plurality of cinemas may be sorted, for example, may be sorted based on scores of the cinemas. FIG. 5F is a schematic diagram of an interface in which a plurality of cinemas may be displayed on an interface of a terminal device by Celia in a form of cards. There may be another rendering manner of the query result. This is not limited in embodiments of this disclosure.

Based on the foregoing content, the following describes the technical solutions in embodiments of this disclosure with reference to the accompanying drawings in embodiments of this disclosure.

FIG. 1A is an example of a schematic diagram of a system architecture applicable to an embodiment of this disclosure. As shown in FIG. 1A, the system architecture includes one or more terminal devices, for example, a terminal device 201, a terminal device 202, and a terminal device 203 shown in FIG. 1A. In FIG. 1A, an example in which the terminal device 201 is a terminal device configured to display information sent by a smart assistant is used for illustration. The terminal device 201, the terminal device 202, and the terminal device 203 may all be used as terminal devices for collecting user data.

As shown in FIG. 1A, the system architecture may further include one or more servers, for example, an information collection server 241, an application server 242, and a content server 23 shown in FIG. 1A. In the content server 23, different servers, for example, a content server 232 and a content server 231, may be set for different types of content. The content server may be, for example, a content server configured to provide a weather service (a data mining module may query a weather condition from the content server), a content server configured to provide an encyclopedia service, or a content server configured to provide content such as movie and entertainment. One content server may be configured to provide one or more types of services. This is not limited in this embodiment of this disclosure.

As shown in FIG. 1A, the information collection server 241 may be configured to store data reported by each terminal device, for example, may collect heartbeat data reported by the terminal device 203 (the terminal device 203 is a smart band). There may be one or more information collection servers 241, and only one information collection server is shown as an example in the figure.

The application server 242 may be an application server of an instant messaging application mentioned in embodiments of this disclosure. A user may have a one-to-one chat with the smart assistant by using the instant messaging application. A group chat can also be performed between a plurality of users by using the instant messaging application. The smart assistant can also join a group chat with a plurality of users. In a group, the smart assistant can join the group chat as a group chat member. In addition, in an application scenario of a group chat, the terminal device may send, to the application server 242, information sent by the smart assistant, and then send the information to a terminal device of each group member by using the application server 242, so that each group member of the group can view the information displayed by the smart assistant on a group chat interface.

As shown in FIG. 1A, an embodiment of this disclosure further includes an AI engine module, and the AI engine module may be written as engine in English. The AI engine module may be deployed on a terminal device side, for example, a terminal device-side AI engine module 21 deployed on the terminal device 201 shown in FIG. 1A. The terminal device-side AI engine module may also be deployed on another terminal device. In the figure, only an example in which the terminal device-side AI engine module 21 is deployed on the terminal device 201 is used for illustration. In a possible implementation, the AI engine module may be deployed on a terminal device side with a strong capability, for example, a smartphone or a tablet computer. In another possible implementation, the AI engine module may also be deployed on a cloud side, for example, a cloud AI engine module 22. A specific processing procedure of the solution may be processed by the terminal device-side AI engine module 21, or may be processed by the cloud AI engine module 22. When the AI engine module is deployed on the terminal device, processing may be performed on the terminal device-side AI engine module 21. In this way, a quantity of interactions between the terminal device and the cloud can be reduced, thereby accelerating the processing procedure.

As shown in FIG. 1A, the terminal device-side AI engine module 21 includes a target intent recognition module 211, a predicted intent recognition module 212, and a data mining module 213. The target intent recognition module 211 may be configured to recognize a target intent of the user based on a command entered by the user, and the target intent recognition module 211 may include a distribution module 2111, a speech recognition module 2113, and a natural language understanding module 2112. The distribution module 2111 may be configured to receive a command entered by the user, where the command may be a voice or a text. If the command is a voice, the speech recognition module 2113 may convert the voice into a text, and then enter the recognized text into the natural language understanding module 2112. If the command is a text, the text may be directly entered into the natural language understanding module 2112. The natural language understanding module 2112 is configured to recognize a target intent of the user based on the entered text, and send the target intent to the data mining module 213. The data mining module 213 may determine, based on a correspondence between an intent and a slot, a slot corresponding to the target intent, fill information in the slot, query related content that needs to meet the target intent and the slot information from a corresponding server, and return the found related content to the terminal device side, to display the related content to the user for viewing.

In this embodiment of this disclosure, the predicted intent recognition module 212 may also be referred to as an all-scenario smart brain, and may include an obtaining module 2121 and a decision module 2122. The obtaining module is configured to collect user information, for example, information such as a schedule, a geographical location, and health data of the user. In a possible implementation, authorization of the user may be obtained before data of the user is collected. The obtaining module may collect data on one or more terminal devices. For example, although the obtaining module 2121 is a module on the terminal device 201, in addition to collecting data on the terminal device 201, the obtaining module 2121 may also collect data on another terminal device, for example, the terminal device 203. In a possible implementation, the terminal device 203 may report data to the cloud information collection server 241, and the obtaining module 2121 may obtain, through a network, the data reported by the terminal device 203. The decision module 2122 determines a predicted intent of the user based on the data obtained by the obtaining module 2121. In other words, the intent determined by the predicted intent recognition module 2122 is not determined completely based on a command of the user, but is an intent of the user predicted through analysis based on the collected data. In this embodiment of this disclosure, the intent predicted by the predicted intent recognition module 212 is referred to as a predicted intent. Further, the decision module 2122 fills a slot of the predicted intent based on the data obtained by the obtaining module 2121, and sends the slot to the data mining module 213 after the slot is filled. The data mining module 213 queries, in a corresponding server based on the received predicted intent and slot information, for related content that needs to meet the predicted intent and the slot information, and returns the queried related content to the terminal device side, to display the related content to the user for viewing.

It should be noted that, for the data mining module 213, both the target intent and the predicted intent belong to an intent, and the predicted intent is a function that may be required by the user and that needs to be predicted based on the collected user information. The target intent is obtained after the natural language understanding module 2112 performs understanding based on the user command entered by the user. In this embodiment of this disclosure, because the function required by the user may be predicted based on the user information, a step of entering the command by the user into the terminal device may be reduced, and a quantity of interactions between the user and the terminal device may be reduced.

The foregoing content is described by using the terminal device-side AI engine module as an example. The following describes a processing procedure of a possible solution of the cloud AI engine module 22.

As shown in FIG. 1A, the cloud AI engine module 22 includes a target intent recognition module 221, a predicted intent recognition module 222, and a data mining module 223. The target intent recognition module 221 may be configured to recognize a target intent of the user based on a command entered by the user, and the target intent recognition module 221 may include a distribution module 2211, a speech recognition module 2213, and a natural language understanding module 2212. The distribution module 2211 may be configured to receive a command entered by the user, where the command may be a voice or a text. If the command is a voice, the speech recognition module 2213 may convert the voice into a text, and then enter the recognized text into the natural language understanding module 2212. If the command is a text, the text may be directly entered into the natural language understanding module 2212. The natural language understanding module 2212 is configured to recognize a target intent of the user based on the entered text, and send the target intent to the data mining module 223. The data mining module 223 may determine, based on a correspondence between an intent and a slot, a slot corresponding to the target intent, fill information in the slot, query related content that needs to meet the target intent and the slot information from a corresponding server, and return the found related content to the cloud, to display the related content to the user for viewing.

In this embodiment of this disclosure, the predicted intent recognition module 222 may also be referred to as an all-scenario smart brain, and may include an obtaining module 2221 and a decision module 2222. The obtaining module is configured to collect user information, for example, information such as a schedule, a geographical location, and health data of the user. In a possible implementation, authorization of the user may be obtained before data of the user is collected. The obtaining module may collect data on one or more terminal devices, for example, may collect data on the terminal device 201, or may collect data on the terminal device 203. In a possible implementation, the terminal device 203 may report data to the cloud information collection server 241, and the obtaining module 2221 may obtain, through a network, the data reported by the terminal device 203. The decision module 2222 determines a predicted intent of the user based on the data obtained by the obtaining module 2221. In other words, the intent determined by the predicted intent recognition module 2222 is not determined completely based on a command of the user, but is an intent of the user predicted through analysis based on the collected data. In this embodiment of this disclosure, the intent predicted by the predicted intent recognition module 222 is referred to as a predicted intent. Further, the decision module 2222 fills a slot of the predicted intent based on the data obtained by the obtaining module 2221, and sends the slot to the data mining module 223 after the slot is filled. The data mining module 223 queries, in a corresponding server based on the received predicted intent and slot information, for related content that needs to meet the predicted intent and the slot information, and returns the queried related content to the cloud, to display the related content to the user for viewing.

The foregoing content separately describes the terminal device-side AI engine module 21 and the cloud AI engine module 22. As shown in FIG. 1A, if the terminal device 201 and the cloud each are provided with an AI engine module, some operations may be performed on the terminal device side, and some operations may be performed on the cloud AI engine module. For example, the predicted intent recognition module 212 of the terminal device-side AI engine module 21 may perform a process of determining a predicted intent. The target intent recognition module 221 of the cloud AI engine module 22 performs a process of determining a target intent. During data mining processing, the data mining module 213 may be used, or the data mining module 223 may be used in rotation. When the process of determining the predicted intent is performed, the obtaining module 2121 on the terminal device side may collect data of the user, and then report the collected data through the network, and the decision module 2222 on the cloud infers the predicted intent of the user. In this embodiment of this disclosure, the modules may be used in combination, and this is flexible. This is not limited in this embodiment of this disclosure.

Figure 1B:
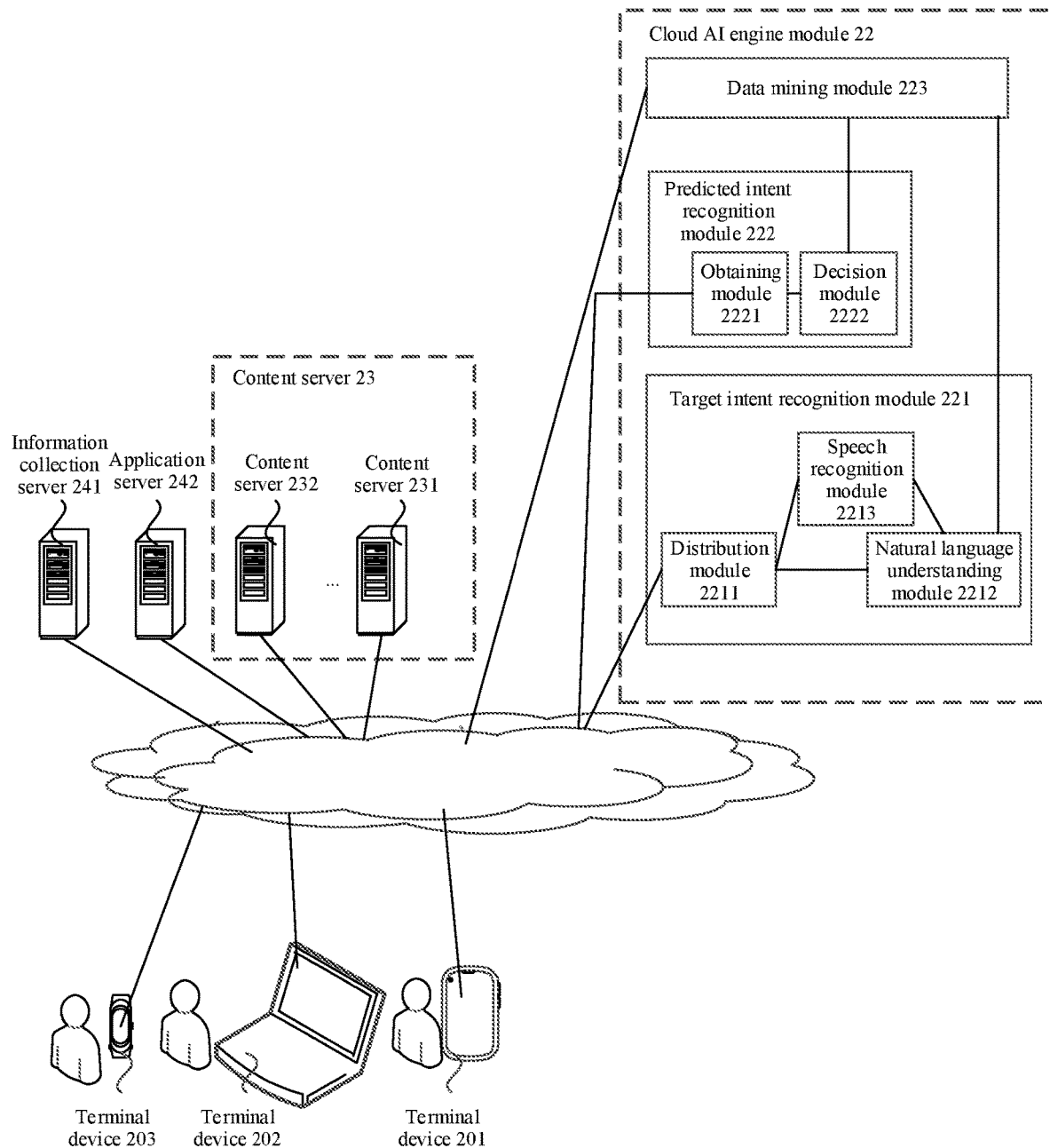
FIG. 1B is a schematic diagram of another system architecture according to an embodiment of this disclosure.
Figure 1C:
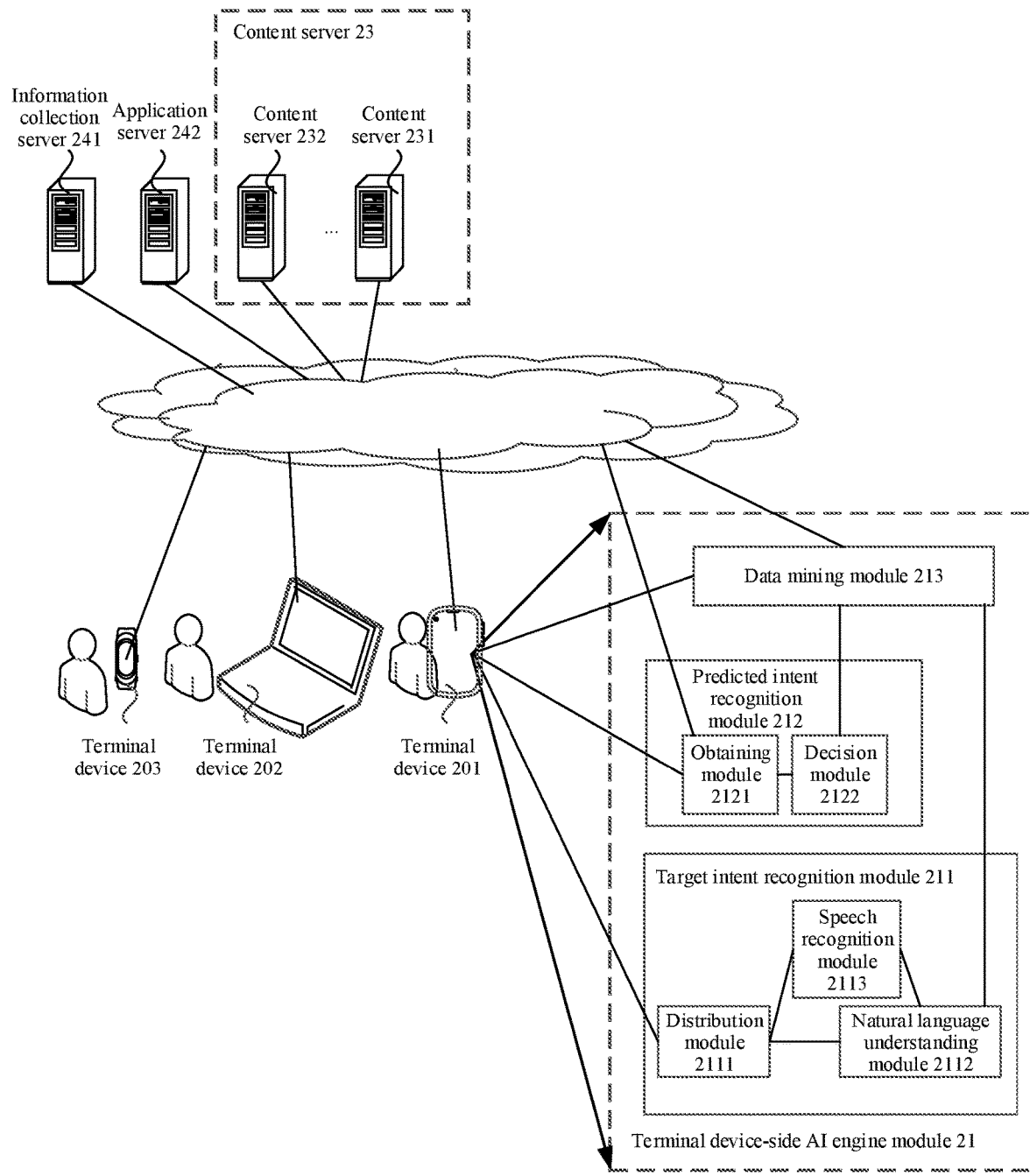
FIG. 1C is a schematic diagram of another system architecture according to an embodiment of this disclosure.

FIG. 1A is a schematic diagram of a system architecture in which an AI engine module is deployed on both the terminal device side and the cloud. FIG. 1B is an example of a schematic diagram of a system architecture in which an AI engine module is deployed only on the cloud. FIG. 1C is an example of a schematic diagram of a system architecture in which an AI engine module is deployed only on the terminal device side. For functions and functions of the modules shown in FIG. 1B and FIG. 1C, refer to corresponding descriptions in FIG. 1A. Details are not described herein again.

Figure 1D:
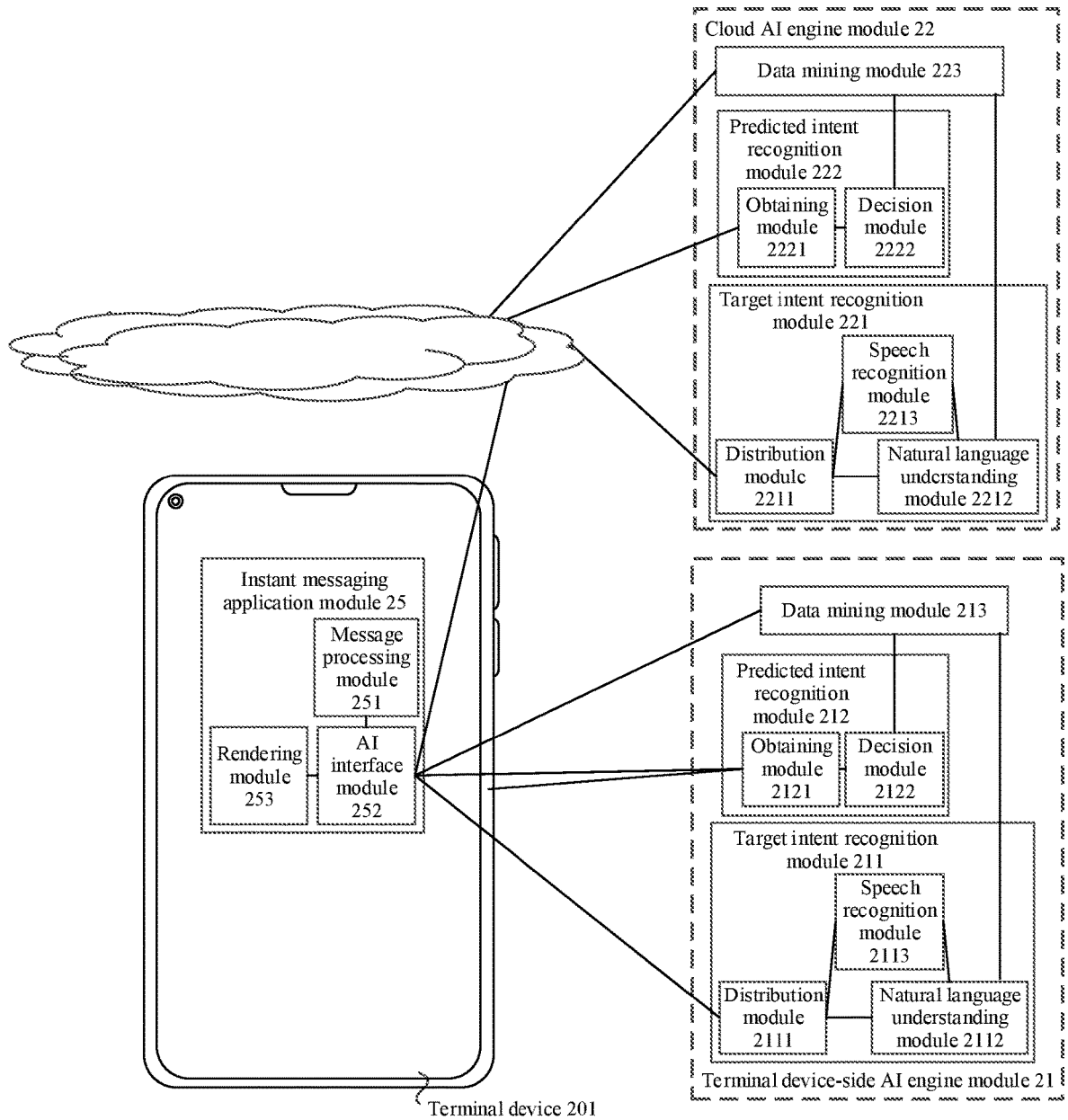
FIG. 1D is a schematic diagram of yet another system architecture according to an embodiment of this disclosure.

FIG. 1D is an example of a schematic diagram of a structure of the terminal device 201 in FIG. 1A. As shown in FIG. 1D, the terminal device 201 may include an instant messaging application module 25. In this embodiment of this disclosure, the instant messaging application module 25 is integrated with an AI interface module 252. In this way, the cloud AI engine module 22 or the terminal device-side AI engine module 21 may be used in the instant messaging application. Data returned by the data mining module 213 may be transmitted to the instant messaging application module 25 by using the AI interface module 252.

As shown in FIG. 1D, the instant messaging application module 25 may further include a rendering module 253. The rendering module 253 may be configured to render information received by the AI interface module 252, for example, may render and draw received information "scenic spot guide of the Imperial Palace", so that information displayed to the user for viewing can be drawn more beautifully.

As shown in FIG. 1D, the instant messaging application module 25 may further include a message processing module 251, and the message processing module 251 may be configured to send a message to a chat interface of the user as the smart assistant. When a message needs to be published on a chat interface of a group as the smart assistant, the message processing module 251 may send the message to the application server 242, and then transmit the message to a terminal device of each group member in the group, to publish the message in a chat record of the group as the smart assistant.

Figure 1E:
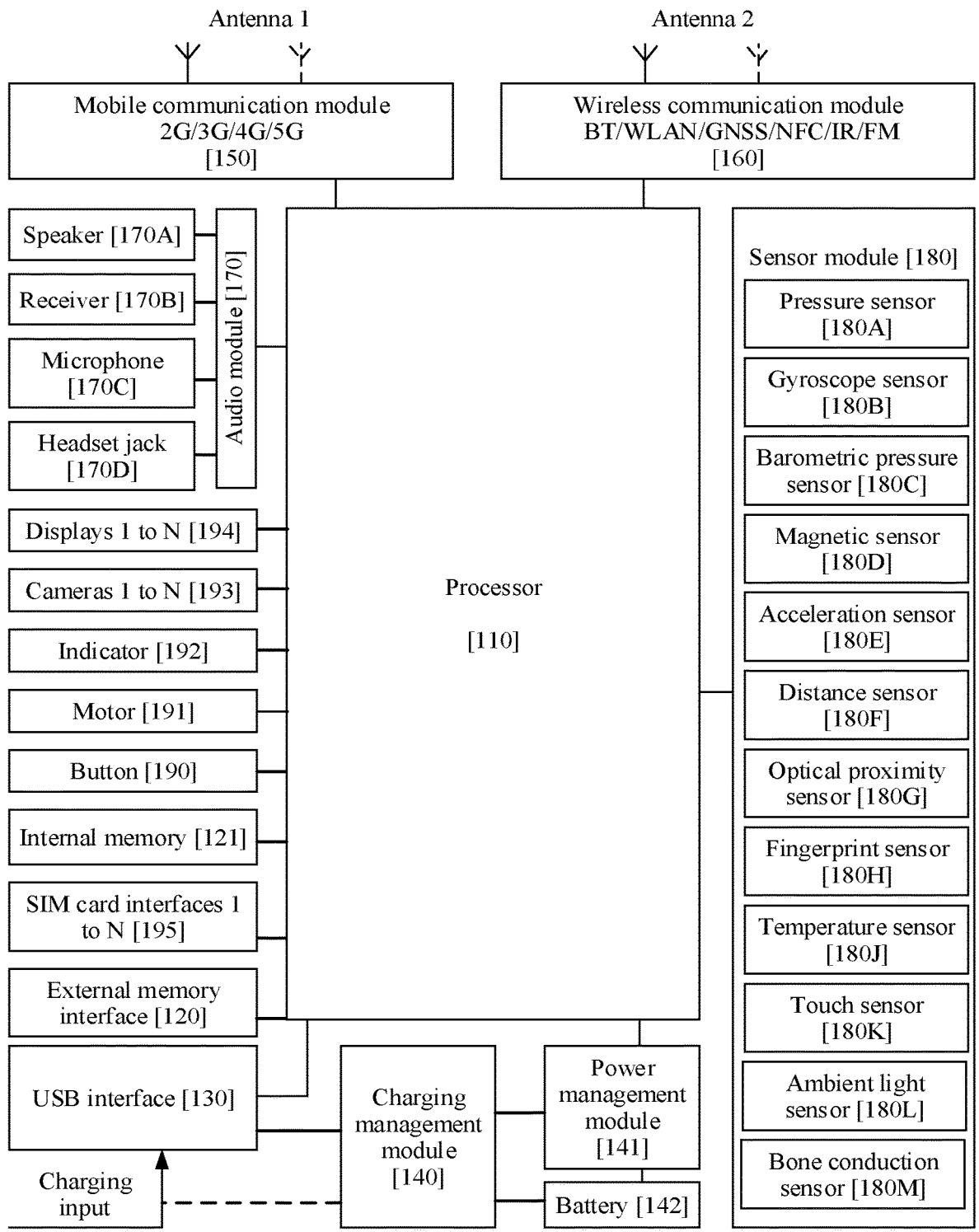
FIG. 1E is a schematic diagram of a structure of a terminal device according to an embodiment of this disclosure.

FIG. 1E is an example of a schematic diagram of a structure of a terminal device. The terminal device may be the terminal device 201 in FIG. 1A to FIG. 1D.

It should be understood that the terminal device shown in the figure is merely an example, and the terminal device may have more or fewer components than those shown in the figure, two or more components may be combined, or different component configurations may be used. Components shown in the figure may be implemented in hardware including one or more signal processing and/or application-specific integrated circuits, software, or a combination of hardware and software.

As shown in FIG. 1E, the terminal device may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The following specifically describes the components of the terminal device with reference to FIG. 1E.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors. The controller may be a nerve center and a command center of the terminal device. The controller may generate an operation control signal based on instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store an instruction or data that has been used or cyclically used by the processor 110. If the processor 110 needs to use the instructions or the data again, the processor 110 may directly invoke the instructions or the data from the memory, to avoid repeated access and reduce waiting time of the processor 110. Therefore, system efficiency can be improved.

The processor 110 may perform the touchscreen volume adjustment method provided in this embodiment of this disclosure, and the processor may respond to a touch operation on the display, and display volume interaction-related prompt information on a side edge of the display. When different components are integrated into the processor 110, for example, a CPU and a GPU are integrated, the CPU and the GPU may cooperate to perform the operation prompt method provided in embodiments of this disclosure. For example, in the operation prompt method, some algorithms are performed by the CPU, and other algorithms are performed by the GPU, to achieve relatively high processing efficiency.

In some embodiments, the processor 110 may include one or more interfaces. For example, the interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the terminal device.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a BLUETOOTH headset.

The PCM interface may also be configured to: perform audio communication, and sample, quantize, and code an analog signal. In some embodiments, the audio module 170 may be coupled to the wireless communication module 160 through a PCM bus interface. In some embodiments, the audio module 170 may also transmit an audio signal to the wireless communication module 160 through the PCM interface, to implement a function of answering a call through a BLUETOOTH headset. Both the I2S interface and the PCM interface may be used for audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a BLUETOOTH module in the wireless communication module 160 through the UART interface, to implement a BLUETOOTH function. In some embodiments, the audio module 170 may transmit an audio signal to the wireless communication module 160 through the UART interface, to implement a function of playing music through a BLUETOOTH headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through the CSI interface, to implement a photographing function of the terminal device. The processor 110 communicates with the display 194 through the DSI interface, to implement a display function of the terminal device.

The GPIO interface may be configured by using software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as the I2C interface, the I2S interface, the UART interface, the MIPI interface, or the like.

The USB interface 130 is an interface that conforms to a USB standard specification, and may be specifically a mini USB interface, a micro USB interface, a USB type-C interface, or the like. The USB interface 130 may be configured to connect to a charger to charge the terminal device, or may be configured to transmit data between the terminal device and a peripheral device, or may be configured to connect to a headset for playing audio through the headset. The interface may alternatively be used to connect to another terminal device, for example, an AR device.

It can be understood that an interface connection relationship between the modules illustrated in this embodiment of this disclosure is merely an example for description, and does not constitute a limitation on the structure of the terminal device. In some other embodiments of this disclosure, the terminal device may alternatively use an interface connection manner different from that in the foregoing embodiments or a combination of a plurality of interface connection manners.

A wireless communication function of the terminal device may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the terminal device may be configured to cover one or more communication frequency bands. Different antennas may be further multiplexed, to improve antenna utilization. For example, the antenna 1 may be multiplexed as a diversity antenna of a wireless local area network. In other embodiments, the antenna may be used in combination with a tuning switch.

The mobile communication module 150 may provide a wireless communication solution used in the terminal device and including wireless communication of 2G, 3G, 4G, 5G, and the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit the electromagnetic wave to the modem processor for demodulation. The mobile communication module 150 may further amplify a signal modulated by the modem processor, and convert the signal into an electromagnetic wave for radiation through the antenna 1. In some embodiments, at least some functional modules in the mobile communication module 150 may be disposed in the processor 110. In some embodiments, at least some functional modules of the mobile communication module 150 may be disposed in a same device as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by an audio device (which is not limited to the speaker 170A, the receiver 170B, or the like), or displays an image or a video by the display 194. In some embodiments, the modem processor may be an independent component. In some other embodiments, the modem processor may be independent of the processor 110, and is disposed in a same device as the mobile communication module 150 or another functional module.

The wireless communication module 160 may provide a wireless communication solution that is applied to the terminal device, and that includes a wireless local area network (WLAN) (for example, a WI-FI network, BLUETOOTH (BT), a global navigation satellite system (GNSS), frequency modulation (FM), near-field communication (NFC), an infrared (IR) technology, and the like. The wireless communication module 160 may be one or more components integrating at least one communication processor module. The wireless communication module 160 receives an electromagnetic wave by the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave for radiation through the antenna 2.

In some embodiments, the antenna 1 and the mobile communication module 150 in the terminal device are coupled, and the antenna 2 and the wireless communication module 160 in the terminal device are coupled, so that the terminal device can communicate with a network and another device by using a wireless communication technology. The wireless communication technology may include a Global System for Mobile Communications (GSM), a General Packet Radio Service (GPRS), code-division multiple access (CDMA), wideband code-division multiple access (WCDMA), time-division synchronous CDMA (TD-SCDMA), Long-Term Evolution (LTE), BT, a GNSS, a WLAN, NFC, FM, an IR technology, and/or the like. The GNSS may include a GPS, a global navigation satellite system (GLONASS), a BeiDou navigation satellite system (BDS), a quasi-zenith satellite system (QZSS), and/or a satellite based augmentation system (SBAS).

The terminal device implements a display function by using the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, which execute instructions to generate or change display information.

The display 194 is configured to display an image, a video, and the like. The display 194 includes a display panel. The display panel may be a liquid-crystal display (LCD), an organic light-emitting diode (OLED), an active-matrix organic LED (AMOLED), a flexible LED (FLED), a mini-LED, a micro-LED, a micro-OLED, a quantum dot LED (QLED), or the like.

In embodiments of this disclosure, the display 194 may be one integrated flexible display, or may be a spliced display including two rigid screens and one flexible screen located between the two rigid screens. When the processor 110 performs the volume adjustment method provided in this embodiment of this disclosure, and when the display 194 is folded, a touch operation is received on a screen, the processor 110 determines a touch location of the touch operation on the screen, and displays volume interaction-related prompt information at the touch location on the screen.

The external memory interface 120 may be configured to connect to an external storage card, for example, a micro-SD card, to extend a storage capability of the terminal device. The external storage card communicates with the processor 110 through the external memory interface 120, to implement a data storage function. For example, files such as music and videos are stored in the external storage card.

The internal memory 121 may be configured to store computer-executable program code, and the executable program code includes instructions. The internal memory 121 may include a program storage area and a data storage area. The program storage area may store an operating system, an application required by at least one function (for example, a voice playing function or an image playing function), and the like. The data storage area may store data (for example, audio data and a phone book) and the like created when the terminal device is used. In addition, the internal memory 121 may include a high-speed random access memory (RAM), and may further include a nonvolatile memory, for example, at least one magnetic disk storage device, a flash memory device, or a universal flash storage (UFS). The processor 110 runs the instructions stored in the internal memory 121 and/or the instructions stored in a memory disposed in the processor, to perform various function applications and data processing of the terminal device.

The terminal device may implement an audio function such as music playing and recording through the audio module 170, the speaker 170A, the receiver 170B, the microphone 170C, the headset jack 170D, the application processor, and the like.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The microphone 170C, also referred to as a "mike" or a "mic", is configured to convert a sound signal into an electrical signal. When making a call or sending a voice message, a user may make a sound near the microphone 170C through the mouth of the user, to input a sound signal to the microphone 170C. At least one microphone 170C may be disposed in the terminal device. In some other embodiments, two microphones 170C may be disposed in the terminal device, to implement a noise reduction function, in addition to collecting a sound signal. In some other embodiments, three, four, or more microphones 170C may alternatively be disposed in the terminal device, to collect a sound signal and reduce noise. The microphones may further identify a sound source, to implement a directional recording function, and the like.

The fingerprint sensor 180H is configured to collect a fingerprint. The terminal device may use a feature of the collected fingerprint to implement fingerprint unlocking, application lock access, fingerprint photographing, fingerprint call answering, and the like. For example, a fingerprint sensor may be configured on a front side (below the display 194) of the terminal device, or a fingerprint sensor may be configured on a back side (below the rear-facing camera) of the terminal device. In addition, the fingerprint sensor may be alternatively configured in the touchscreen to implement a fingerprint recognition function. In other words, the fingerprint sensor may be integrated with the touchscreen to implement the fingerprint recognition function of the terminal device. In this case, the fingerprint sensor may be disposed in the touchscreen, or may be a part of the touchscreen, or may be disposed in the touchscreen in another manner. In addition, the fingerprint sensor may further be implemented as a full-panel fingerprint sensor. Therefore, the touchscreen may be considered as a panel on which a fingerprint may be collected at any position. In some embodiments, the fingerprint sensor may process a collected fingerprint (for example, the fingerprint sensor may check whether the fingerprint is verified) and send a fingerprint processing result to the processor 110, and the processor 110 performs corresponding processing based on the fingerprint processing result. In some other embodiments, the fingerprint sensor may further send the collected fingerprint to the processor 110, so that the processor 110 processes the fingerprint (for example, verifies the fingerprint). In this embodiment of this disclosure, the fingerprint sensor may use any type of sensing technology, which includes but is not limited to an optical sensing technology, a capacitive sensing technology, a piezoelectric sensing technology, an ultrasonic sensing technology, and the like.

The touch sensor 180K is also referred to as a touch panel. The touch sensor 180K may be disposed on the display 194, and the touch sensor 180K and the display 194 form a touchscreen, which is also referred to as a "touch screen". The touch sensor 180K is configured to detect a touch operation performed on or near the touch sensor. The touch sensor may transfer the detected touch operation to the application processor to determine a type of the touch event. A visual output related to the touch operation may be provided on the display 194. In some other embodiments, the touch sensor 180K may alternatively be disposed on a surface of the terminal device at a location different from a location of the display 194.

The SIM card interface 195 is configured to connect to a SIM card. The SIM card may be inserted into the SIM card interface 195 or removed from the SIM card interface 195, to implement contact with or separation from the terminal device. The terminal device may support one or N SIM card interfaces, where N is a positive integer greater than 1. The SIM card interface 195 may support a nano-SIM card, a micro-SIM card, a SIM card, and the like. A plurality of cards may be inserted into a same SIM card interface 195. The plurality of cards may be of a same type or different types. The SIM card interface 195 may be compatible with different types of SIM cards. The SIM card interface 195 is also compatible with an external storage card. The terminal device interacts with a network by using the SIM card, to implement functions such as a call and data communication. In some embodiments, the terminal device uses an eSIM, that is, an embedded SIM card. The eSIM card may be embedded in the terminal device, and cannot be separated from the terminal device.

Although not shown in FIG. 1E, the terminal device may further include a BLUETOOTH apparatus, a positioning apparatus, a flash, a micro projection apparatus, an apparatus, and the like. Details are not described herein.

A software system of the terminal device may use a layered architecture. In this embodiment of this disclosure, an Android system with a layered architecture is used as an example to describe a software structure of the terminal device.

Figure 1F:
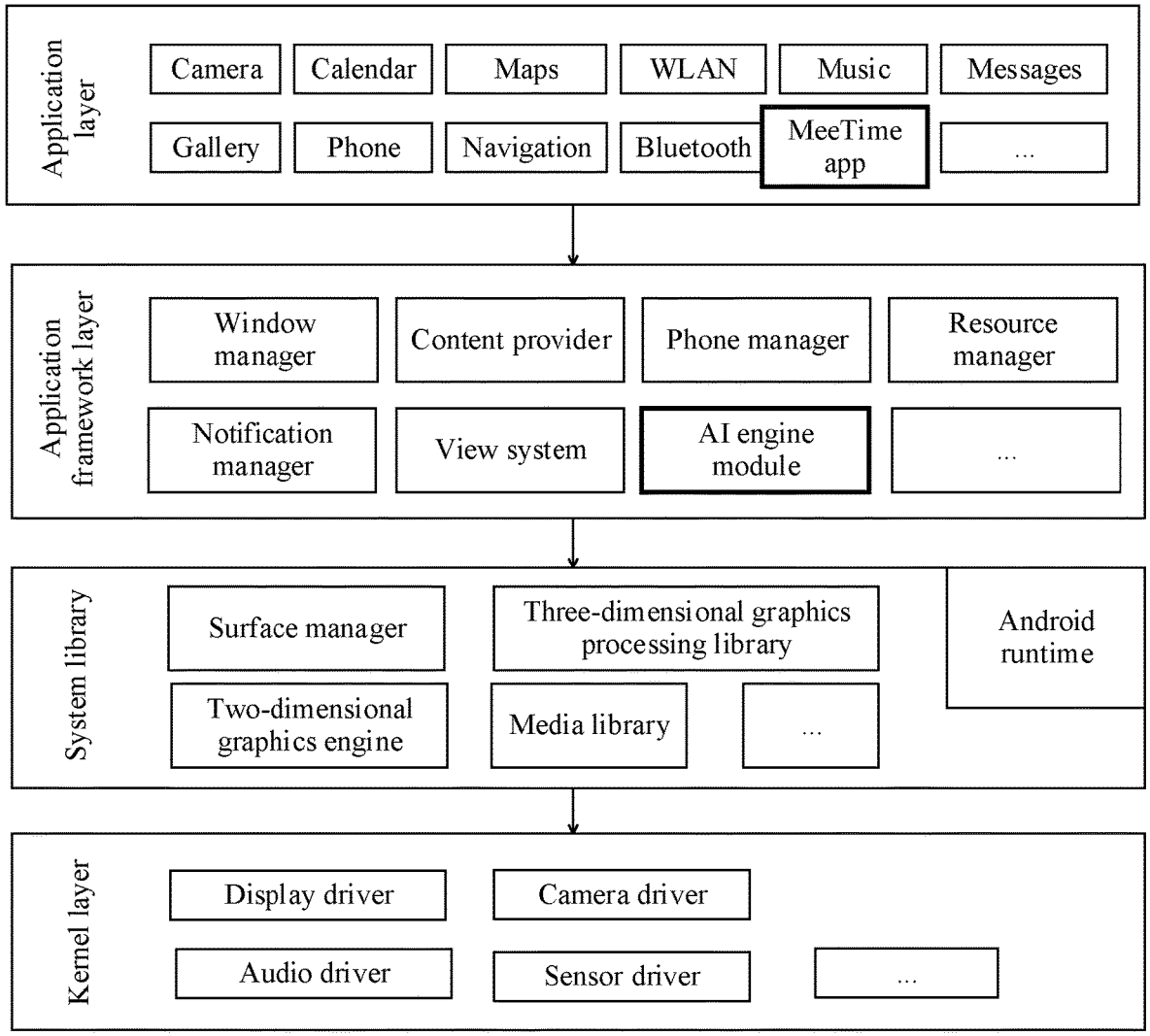
FIG. 1F is a schematic diagram of another structure of a terminal device according to an embodiment of this disclosure.

FIG. 1F is a block diagram of a software structure of a terminal device according to an embodiment of the present disclosure.

In a layered architecture, software is divided into several layers, and each layer has a clear role and task. The layers communicate with each other through a software interface. In some embodiments, an Android system is divided into four layers: an application layer, an application framework layer, an Android runtime and system library, and a kernel layer from top to bottom.

The application layer may include a series of application packages.

As shown in FIG. 1F, the application packages may include applications such as Call, Camera, Gallery, Calendar, Phone, Maps, Navigation, WLAN, BLUETOOTH, Music, Video, and Messages. An application package of the MeeTime application app mentioned in the foregoing content may also be located at the application layer.

The application framework layer provides an application programming interface (API) and a programming framework for an application at the application layer. The application framework layer includes some predefined functions. The terminal device-side AI engine module 21 mentioned in the foregoing content may also be located at the application framework layer.

As shown in FIG. 1F, the application framework layer may include a window manager, a content provider, a view system, a phone manager, a resource manager, a notification manager, and the like.

The window manager is configured to manage a window program. The window manager may obtain a size of a display, determine whether there is a status bar, perform screen locking, take a screenshot, and the like.

The content provider is configured to store and obtain data, and enable the data to be accessed by an application. The data may include a video, an image, audio, calls that are made and received, a browsing history and a bookmark, a phone book, and the like.

The view system includes visual controls such as a control for displaying a text and a control for displaying an image. The view system may be configured to construct an application. A display interface may include one or more views.

For example, a display interface including an SMS message notification icon may include a text display view and an image display view.

The phone manager is configured to provide a communication function of the terminal device, for example, management of call statuses (including answering, declining, and the like).

The resource manager provides various resources such as a localized character string, an icon, an image, a layout file, and a video file for an application program.

The notification manager enables an application program to display notification information in a status bar, and may be configured to convey a notification message. The notification manager may automatically disappear after a short pause without requiring a user interaction. For example, the notification manager is configured to notify download completion, give a message notification, and the like. The notification manager may alternatively be a notification that appears in a top status bar of the system in a form of a graph or a scroll bar text, for example, a notification of an application that is run on a background, or may be a notification that appears on the screen in a form of a dialog window. For example, text information is displayed in the status bar, an announcement is given, the terminal device vibrates, or an indicator light blinks.

The Android runtime includes a kernel library and a virtual machine. The Android runtime is responsible for scheduling and management of the Android system.

The kernel library includes two parts: a function that needs to be called in Java language and a kernel library of Android.

The application layer and the application framework layer run on the virtual machine. The virtual machine executes java files of the application layer and the application framework layer as binary files. The virtual machine is configured to implement functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics AI engine module (for example, SGL).

The surface manager is configured to manage a display subsystem and provide fusion of 2D and 3D layers for a plurality of applications.

The media library supports playback and recording in a plurality of commonly used audio and video formats, and static image files. The media library may support a plurality of audio and video encoding formats such as Moving Picture Experts Group 4 (MPEG-4), MPEG-4 AVC Advanced Video Coding (AVC) or H.264, MPEG Audio Layer III (MP3), Advanced Audio Coding (AAC), Adaptive Multi-Rate (AMR), Joint Photographic Experts Group (JPG), and Portable Network Graphic (PNG).

The three-dimensional graphics processing library is used to implement three-dimensional graphics drawing, image rendering, composition, layer processing, and the like.

The 2D graphics AI engine module is a drawing AI engine module for 2D drawing.

The kernel layer is a layer between hardware and software. The kernel layer includes at least a display driver, a camera driver, an audio driver, and a sensor driver.

For ease of understanding, in the following embodiments of this disclosure, the terminal device having the structures shown in FIG. 1E and FIG. 1F is used as an example. For ease of description, and the following needs to relate to the solutions executed by the AI engine module, the terminal device-side AI engine module 21 deployed on the terminal device 201 is used as an example for description. A person skilled in the art may learn that the following solutions that can be executed by the AI engine module deployed on the terminal device side may also be executed by the AI engine module deployed on the cloud, or may be cooperatively executed by the AI engine module deployed on the terminal device side and the AI engine module deployed on the cloud (for example, the obtaining module 2121 of the terminal device 201 may collect user information, and upload the user information to the decision module 2222 of the cloud AI engine module through the network for decision). This is not limited in embodiments of this disclosure.

Figure 2A:
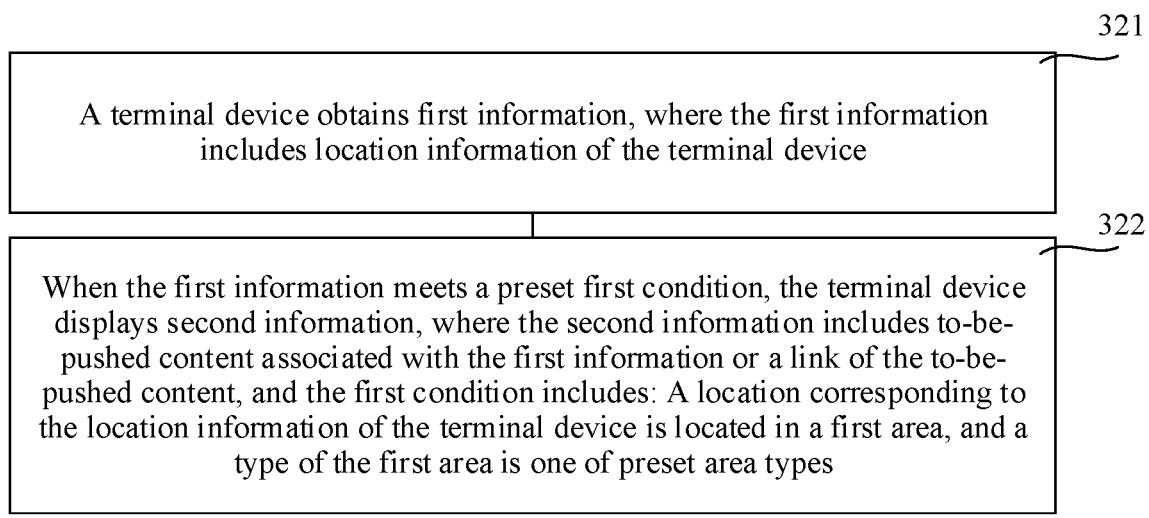
FIG. 2A is a schematic flowchart of a content pushing method according to an embodiment of this disclosure.

Based on the foregoing content, FIG. 2A is an example of a schematic flowchart of a content pushing method according to an embodiment of this disclosure. As shown in FIG. 2A, the method includes the following steps.

Step 321: A terminal device obtains first information, where the first information includes location information of the terminal device.

Step 322: When the first information meets a preset first condition, the terminal device displays second information, where the second information includes to-be-pushed content associated with the first information or a link of the to-be-pushed content, and the first condition includes: A location corresponding to the location information of the terminal device is located in a first area, and a type of the first area is one of preset area types.

Because the second information may be pushed based on the location information of the terminal device, a query step in a process in which a user actively queries the second information may be reduced. In this way, a quantity of times of entering a command by the user can be reduced, and a quantity of interactions between the user and the terminal device can be reduced.

In a possible implementation, when the type of the first area is a scenic spot, the second information includes a scenic spot guide of the first area. When it is determined that the location of the terminal device belongs to the scenic spot, the scenic spot guide is pushed to the user actively. For example, the scenic spot guide may be pushed to the user by using a MeeTime application. In this way, a step of querying the scenic spot guide by the user is reduced, and information related to a current situation of the user may be directly obtained.

In a possible implementation, the second information is from a first server. In a possible implementation, the terminal device sends a first request to the first server, where the first request is used to request to obtain the second information. The terminal device receives a first response, where the first response includes the second information. For example, if the first request is used to request to query the scenic spot guide of the scenic spot in which the terminal device is currently located, the first server returns the scenic spot guide of the scenic spot as the second information to the terminal device. In another possible implementation, querying the scenic spot guide may be understood as predicting an intent. To be specific, the terminal device predicts, based on the current location of the terminal device, that the user wants to query the scenic spot guide, and then sends the first request to the first server. In a possible implementation, it may also be understood that the first request is used to request the first server to execute a predicted intent, that is, the first server queries the scenic spot guide of the scenic spot, for example, may query the scenic spot guide of the scenic spot from a database, to return, to the terminal device as the second information, the scenic spot guide of the scenic spot obtained by executing the predicted intent. In a manner of querying the second information from the first server, storage space of the terminal device may be saved, and the second information with new content may be obtained.

In a possible implementation, the second information is from information prestored in the terminal device. In this way, a speed of obtaining the second information by the terminal device can be improved.

In a possible implementation, the terminal device may display the second information on a chat interface of the MeeTime application. In a possible implementation, the terminal device may predict an intent of the user based on the first information. In this embodiment of this disclosure, an intent of the user that is predicted actively based on information is referred to as a predicted intent. Further, the terminal device may send, to the first server, the first request used to request the first server to execute the predicted intent, and receive the first response returned by the first server. The first response includes the second information obtained after the first server executes the predicted intent. Then, a first message is sent to an interface module of the MeeTime application of the terminal device, so that the terminal device displays the second information on the chat interface of the MeeTime application. The predicted intent of the user may be determined based on the first information of the terminal device, and a result of executing the predicted intent may be displayed, so that a quantity of times of entering a command by the user can be reduced, and a quantity of interactions between the user and the terminal device can be reduced.

Figure 2B:
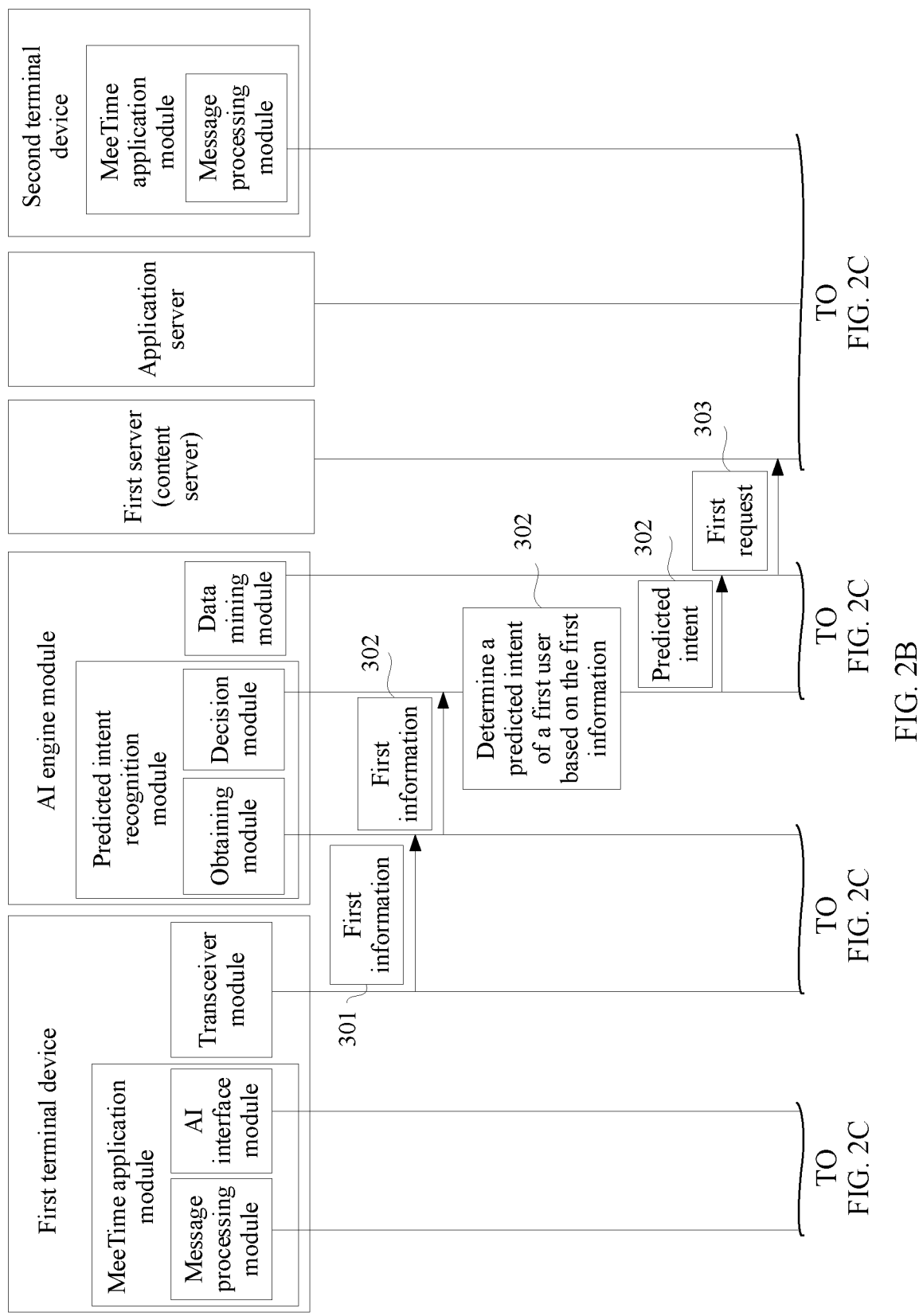
FIG. 2B and FIG. 2C are a schematic flowchart of a content pushing method according to an embodiment of this disclosure.
Figure 2C:
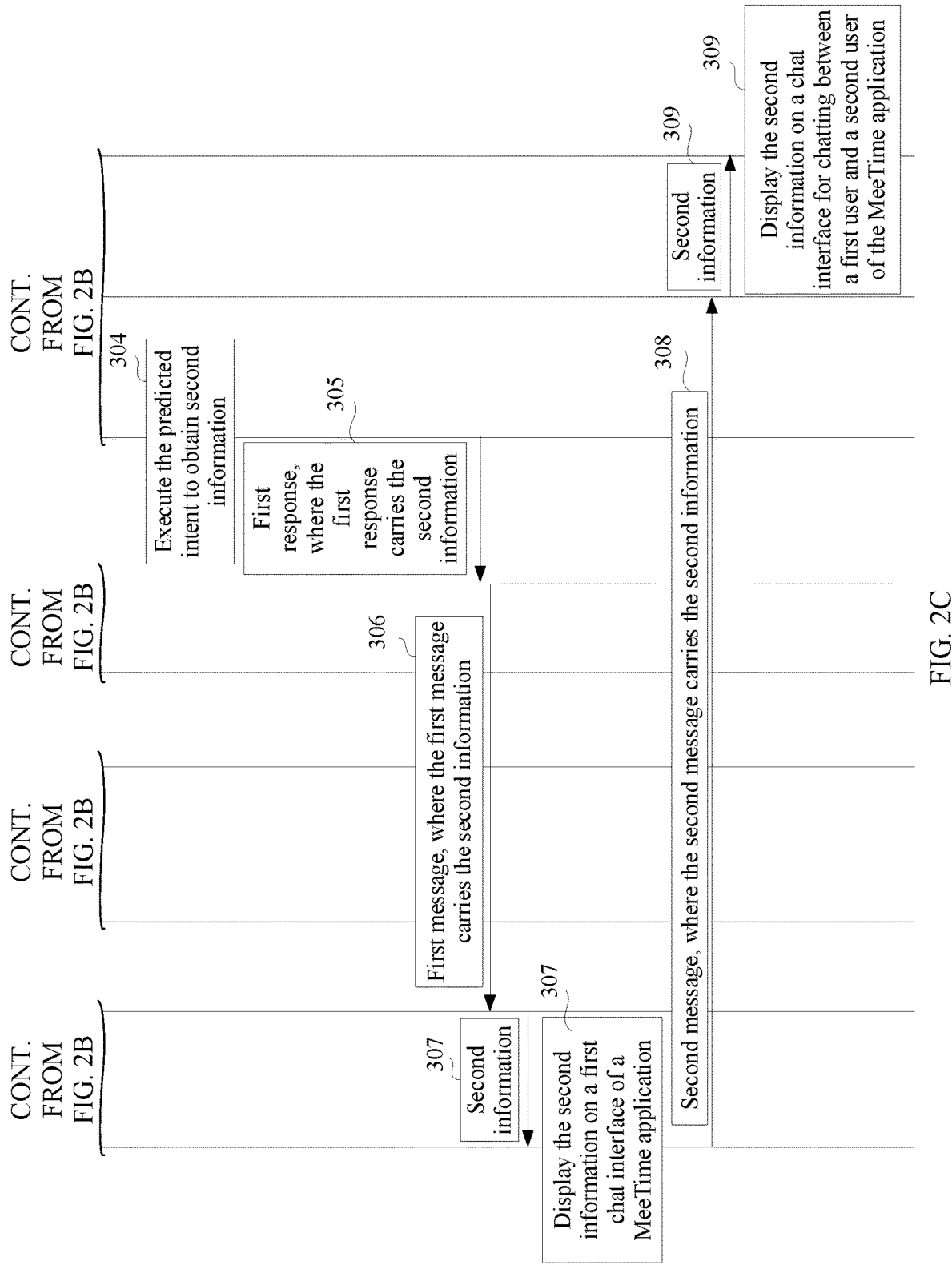

Based on the foregoing content, FIG. 2B and FIG. 2C are an example of a schematic flowchart of a content pushing method according to an embodiment of this disclosure. As shown in FIG. 2B and FIG. 2C, the method includes the following steps.

Step 301: An AI engine module obtains first information of a first terminal device.

In a possible implementation, a terminal device may send the first information of the first terminal device to the AI engine module by using a transceiver module.

The first terminal device in this embodiment of this disclosure may be the terminal device 201 in FIG. 1A to FIG. 1D. In a possible implementation, the AI engine module may be an AI engine module on the first terminal device side, and the AI engine module may collect the first information of the first terminal device. In another possible implementation, the AI engine module may be an AI engine module on a cloud, and the AI engine module may query the first information by sending a query request to the first terminal device.

In a possible implementation, the first information is information of a first type. In this implementation, one or more types of information may be preset, so that information of a specified type is obtained. For example, the preset types of information may include: location information of the terminal device, a chat record on a MeeTime application, a conference schedule, package delivery information, and the like. For example, if the information of the first type is the location information of the terminal device, the AI engine module may periodically obtain the location information of the terminal device.

Step 302: The AI engine module determines a predicted intent of a first user based on the first information.

In step 302, in a possible implementation, an obtaining module of the AI engine module may obtain the first information, and send the first information to a decision module, and the decision module determines the predicted intent of the first user based on the first information, and sends the predicted intent to a data mining module of the AI engine module.

In step 302, in a possible implementation, a correspondence among a message type, a preset condition, and an intent may be preset. The correspondence may be an association relationship among the information of the first type, a first preset condition, and a first intent, or may also be referred to as a mapping relationship among the information of the first type, the first preset condition, and the first intent. When determining, based on a preset correspondence between the information of the first type and the first preset condition, that the first information meets the first preset condition, the AI engine module determines the first intent as the predicted intent of the first user based on a preset correspondence between the first preset condition and the first intent.

In a possible implementation, in this embodiment of this disclosure, a correspondence between an intent and a slot is preset. When the first intent corresponds to a slot, a first slot corresponding to the predicted intent may be determined based on a preset correspondence between the first intent and the first slot, and content of the first slot is determined based on the first information.

For example, the information of the first type includes location information of the first terminal device. The first preset condition includes: Whether an area indicated by the information of the first type belongs to a scenic spot. The first intent includes: querying a scenic spot guide. The AI engine module may periodically obtain the location information of the terminal device. When determining that a location indicated by current location information of the terminal device belongs to a scenic spot, for example, Imperial Palace, the AI engine module predicts that an intent of the user is "querying the scenic spot guide", and determines that the first slot "place" is "the Imperial Palace".

It can be learned from the solutions of step 301 and step 302 that, in this embodiment of this disclosure, the AI engine module may predict the predicted intent of the user based on the obtained first information of the terminal device, and the user does not need to publish a user command. Therefore, a quantity of times of entering a command by the user can be reduced, and a quantity of interactions between the user and the terminal device can be reduced.

Step 303: The AI engine module sends a first request to a first server, where the first request is used to request the first server to execute the predicted intent.

Correspondingly, the first server receives the first request.

In step 303, the first server may be the content server in FIG. 1A to FIG. 1C, for example, may be the content server 232. The AI engine module may determine a service provided by each content server, and then query, from a corresponding content server, required content based on a service that needs to be queried. In a possible implementation, the first request may be sent by the data mining module in the AI engine module.

Step 304: The first server executes the predicted intent to obtain second information.

In step 304, if the predicted intent corresponds to the first slot, the server may execute the predicted intent based on the content of the first slot, to obtain the second information. The second information is obtained after the first server executes the predicted intent, and the predicted intent is obtained based on the first information.

Step 305: The first server sends a first response to the AI engine module, where the first response carries the second information.

Correspondingly, the AI engine module receives the first response returned by the first server, where the first response may be received by the data mining module of the AI engine module.

Step 306: The AI engine module sends a first message to an interface module of the MeeTime application of the first terminal device, where the first message carries the second information. The first message is used to enable the first terminal device to display the second information on a first chat interface of the MeeTime application.

In step 306, in a possible implementation, the first message may be sent by the data mining module of the AI engine module to the AI interface module integrated into the MeeTime application.

Correspondingly, the first terminal device receives the first message by using the AI interface module integrated into the MeeTime application.

Step 307: The first terminal device displays the second information on the first chat interface of the MeeTime application.

The MeeTime application may be installed on the first terminal device, and the MeeTime application is integrated with the artificial intelligence AI interface module. As shown in FIG. 1D, the AI interface module 252 is integrated into an application module 25 of the MeeTime application on the terminal device 201. The application module 25 of the MeeTime application further includes a message processing module 251, and the message processing module 251 may be configured to receive and send a message of the MeeTime application. The AI interface module 252 is configured to performing message sending and receiving with the AI engine module.

Because the AI interface module is integrated into the application module of the MeeTime application, the data mining module of the AI engine module may send the first message to the AI interface module integrated into the application module of the MeeTime application of the first terminal device. Then, the AI interface module sends the second information in the received first message to the message processing module 251, and the second information is displayed on a chat interface of the MeeTime application by using the message processing module 251.

In a possible implementation, the first terminal device may render the received second information, to display the second information in a form of a card on a chat interface of the first terminal device. In a possible implementation, the first terminal device may include a rendering module. The AI interface module sends the second information to the rendering module, and the rendering module may render the received second information based on a preset rendering module, to obtain third information, and return the third information to the AI interface module. Further, the third information is received from the AI interface module by using the message processing module of the MeeTime application, and the third information is obtained by rendering the second information.

In a possible implementation, the first chat interface is a chat interface for chatting between a smart assistant and the first user. The first user is a user that logs in to the MeeTime application of the first terminal device.

In another possible implementation, the first chat interface is a chat interface for chatting between the first user and a second user. The second user is a user that logs in to the MeeTime application of a second terminal device. For example, the first information may include a chat record on the first chat interface of the MeeTime application. The AI engine module may determine the predicted intent of the first user based on the chat record on the first chat interface. In this implementation, after step 307, step 308 is further included.

Step 308: When the first chat interface is a chat interface for chatting between the first user and the second user, the first terminal device sends a second message to a server of the MeeTime application, where the second message carries the second information, and the second message is used to enable the server of the MeeTime application to transmit the second information to the second terminal device.

Step 309: After the server of the MeeTime application transmits the second information to the second terminal device, the second terminal device displays the second information on the chat interface for chatting between the first user and the second user of the MeeTime application.

When the third information obtained after rendering needs to be displayed on the first chat interface, step 308 may also be replaced with the following content:

When the first chat interface is a chat interface for chatting between the first user and the second user, the first terminal device sends a second message to a server of the MeeTime application, where the second message carries the third information, and the second message is used to enable the server of the MeeTime application to transmit the third information to the second terminal device. Then, the second terminal device displays the third information on the chat interface for chatting between the first user and the second user of the MeeTime application. In the foregoing step 308 and step 309, two users are merely examples. The first chat interface may further be a chat interface among three or more users. In this way, the third information may be transmitted to a terminal device of each member participating in chatting on the first chat interface by using the server of the MeeTime application, so that all members participating in chatting on the first chat interface can view the third information.

It can be learned from the foregoing content that, in this embodiment of this disclosure, because predicted intent of the user may be determined based on the first information of the terminal device, and a result of executing the predicted intent may be displayed, so that a quantity of times of entering a command by the user can be reduced, and a quantity of interactions between the user and the terminal device can be reduced. According to another aspect, in this disclosure, because an intent of the user may be predicted actively and displayed based on the first information of the terminal device, the user does not need to actively wake up the smart assistant. In this way, a quantity of interactions between the user and the terminal device can be further reduced. In addition, the smart assistant is integrated into a system layer, and the user does not need to add the smart assistant in the MeeTime application. According to a third aspect, a result obtained after a predicted intent is executed may be displayed on a chat interface of the MeeTime application, so that technologies of the smart assistant and the MeeTime application program can be better integrated, and information can be shared more conveniently and quickly between group users. According to a fourth aspect, in this embodiment of this disclosure, the data mining module of the AI engine module may search for a corresponding content server based on an intent, to obtain corresponding content from the content server. In other words, the smart assistant in this embodiment of this disclosure may query a plurality of types of information, for example, may query weather information, or may query epidemic information. The user does not need to add various types of robots to a group, and the user can query various types of information by using only Celia. In this way, user operations can be further simplified.

In the method provided in FIG. 2B and FIG. 2C, the user does not need to enter a user command, but the smart assistant actively pushes information that may be required by the user. In this embodiment of this disclosure, several manners of waking up the smart assistant may be preset. The user wakes up the smart assistant in the preset manner in the MeeTime application, and sends a user command. After obtaining the user command, the AI engine module may recognize a target intent of the user by using a target intent recognition module, fill a slot by using the data mining module, query for corresponding content in a server, and return the queried content to the terminal device by using the data mining module.

In another possible implementation, a manner of sending a user command by the user may be: subscribing to a service in a group, for example, subscribing to a service of querying a weather forecast of Shanghai. In a possible implementation, reminder time may be set, for example, 9:00 a.m. In this case, the AI engine module may determine that the target intent of the user is: querying a weather condition at 9:00 a.m. every day, and the slot "place" is "Shanghai". In this case, the data mining module of the AI engine module may send a query result to the terminal device, so that the terminal device displays the information in a group in which the information is subscribed to.

According to the solutions provided in this embodiment of this disclosure, the user may query the smart assistant for all-round life and work information, which includes but not limited to: convenient life, business finance, education, food, game, health, smart home, children and families, local services, images, vocal music, news reading, native applications & settings, shopping, social communication, sports, travel, transportation, Q&A search, weather, and the like. Queried content, namely, a query result, is transmitted to the chat interface in a form of a card by using a system of the MeeTime application, to provide smart experience.

According to the solutions provided in this embodiment of this disclosure, a separate session between the user and the smart assistant is also provided. As a resident smart assistant, the smart assistant can perform smart scene recognition, and recommend a scenario-based service, which includes but not limited to: flight and train, weather warning, birthday reminder, schedule and conference reminder, credit card repayment, package delivery reminder, scenic spot information recommendation (travel assistant), fitness and health data, and the like. Content recommended by the smart assistant may be displayed on a separate chat interface for chatting between the user and the smart assistant, or may be displayed on a chat interface of a group in which the recommended services are subscribed to.

The following describes several application scenarios provided in this embodiment of this disclosure with reference to the accompanying drawings. In this embodiment of this disclosure, an example in which a smart assistant is referred to as "Celia" is used for description. In actual application, the smart assistant may also have another name.

The following content involves scenarios 1, 2, and 3. In the scenario 1, when determining, based on obtained location information of a terminal device, that a user is visiting a scenic spot, the smart assistant actively pushes a scenic spot guide to the user. In the scenario 2, when the smart assistant infers, based on an obtained chat record on the terminal device, that the user wants to watch a movie, the smart assistant actively pushes cinema information to the user. In the scenario 3, when two users need to query a nearby cinema during a conversation, the users can directly @Celia to query the surrounding cinema. In the three scenarios, Celia displays to-be-displayed information on a chat interface of the MeeTime application, so that the smart assistant can be closely integrated with a MeeTime application. FIG. 3A to FIG. 7C are schematic diagrams of several interfaces of the terminal device according to an embodiment of this disclosure. The following describes the scenario 1 with reference to FIG. 3A to FIG. 4C, describes the scenario 2 with reference to FIG. 5A to FIG. 5F, and describes the scenario 3 with reference to FIG. 6A to FIG. 7C.

Scenario 1: When determining, based on obtained location information of the terminal device, that the user is visiting a scenic spot, the smart assistant actively pushes a scenic spot guide to the user.

In a possible implementation, the terminal device may display second information on a chat interface of the MeeTime application of a first user, where the first user is a user that logs in to the MeeTime application on the terminal device. In a possible implementation, the smart assistant is integrated into the MeeTime application. The smart assistant may be displayed in contact information of the MeeTime application. In this case, the second information may be displayed on a first chat interface of the MeeTime application of the terminal device. The second information is displayed on the first chat interface as chat content sent by the smart assistant. It may be learned that the smart assistant performs humanization processing in the MeeTime application. The user may chat with the smart assistant by using the MeeTime application, and the terminal device may actively push the second information as the smart assistant. According to another aspect, in this disclosure, the user does not need to actively wake up the smart assistant. In this way, a quantity of interactions between the user and the terminal device can be further reduced.

The following describes the scenario 1 with reference to the accompanying drawings.

FIG. 1D is used as an example for description. The terminal device-side AI engine module 21 is deployed on the terminal device 201. An example in which the terminal device-side AI engine module 21 performs a related solution is used for description. The obtaining module 2121 of the predicted intent recognition module 212 may obtain the location information of the user, and determine, based on a preset rule, whether the location information of the user belongs to a scenic spot. Information about the scenic spot may be preset. If the location information of the user matches the preset information about the scenic spot, it is determined that the user is currently in the scenic spot. If the decision module 2122 in FIG. 1C determines that a predicted intent of the user is "querying a scenic spot guide", and content of a slot "place" of the predicted intent is "the Imperial Palace", the data mining module 213 in FIG. 1C may send a query request to the content server, where the query request is used to query the scenic spot guide of the Imperial Palace. The data mining module 213 receives a query response returned by the content server, where the query response carries the scenic spot guide of the Imperial Palace. The data mining module 213 may send the scenic spot guide of the Imperial Palace to the application module 25 of the MeeTime application by using the AI interface module 252 in FIG. 1D. The scenic spot guide of the Imperial Palace received by the AI interface module 252 is in a text form, and may be sent to the rendering module 253 for rendering and drawing. In an optional implementation, several templates are preset on the terminal device side. For example, a template of a scenic spot guide may be preset. The rendering module 253 processes the text form of the scenic spot guide of the Imperial Palace in combination with the template of a scenic spot guide, to obtain a rendered scenic spot guide of the Imperial Palace, and returns the rendered scenic spot guide to the AI interface module 252. The AI interface module 252 returns the obtained scenic spot guide of the Imperial Palace to the message processing module 251. The message processing module 251 sends a message to the terminal device of the user in the MeeTime application as Celia.

Figure 3A:
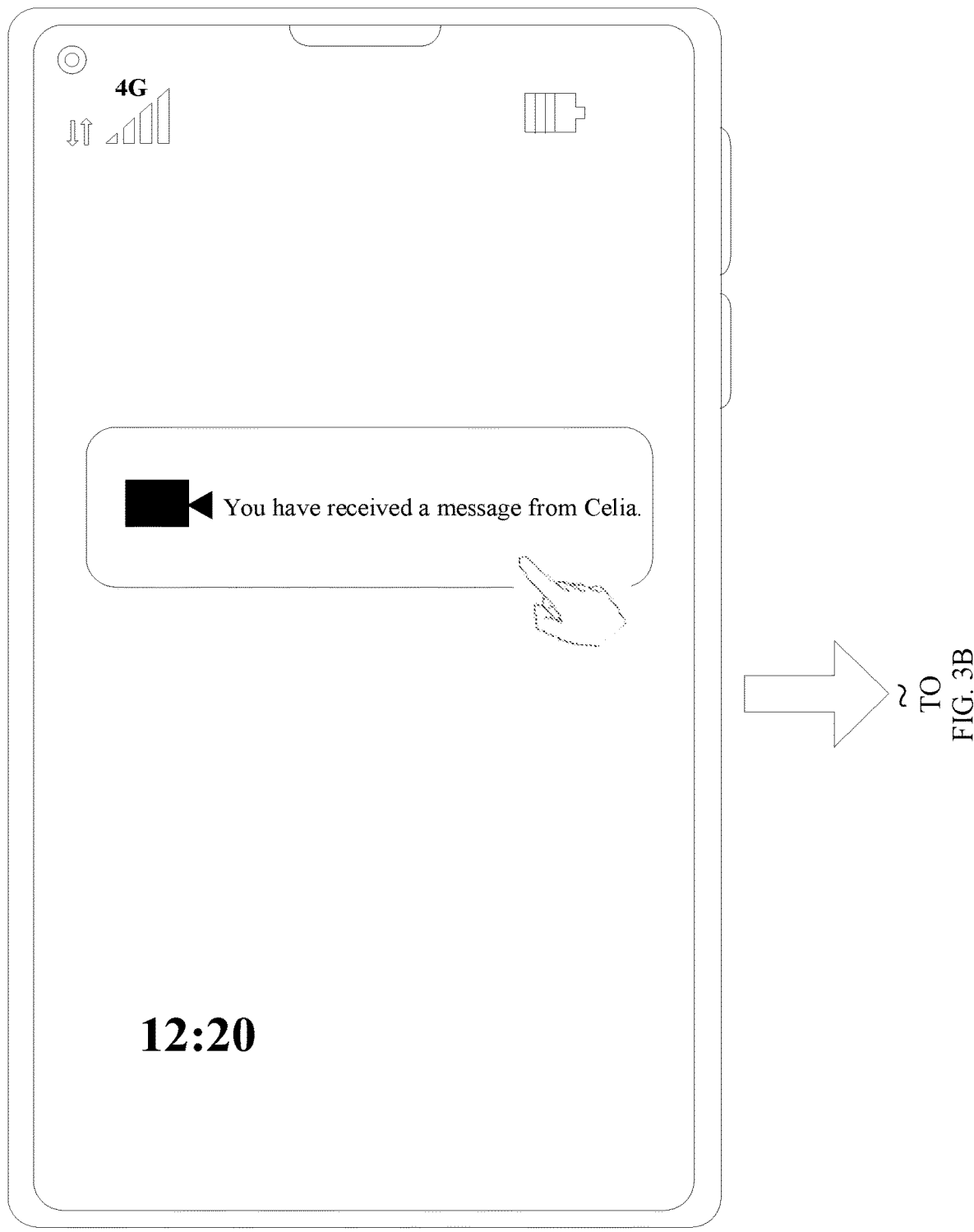
FIG. 3A is a schematic diagram of an interface of a terminal device applicable to scenario 1 according to an embodiment of this disclosure.
Figure 3B:
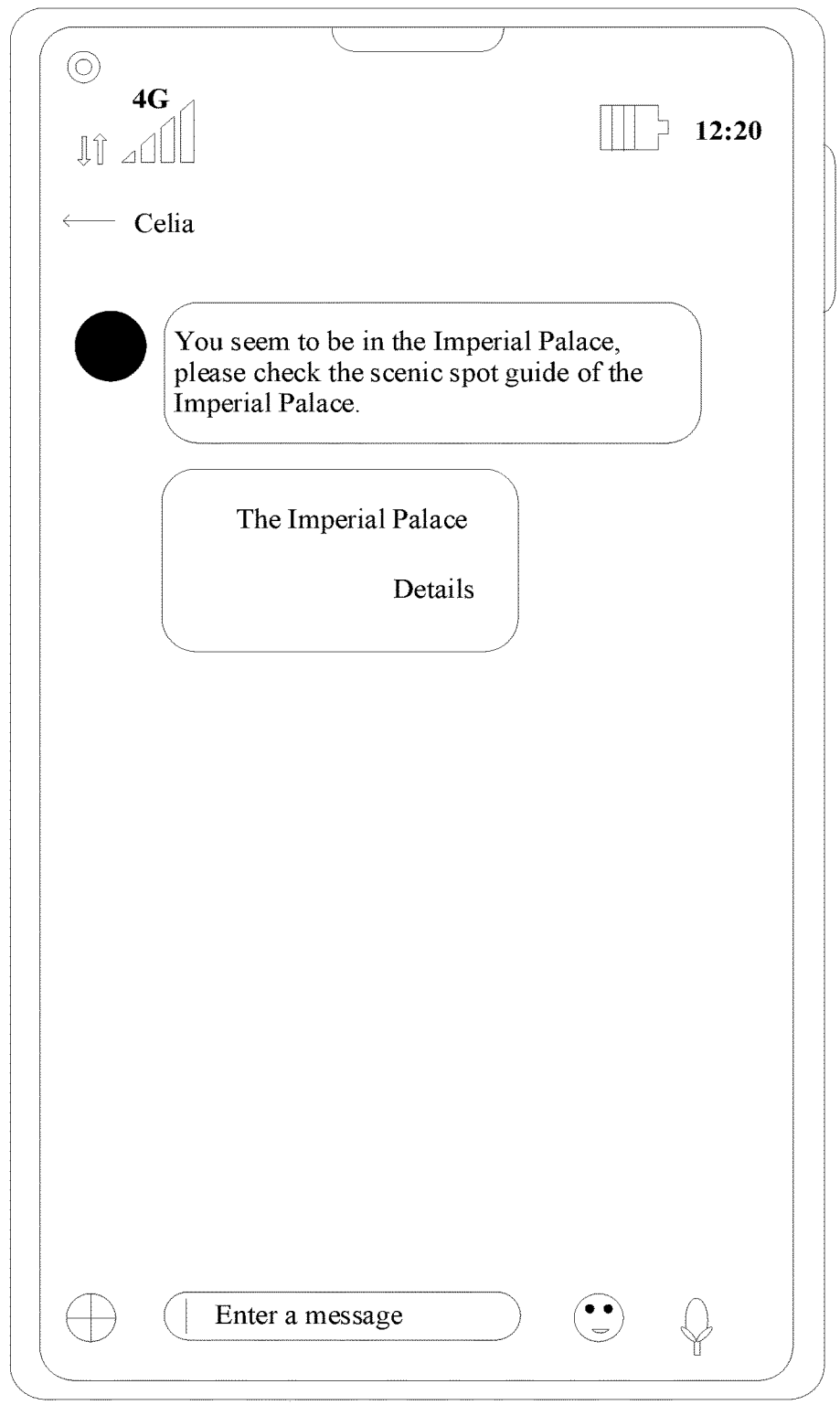
FIG. 3B is a schematic diagram of another interface of a terminal device applicable to scenario 1 according to an embodiment of this disclosure.

FIG. 3A is a schematic diagram of an interface on which a message from Celia is received when the terminal device of the user is in a lock screen mode. As shown in FIG. 3A, content "You have received a message from Celia" is displayed on a lock screen of the terminal device of the user, and the message may carry some identifiers, for example, an icon of the MeeTime application app, so that the user can know that the message is a message received from Celia by using the MeeTime application app. The user may directly tap the message, and in response to the tap operation of the user, the terminal device may open the MeeTime application, and display a schematic diagram of an interface for a one-to-one chat between the user and Celia. The schematic diagram of the interface may be shown in FIG. 3B. The scenic spot guide of the Imperial Palace actively pushed by Celia may be viewed on the interface.

In a possible implementation, the scenic spot guide pushed by Celia may be displayed in a form of a card. If the user needs to view detailed information, the user may tap an area of "Details" shown in FIG. 3B.

Figure 3C:
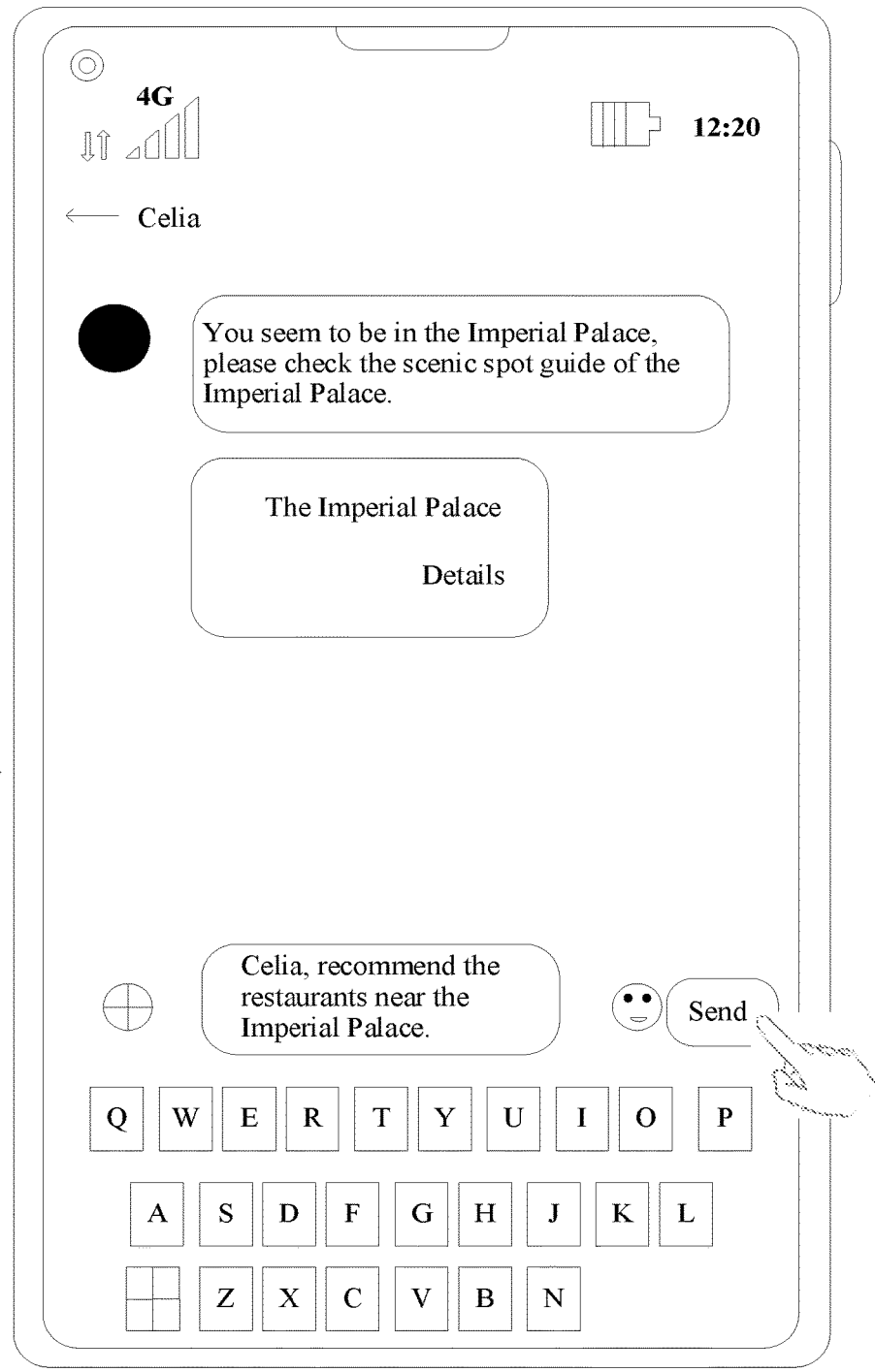
FIG. 3C is a schematic diagram of another interface of a terminal device applicable to scenario 1 according to an embodiment of this disclosure.
Figure 3D:
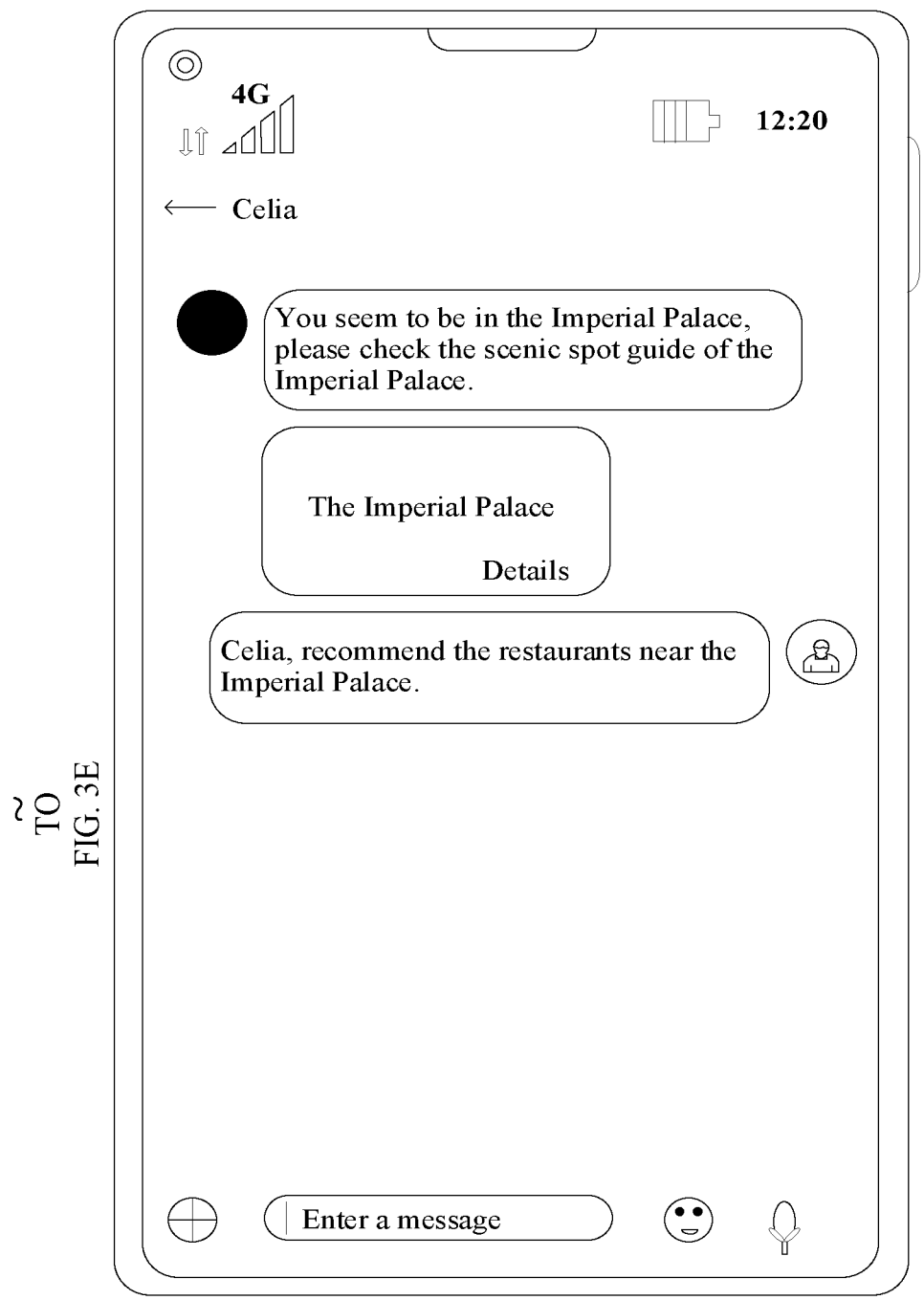
FIG. 3D is a schematic diagram of another interface of a terminal device applicable to scenario 1 according to an embodiment of this disclosure.

Further, the user may also actively send a command to Celia. As shown in FIG. 3C, the user may send a user command "Celia, recommend a restaurant near the Imperial Palace" to Celia on the one-to-one chat interface for chatting between the user and Celia. FIG. 3C is a schematic diagram of an interface of editing a user command by the user. After the user taps a "send" button on the interface, a schematic diagram of an interface of the terminal device is shown in FIG. 3D.

Figure 3E:
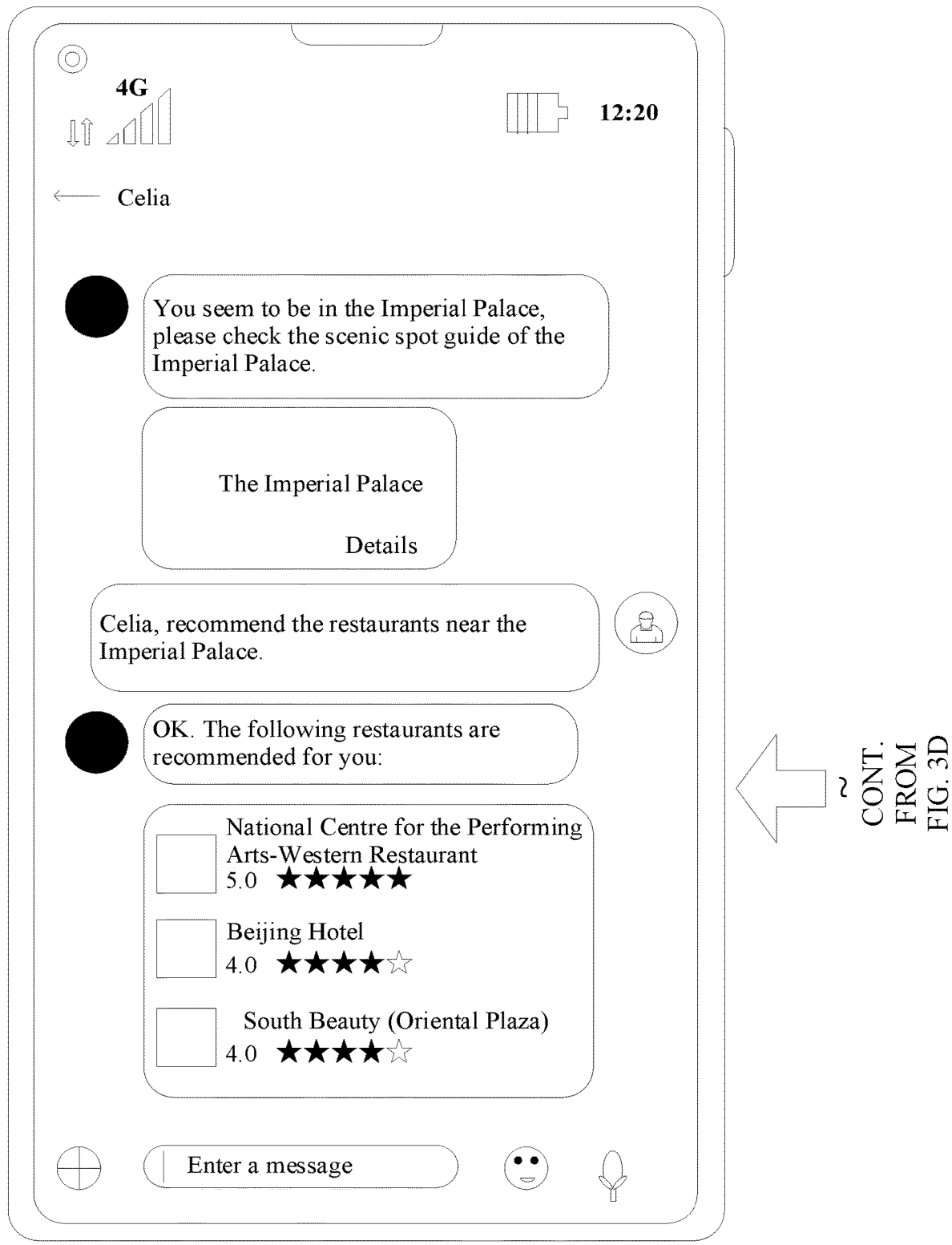
FIG. 3E is a schematic diagram of another interface of a terminal device applicable to scenario 1 according to an embodiment of this disclosure.

Because the user sends the user command "Celia, recommend a restaurant near the Imperial Palace", the target intent recognition module 211 in the AI engine module may obtain the user command by using the distribution module 2111, and determine, by using the natural language understanding module 2112, that a target intent is "querying a restaurant". In addition, slot matching is performed by using the data mining module 213, and a slot "place" is filled with "the Imperial Palace". The data mining module 213 may query the content server for restaurants near the Imperial Palace, and return an obtained result to the MeeTime application by using the AI interface module 252. After rendering the obtained result, the rendering module 253 displays the found restaurants near the Imperial Palace as Celia, as shown in FIG. 3E. After rendering, the restaurants near the Imperial Palace may be displayed in a form of cards. Names, pictures, and scores of the restaurants may be displayed on the chat interface. If the user needs to know more detailed content of a restaurant, the user may tap an area to which a name of the restaurant belongs. In response to the tap operation, the terminal device displays detailed information of the restaurant, including information such as an address, a phone number, a specialty dish, and a user comment of the restaurant.

Figure 4A:
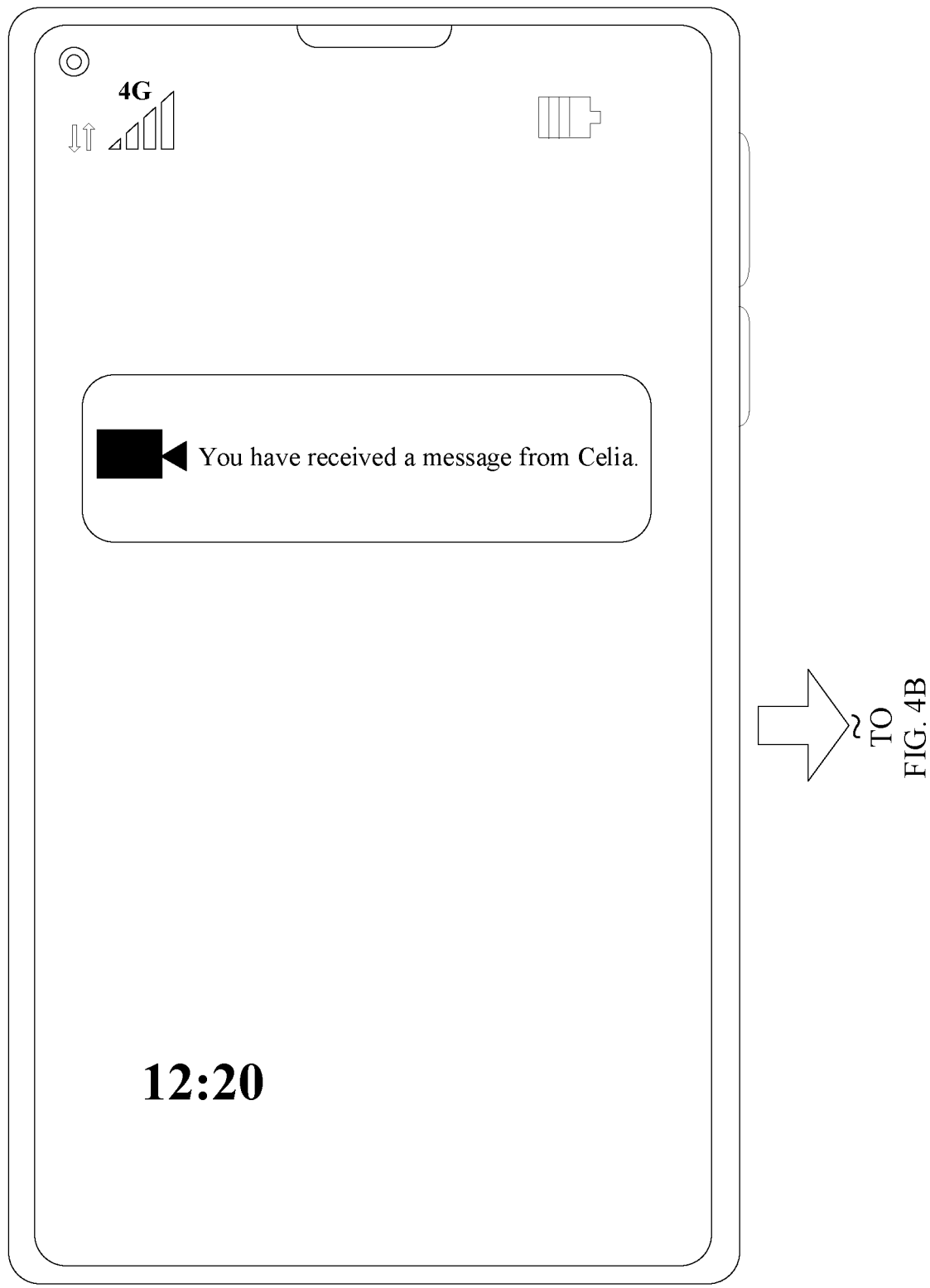
FIG. 4A is a schematic diagram of another interface of a terminal device applicable to scenario 1 according to an embodiment of this disclosure.
Figure 4B:
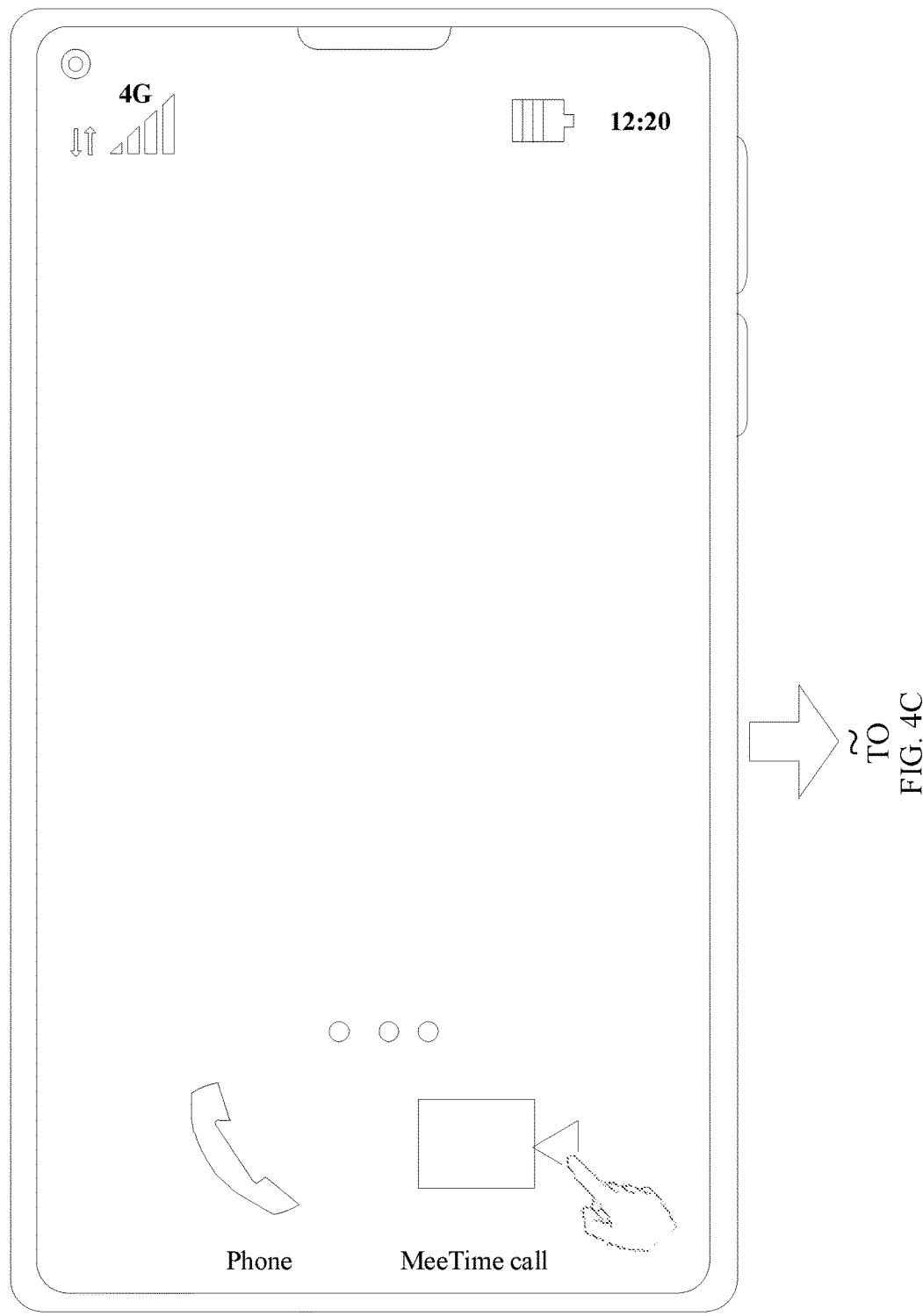
FIG. 4B is a schematic diagram of another interface of a terminal device applicable to scenario 1 according to an embodiment of this disclosure.
Figure 4C:
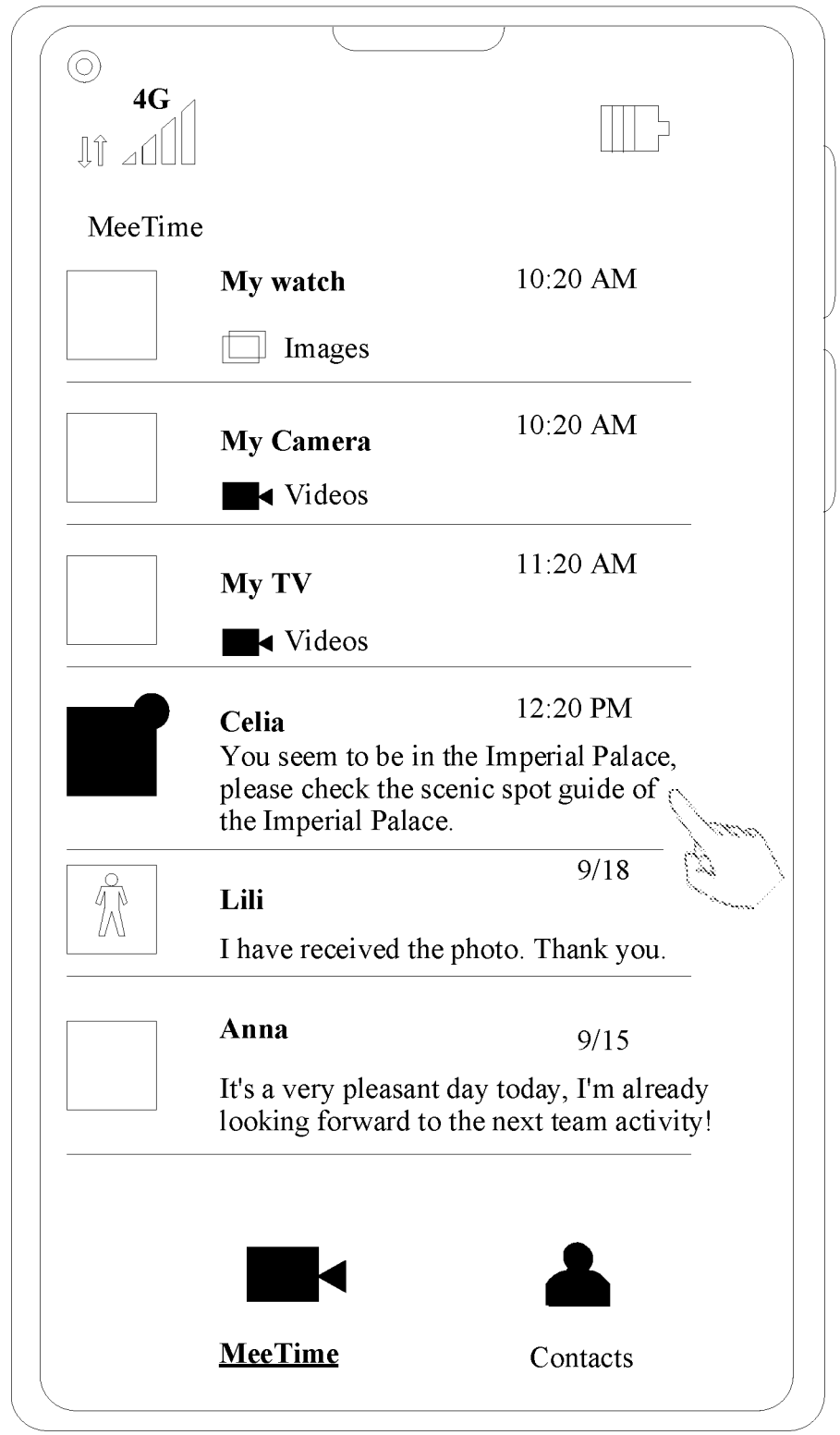
FIG. 4C is a schematic diagram of another interface of a terminal device applicable to scenario 1 according to an embodiment of this disclosure.

In scenario 1, in FIG. 3A, the user may directly tap the notification message on the lock screen, to directly open the one-to-one chat interface for chatting between the user and Celia of the MeeTime application. An embodiment of this disclosure may further provide a method for opening the one-to-one chat interface for chatting between the user and Celia by the user. As shown in FIG. 4A, "You have received a message from Celia" is displayed on the lock screen, and the user may unlock the terminal device. An unlocking manner may be fingerprint unlocking, facial recognition unlocking, password unlocking, or the like, and the manner is not limited. FIG. 4B is a schematic diagram of an interface displayed after the terminal device is unlocked. As shown in FIG. 4B, the interface of the terminal of the user may include a plurality of applications, and the figure shows only an application used for making a call and the MeeTime application. In actual application, there may be another application. This is not limited in this embodiment of this disclosure. In response to an operation of tapping the MeeTime application app by the user, the terminal device may open the MeeTime application app. A schematic diagram of an interface is shown in FIG. 4C. It can be seen from FIG. 4C that, recently contacted contacts are displayed on a tab of the MeeTime Application, and the last contacted contact may be displayed on the top. As shown in FIG. 4C, all content or a part of content of the last message on a chat interface for chatting with each contact may be further displayed next to each contact. As shown in FIG. 4C, when there is a new message, there may be some identifiers on a profile picture or a name of a contact, for example, there may be a small black dot or a small bubble. This is not limited in this embodiment of this disclosure. The identifier is merely used to prompt the user that there is a new unread message. In a possible implementation, a message session of Celia may be fixedly displayed on the tab of the MeeTime application. As shown in FIG. 4C, the message session of Celia is displayed on the tab of the MeeTime application. The user may tap a "Celia" option on the interface shown in FIG. 4C, and in response to the operation, the terminal device opens the one-to-one chat interface for chatting between the user and Celia shown in FIG. 3B.

In a possible implementation, a chat interface of the MeeTime application further includes a third chat interface for chatting between a first user and a second device, and the second device is one of a smartphone, a smart screen, a smart speaker, a smart band, or a tablet computer. The method further includes: The first user sends third information on the third chat interface, and the terminal device sends the third information to the second device, to display the third information on a display of the second device. For example, if the terminal device is a smartphone of the user, the user may add another device, such as a smart screen, a smart speaker, or a smart band, to the MeeTime application by using the MeeTime application. When the user wants to display information on the smart screen, the user may open a chat interface for chatting with the smart screen by using the MeeTime application of the smartphone, and send information such as a picture on the chat interface, to implement projection. It can be learned that a projection solution in this manner is simple, for the user, it is similar to a chat with the smart screen. This can simplify user operations.

For example, the user may add, to an instant messaging app in the MeeTime application, a device that has a communication function, such as a smartphone, a smart screen, a smart speaker, a smart band, a tablet computer, a smart watch, a smart television, a smart camera, and a smart speaker, of the user. Refer to the interface diagram of the terminal shown in FIG. 4C. As shown in FIG. 4C, when the instant messaging app is the MeeTime application app, the user may add a device such as a smart watch, a smart television, or a smart camera to the MeeTime application app, and the user may share content such as a video, a picture, and audio with another device by using the MeeTime application app. For example, the user opens the MeeTime application app on a mobile phone, and the user opens a chat interface for chatting with "My TV" by using the MeeTime application app. The user may send content such as a video, a picture, or a text on the chat interface, and the sent content may be displayed on a screen of a smart TV corresponding to "My TV" in real time. It can be learned that, in this embodiment of this disclosure, the MeeTime application app can implement instant communication between terminal devices, and this manner can simplify a manner of sharing information between devices.

For scenario 1, there is another possible implementation.

Refer to the foregoing content in scenario 1. When determining, based on the obtained location information of the terminal device, that the user is visiting the scenic spot, the smart assistant actively pushes the scenic spot guide to the user. Specifically, as shown in FIG. 3A to FIG. 3E, the terminal device displays the second information on a chat interface for chatting with the user as Celia.

In another possible implementation, the MeeTime application includes at least one chat group. The terminal device determines a first chat group that meets a preset second condition. The terminal device displays the second information on a chat interface of the first chat group.

Further, in a possible implementation, the terminal device may send a second request to a second server, where the second request carries the second information, and the second request is used to request the second server to display the second information on terminal devices on which N second users log in. In this way, the N second users may view the second information on the devices on which the N second users log in. In a possible implementation, the terminal devices on which the N second users log in include at least one of the following content: a smartphone, a smart screen, a smart speaker, a smart band, and a tablet computer. In this way, a large quantity of terminal device types can be compatible.

In a possible implementation, the second condition includes at least one of the following content: members of the first chat group include a first user and N second users, where a distance between each second user of M second users of the N second users and the first user is not greater than a distance threshold, N is a positive integer greater than 1, M is a positive integer not greater than N, and a ratio of M to N is not less than a preset value; subscription information corresponding to the first chat group includes a type of the second information; a chat record of the first chat group within a preset time period relates to a first area; and a tag value of the first chat group matches the type of the second information.

When the second condition includes: the members of the first chat group include the first user and the N second users, the distance between each second user of the M second users of the N second users and the first user is not greater than the distance threshold, where N is a positive integer greater than 1, M is a positive integer not greater than N, and the ratio of M to N is not less than the preset value, in a possible implementation, the preset value may be set to 50%. It can be seen that, if locations of at least half of second users in one group are close to a location of the first user, it may be predicted that most people in the group are in a same scenario. In this case, information may be directly pushed to a chat interface of the chat group, so that all members of the chat group can view the information. This saves an operation of sending the second information to another user separately. In this way, a quantity of interactions between the user and the terminal device can be further reduced.

When the second condition includes: the subscription information corresponding to the first chat group includes the type of the second information, because the user subscribes to the type of the second information in the first chat group, when obtaining the second information, the terminal device may push the second information to the first chat group. For example, a scenic spot guide is subscribed to in the first chat group, and when the second information is a scenic spot guide of the Imperial Palace, the second information is pushed to the first chat group. For another example, health data is subscribed to in the first chat group, and when health data of a user in the first chat group is obtained, the health data is pushed in the first chat group. The health data may be, for example, a heartbeat and a blood pressure value of a user, or may be a user health report obtained by analyzing data such as the heartbeat and the blood pressure of the user.

When the second condition may include: the chat record in the preset time period of the first chat group relates to the first area, in a possible implementation, the terminal device may autonomously obtain the chat record in the first chat group, and then perform semantic analysis on the chat record, to determine whether a word related to the first area appears in the chat record in the preset time period of the first chat group. If yes, it may be inferred that most members in the first chat group may be located in the first area. Based on this, the second information may be pushed in the first chat group. This further reduces a quantity of interactions between the user and the terminal device.

When the second condition includes: the tag value of the first chat group matches the type of the second information, for example, a chat group in the MeeTime application may have a tag value, and the tag value may display a social relationship between members of the group. For example, the tag value may be a family group, a work group, a tour pal group, or the like. The tag value may be entered by the user, or may be inferred based on chat content between the members, or may be inferred based on the social relationship between the members. When a tag value of a group matches a type of information, the information may be suitable for being published to the group. For example, if a type of information is health data of a family member, the information may be pushed to a chat group of a family group. For another example, when a type of information is a scenic spot guide, the information may be pushed to a tour pal group. A type of information that matches a tag value of a chat group may be preset.

In scenario 2, when the smart assistant infers, based on an obtained chat record on the terminal device, that the user wants to watch a movie, the smart assistant actively pushes cinema information to the user.

In this embodiment of this disclosure, in a possible implementation, the terminal device autonomously obtains a chat record in the MeeTime application, analyzes the chat record to predict a predicted intent of the user, and displays, based on the predicted intent by using the MeeTime application, to-be-pushed content or a link of the to-be-pushed content associated with the predicted intent. In this implementation, the chat record in the MeeTime application may be autonomously analyzed, to predict the predicted intent of the user, and then content is pushed. It can be learned that, in this solution, the user does not need to actively wake up the smart assistant to query the smart assistant. In this solution, a quantity of times of entering a command by the user can be reduced, and a quantity of interactions between the user and the terminal device can be reduced.

In a possible implementation, the MeeTime application includes one or more chat groups, and one chat group includes at least two users. The terminal device may obtain a chat record in the chat group, analyze the chat record, predict a predicted intent of a user, and then push content or a link of the content on a chat interface of the chat group as the smart assistant. In this way, information actively pushed by the smart assistant may be viewed by each user in the group, so that communication between the two users in the group can be reduced.

The following describes scenario 2 with reference to FIG. 5A to FIG. 5F.

Figure 5A:
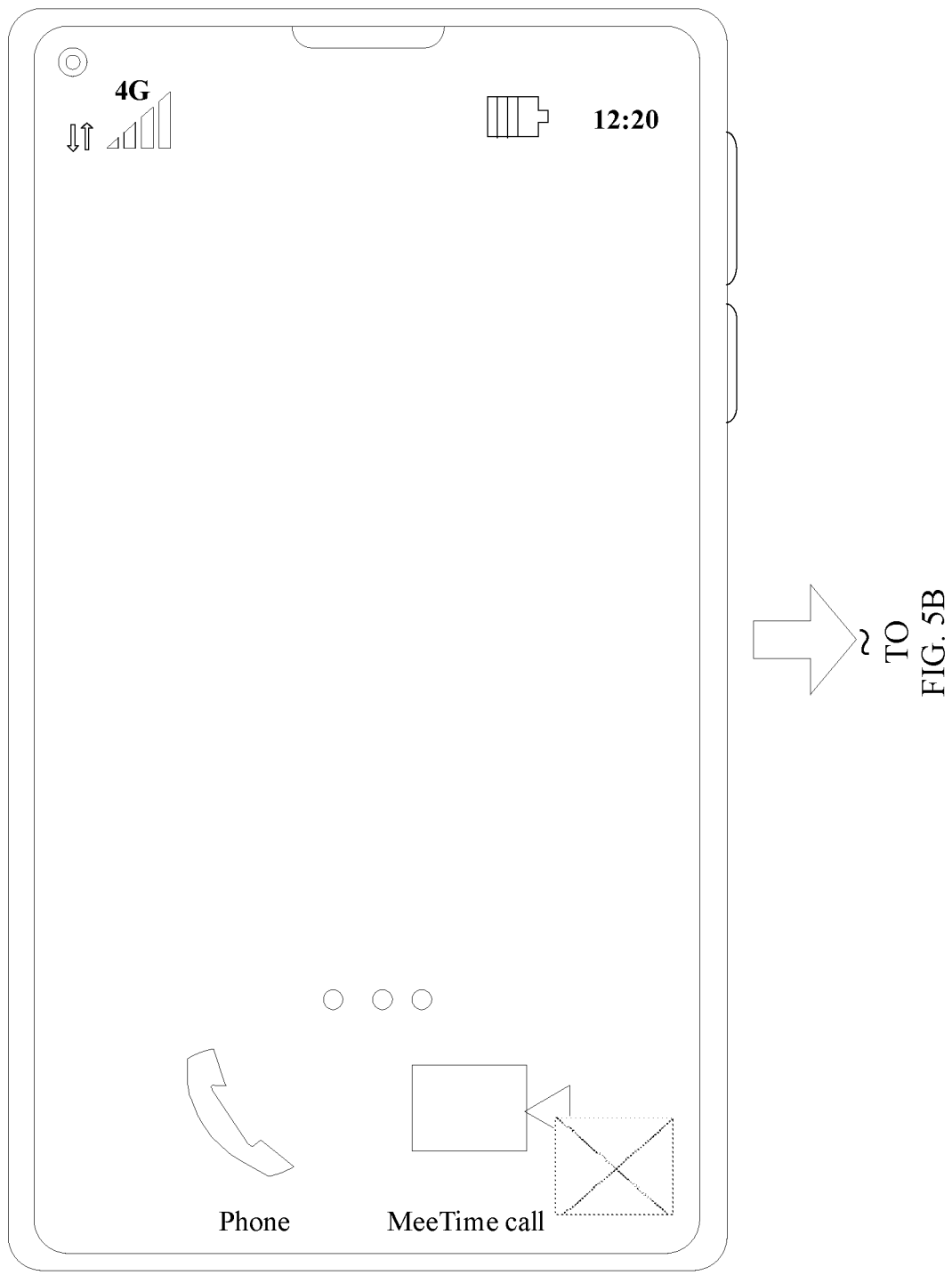
FIG. 5A is a schematic diagram of an interface of a terminal device applicable to scenario 2 according to an embodiment of this disclosure.
Figure 5B:
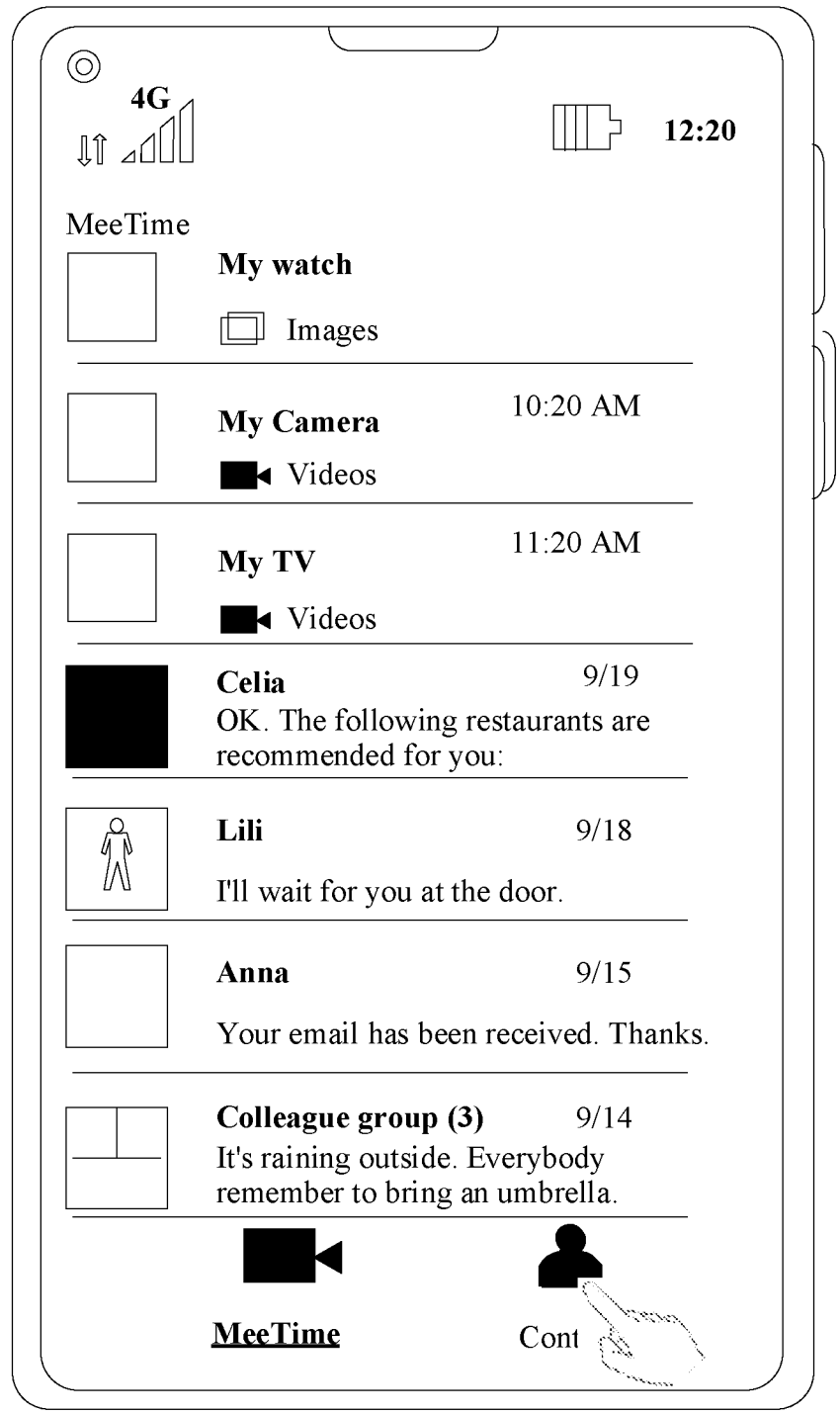
FIG. 5B is a schematic diagram of another interface of a terminal device applicable to scenario 2 according to an embodiment of this disclosure.
Figure 5C:
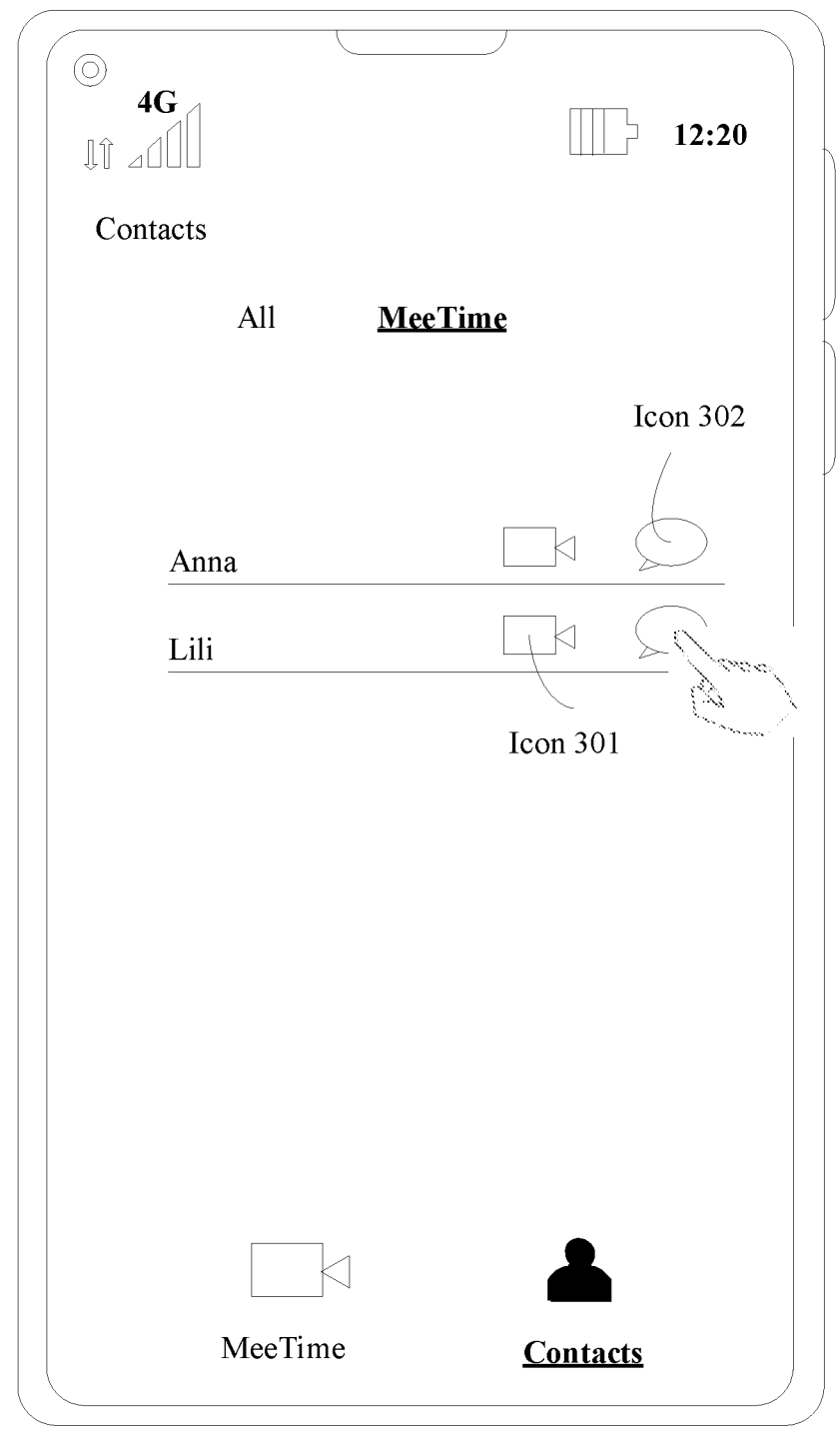
FIG. 5C is a schematic diagram of another interface of a terminal device applicable to scenario 2 according to an embodiment of this disclosure.
Figure 5D:
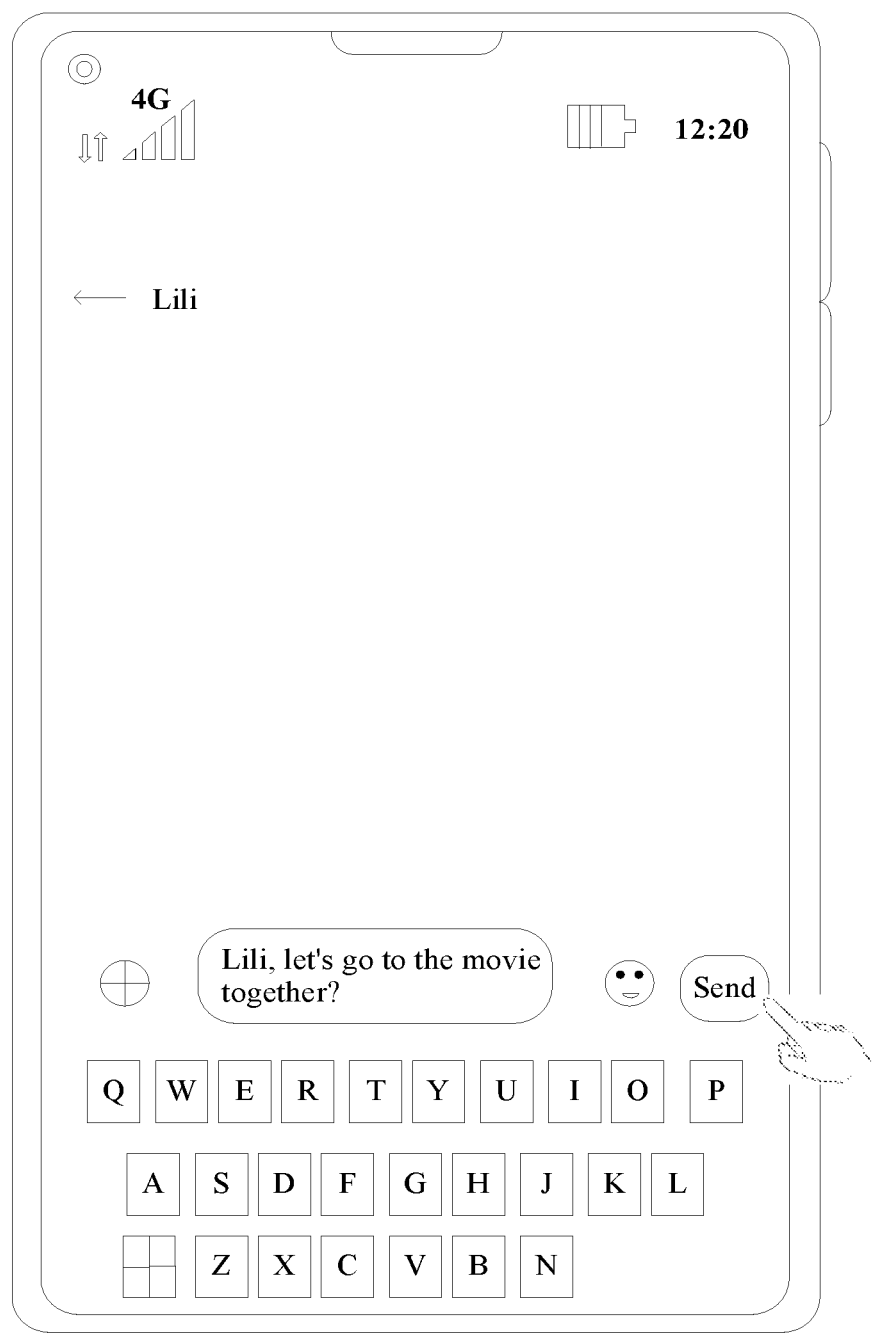
FIG. 5D is a schematic diagram of another interface of a terminal device applicable to scenario 2 according to an embodiment of this disclosure.

FIG. 5A is a schematic diagram of an interface displayed after the terminal device is unlocked. As shown in FIG. 5B, the interface of the terminal of the user may include a plurality of applications, and the figure shows only an application used for making a call and the MeeTime application. In actual application, there may be another application. This is not limited in this embodiment of this disclosure. In response to an operation of tapping the MeeTime application app by the user, the terminal device may open the MeeTime application app. A schematic diagram of an interface is shown in FIG. 5B. It can be seen from FIG. 5B that, recently contacted contacts are displayed on a tab of the MeeTime Application. The user may directly select a person that the user wants contact from the tab of the MeeTime Application, or may search for the person by tapping an "Address book" tab. For example, the user taps the "Address book" tab, and in response to the tapping operation, a schematic diagram of an interface of an "Address book" displayed by the terminal device is shown in FIG. 5C. In FIG. 5C, the user may select the "MeeTime application" tab, and all contacts displayed in the tab are users who have registered with the MeeTime application app. The user can communicate with the users displayed on the tab by using the MeeTime application app. In the "MeeTime application" tab, one contact may correspond to one or more icons. An icon 401 means that two users can make a video chat by using the MeeTime application. An icon 402 means that two users can chat with each other by using a chat interface of the MeeTime application, and content such as a text, audio, or a video may be sent on the chat interface. In response to an operation of tapping the icon 302 next to Lili, a schematic diagram of an interface displayed by the terminal device is shown in FIG. 5D. FIG. 5D shows a chat interface for chatting between the user and Lili. The user may send chat content to Lili on the interface. As shown in FIG. 5D, the user sends "Lili, let's go to the movie together?"

Figure 5E:
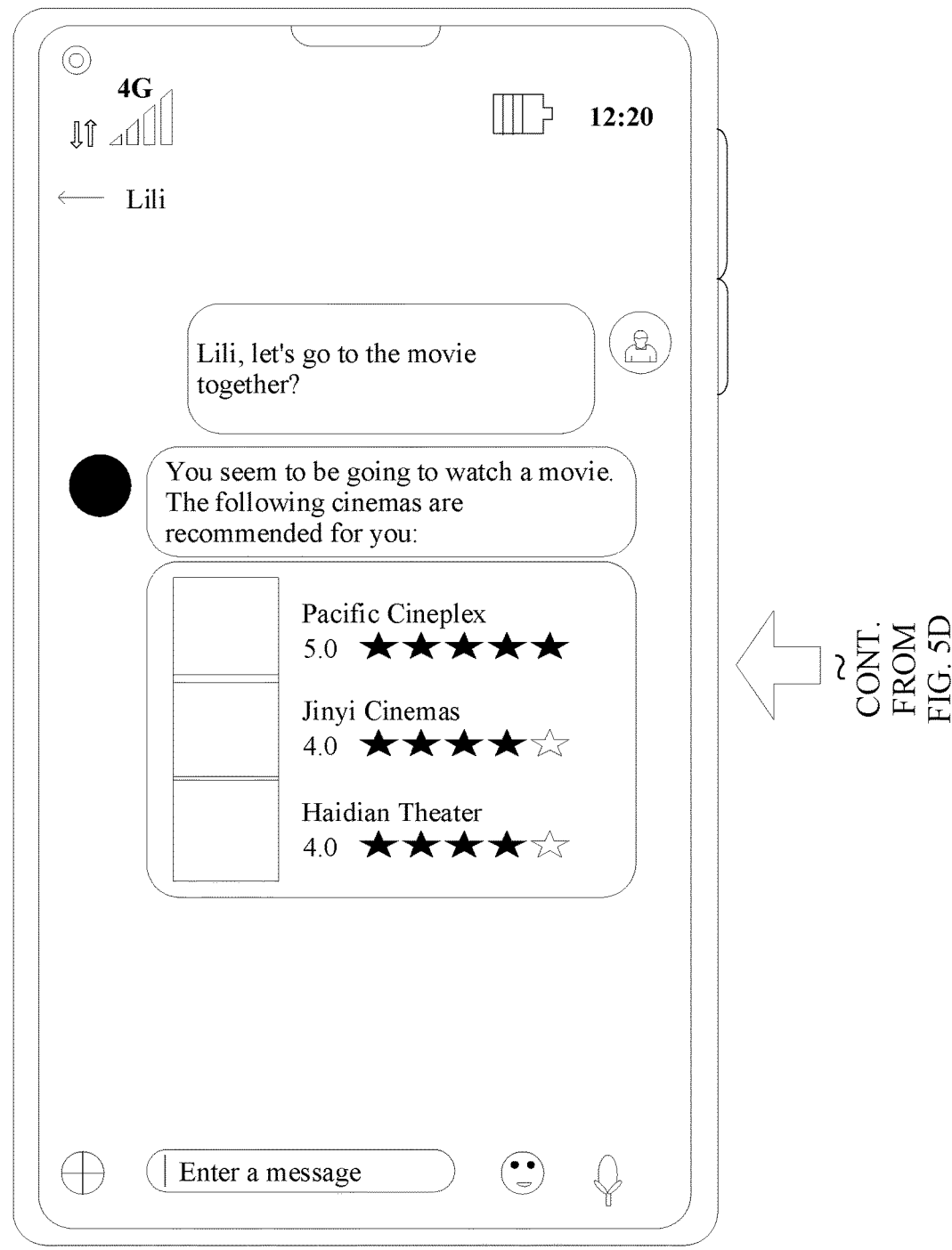
FIG. 5E is a schematic diagram of another interface of a terminal device applicable to scenario 2 according to an embodiment of this disclosure.
Figure 5F:
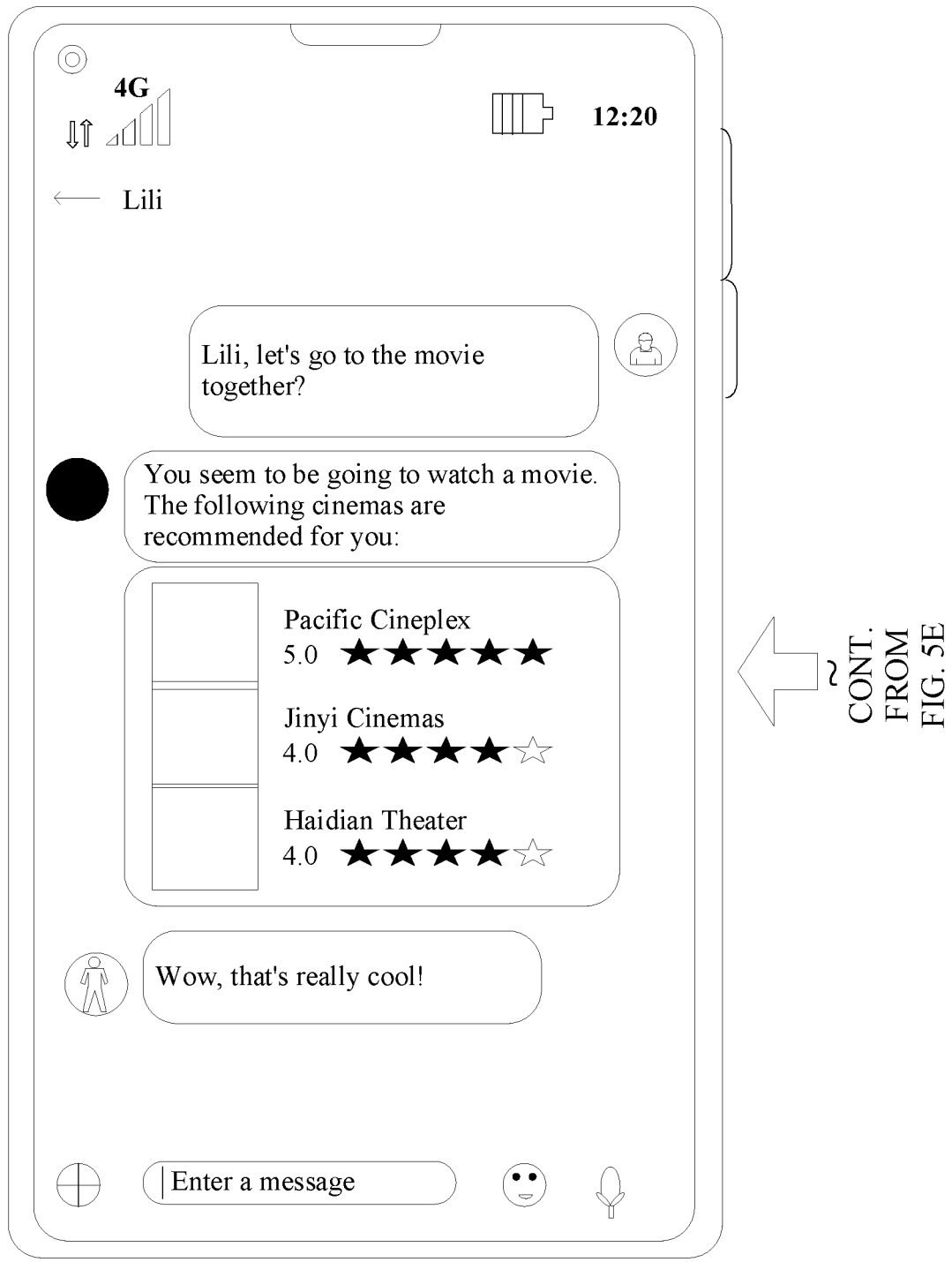
FIG. 5F is a schematic diagram of another interface of a terminal device applicable to scenario 2 according to an embodiment of this disclosure.

In a possible implementation, the user sends "Lili, let's go to the movie together?" on the chat interface for chatting with Lili. The obtaining module 2121 of the predicted intent recognition module 212 in FIG. 1C may obtain the chat record, and the decision module determines, based on the chat record, that a predicted intent is "querying a cinema", and a corresponding slot "place" is "a nearby area of a current location". Further, the obtaining module 2121 may obtain current location information of the user, and the decision module 2122 fills the slot "place" with the obtained current location information of the user. The data mining module 213 queries the content server to obtain a result, and returns the result to the terminal device 201. The result is transmitted to the application module 25 of the MeeTime application by using the AI interface module 252. In a possible implementation, after the rendering module 253 renders the result, the message processing module 251 sends the result to the chat interface for chatting between the user and Lili of the terminal device 201 as Celia, as shown in FIG. 5E. In addition, the message processing module 251 determines that chat members of the chat interface further include Lili, and may upload, to the application server 242 by using a network, a query result sent by Celia. When the MeeTime application is the MeeTime application app, the application server 242 may also be referred to as a server of the MeeTime application, and then the application server 242 sends the query result to a terminal device of Lili. A final display result is shown in FIG. 5E. After Celia sends the query result on the chat interface for chatting between the user and Lili, the user may view the query result on the terminal device of the user, and Lili may also view the query result on the terminal device of Lili. The second server mentioned in this embodiment of this disclosure may be an application server.

Further, Lili may also chat with the user on the chat interface. FIG. 5F is a schematic diagram of an interface of chat content "Wow, that's really cool!" sent by Lili.

In scenario 3, when two users need to query a nearby cinema during a conversation, the users can directly @Celia to query the surrounding cinema.

Figure 6A:
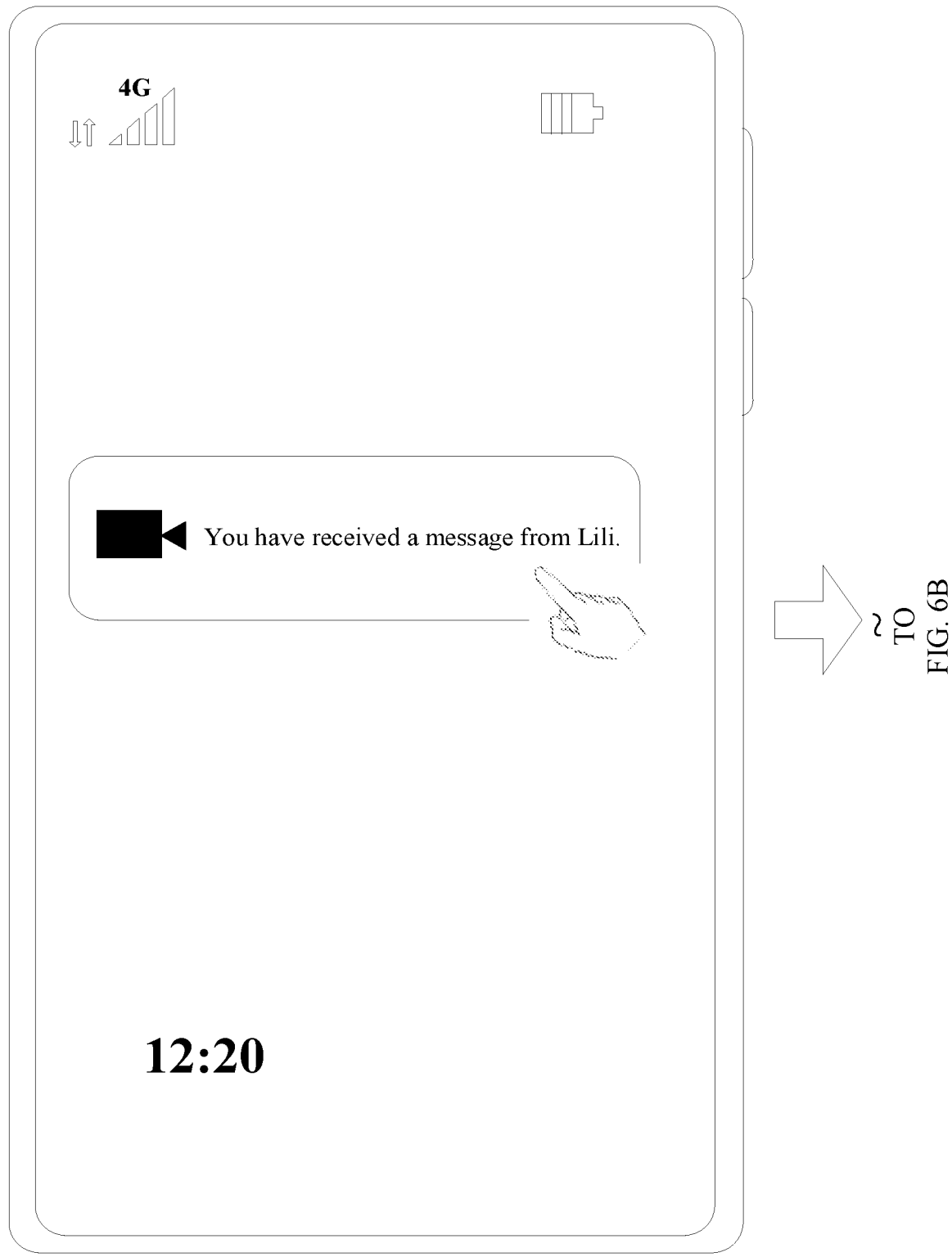
FIG. 6A is a schematic diagram of an interface of a terminal device applicable to scenario 3 according to an embodiment of this disclosure.
Figure 6B:
FIG. 6B is a schematic diagram of another interface of a terminal device applicable to scenario 3 according to an embodiment of this disclosure.

FIG. 6A is a schematic diagram of an interface on which a message from Lili is received when the terminal device of the user is in a lock screen mode. As shown in FIG. 6A, content "You have received a message from Lili" is displayed on a lock screen of the terminal device of the user. The user may directly tap the message, and in response to the tap operation of the user, the terminal device may open the MeeTime application, and display a schematic diagram of an interface for a chat between the user and Lili. The schematic diagram of the interface may be shown in FIG. 6B. A chat record "Zijiang, tomorrow is the weekend, let's go to the movie together?" sent by Lili may be viewed on the interface.

Figure 6C:
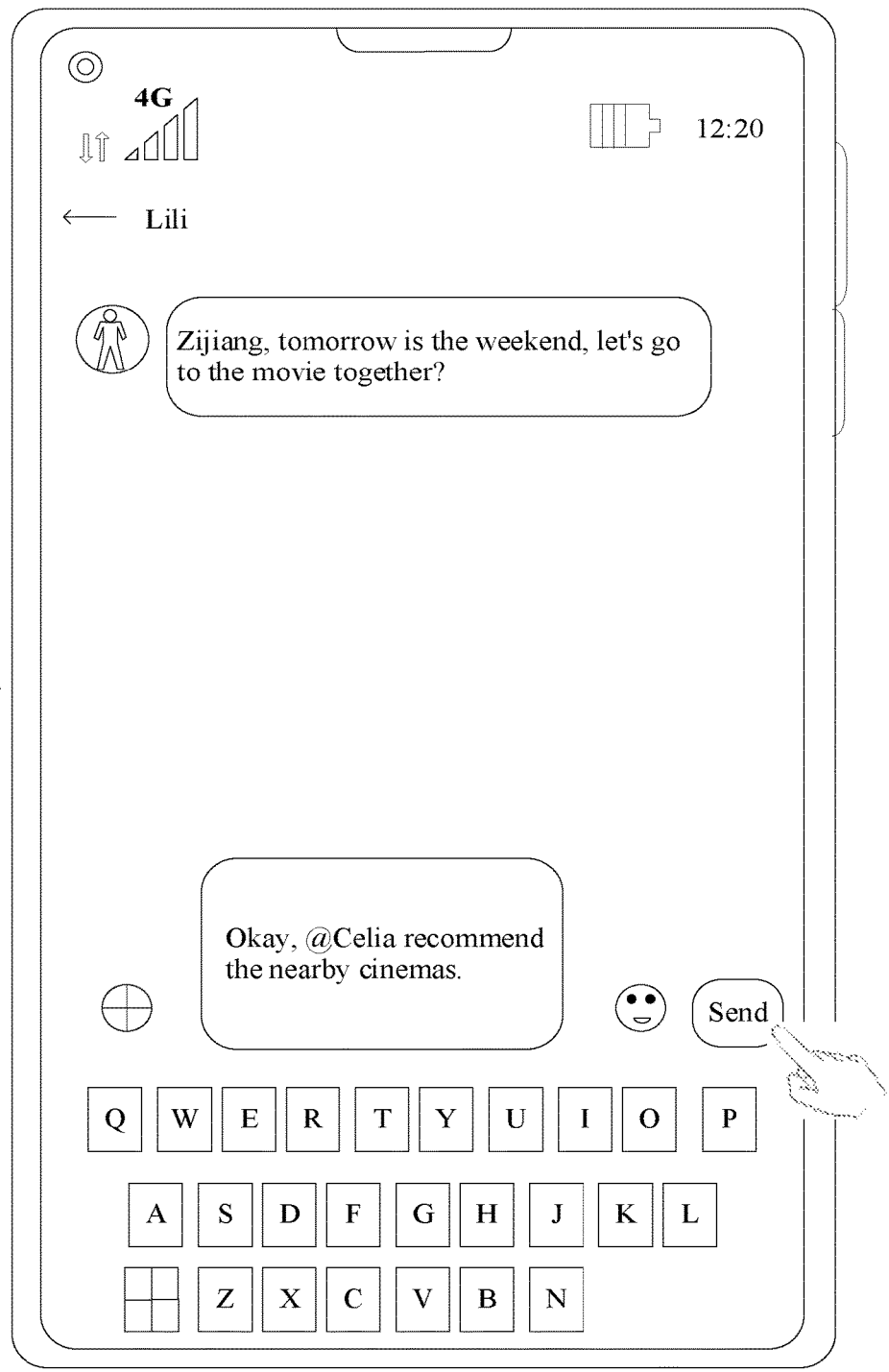
FIG. 6C is a schematic diagram of another interface of a terminal device applicable to scenario 3 according to an embodiment of this disclosure.
Figure 6D:
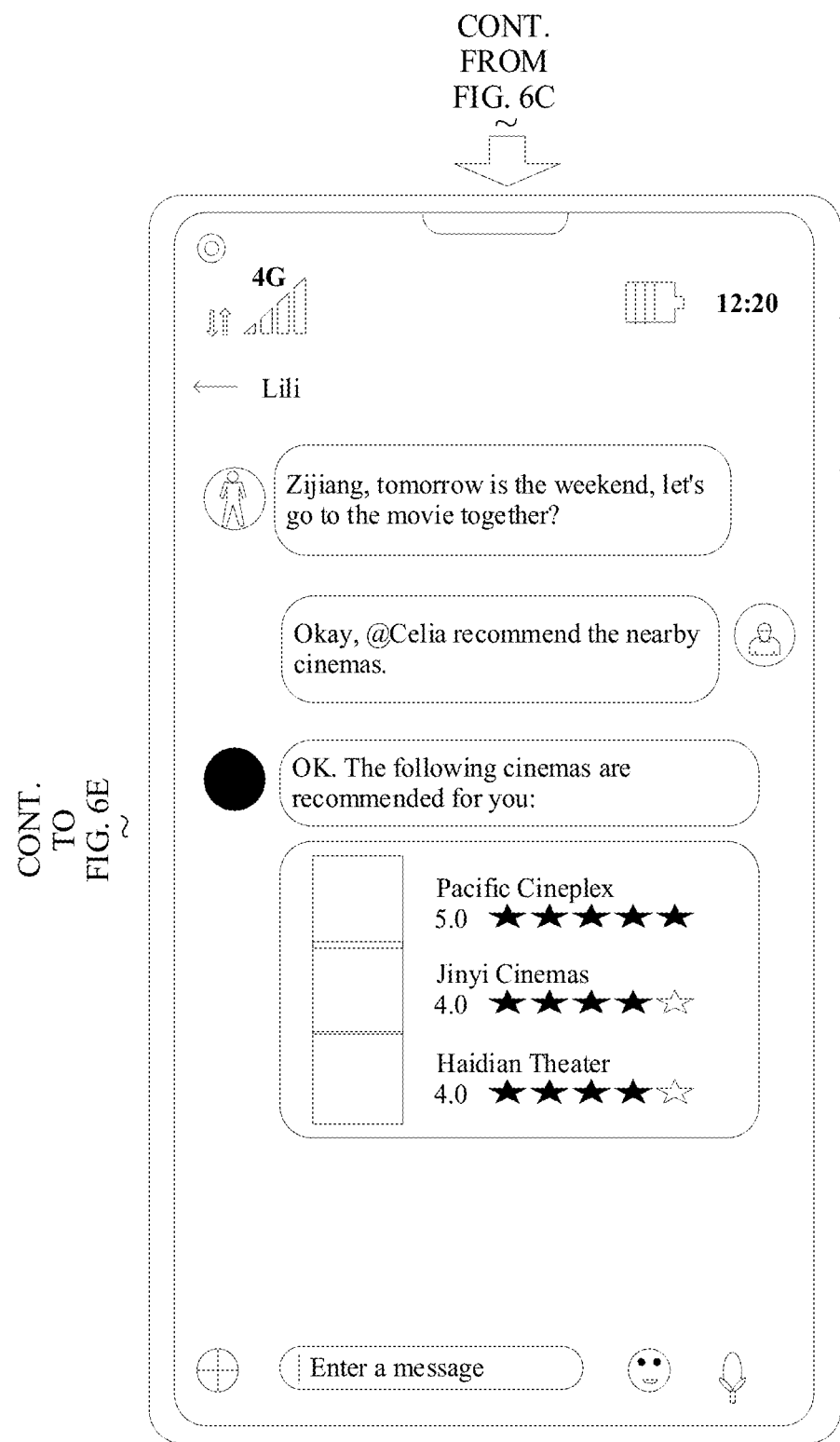
FIG. 6D is a schematic diagram of another interface of a terminal device applicable to scenario 3 according to an embodiment of this disclosure.

The user may actively send a command to Celia. As shown in FIG. 6C, the user may directly send a user command "OK, @Celia, recommend a nearby cinema" to Celia on the chat interface for chatting with Lili. FIG. 6C is a schematic diagram of an interface of editing a user command by the user. After the user taps a "send" button on the interface, the target intent recognition module 211 in the AI engine module may obtain the user command by using the distribution module 2111, and determine, by using the natural language understanding module 2112, that a target intent is "querying a cinema". In addition, slot matching is performed by using the data mining module 213. When it is determined that a location is a nearby area, location information of the user may be further obtained by using the data mining module 213, and location information of the user is determined as content of a slot "place". Further, the data mining module 213 may query the content server for the nearby cinema, and return an obtained result to the MeeTime application by using the AI interface module 252. After rendering the obtained result, the rendering module 253 displays the found nearby cinema as Celia, as shown in FIG. 6D.

In addition, the message processing module 251 determines that chat members of the chat interface further include Lili, and may upload, to the application server 242 by using a network, a query result sent by Celia. When the MeeTime application is the MeeTime application app, the application server 242 may also be referred to as a server of the MeeTime application, and then the application server 242 sends the query result to a terminal device of Lili. A final display result is shown in FIG. 6D. After Celia sends the query result on the chat interface for chatting between the user and Lili, the user may view the query result on the terminal device of the user, and Lili may also view the query result on the terminal device of Lili.

Figure 6E:
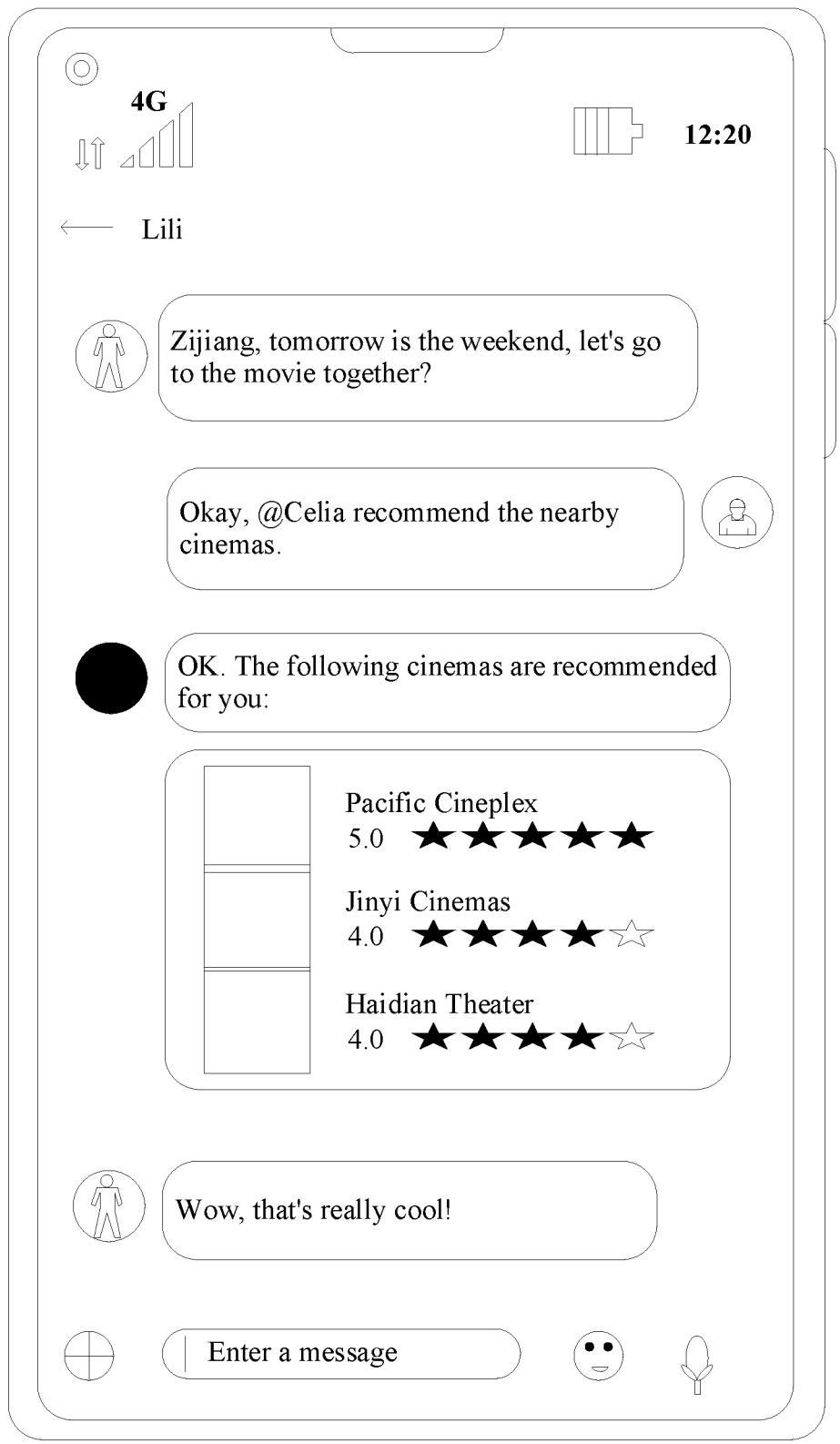
FIG. 6E is a schematic diagram of another interface of a terminal device applicable to scenario 3 according to an embodiment of this disclosure.

Further, Lili may also chat with the user on the chat interface. FIG. 6E is a schematic diagram of an interface of chat content "Wow, that's really cool!" sent by Lili.

Figure 7A:
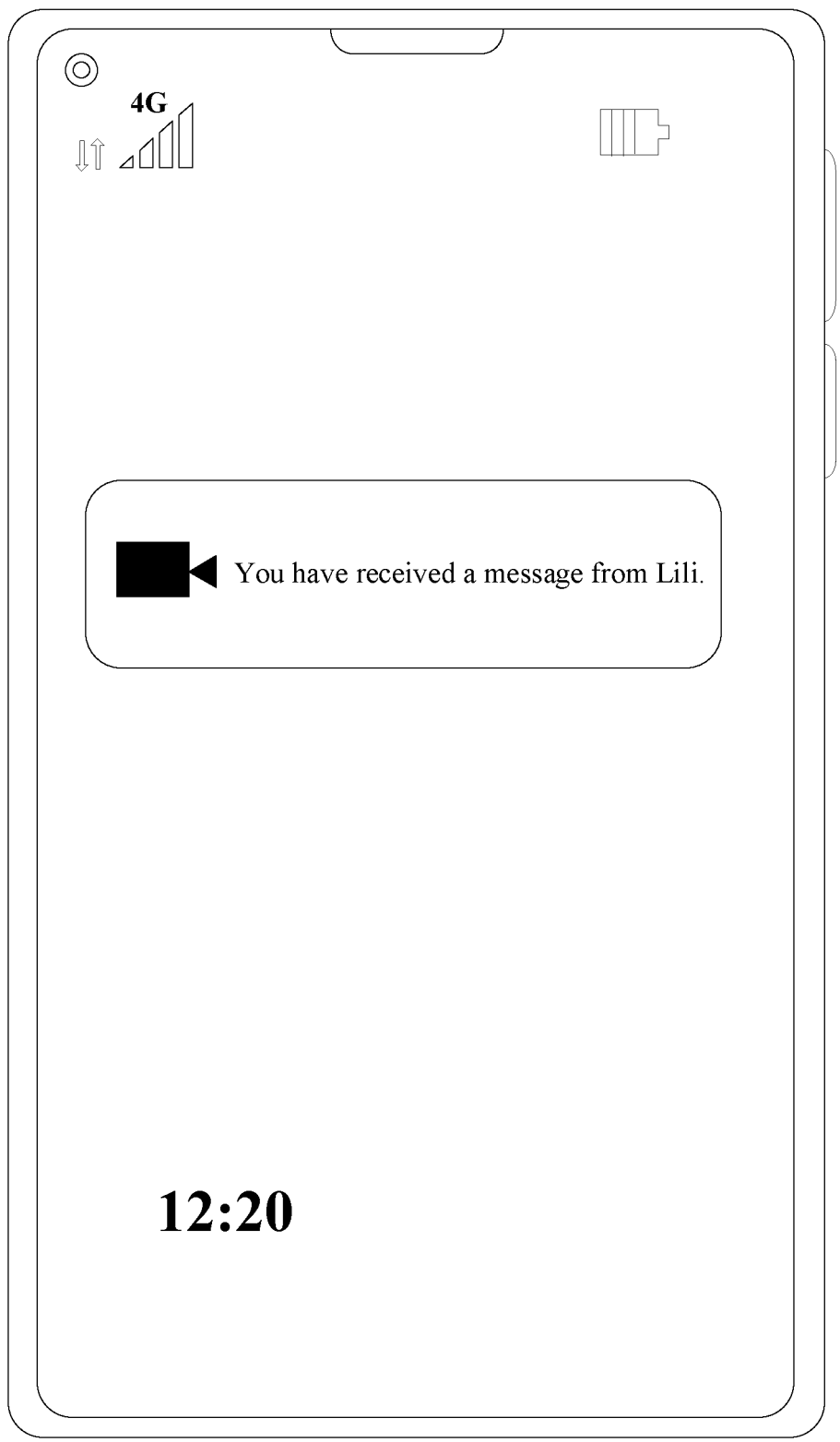
FIG. 7A is a schematic diagram of another interface of a terminal device applicable to scenario 3 according to an embodiment of this disclosure.
Figure 7B:
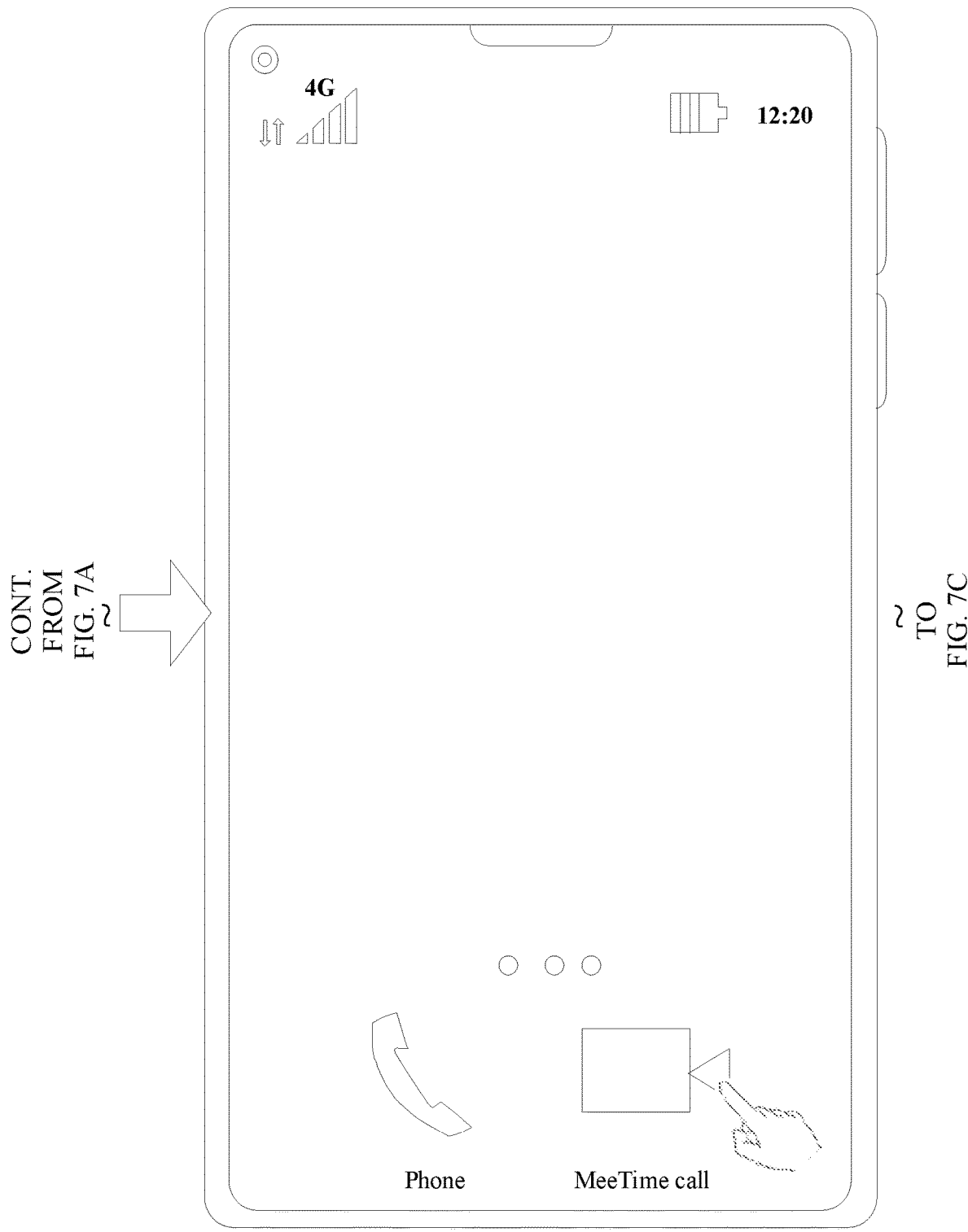
FIG. 7B is a schematic diagram of another interface of a terminal device applicable to scenario 3 according to an embodiment of this disclosure.
Figure 7C:
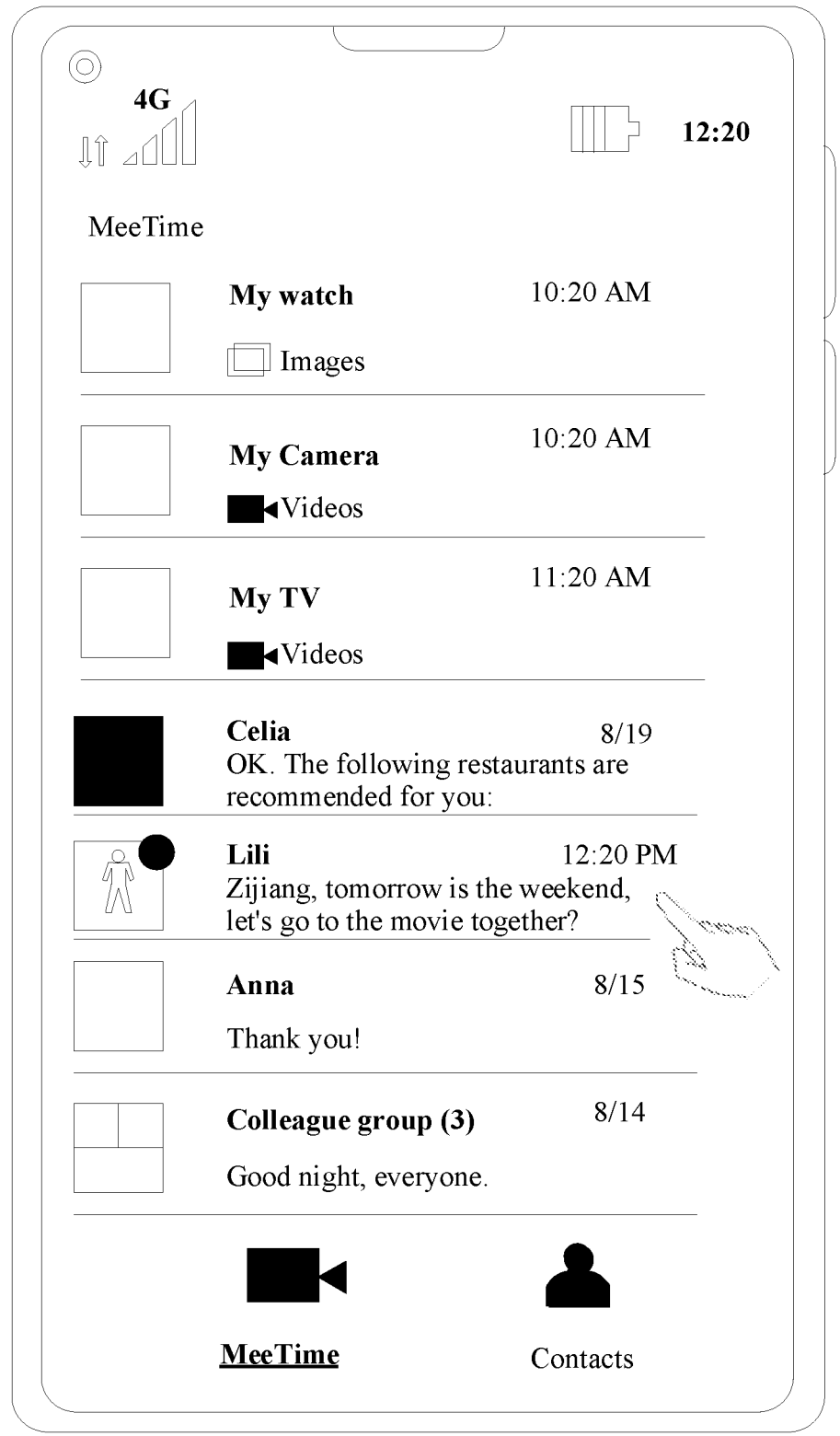
FIG. 7C is a schematic diagram of another interface of a terminal device applicable to scenario 3 according to an embodiment of this disclosure.

In scenario 3, in FIG. 6A, the user may directly tap the notification message on the lock screen, to directly open the chat interface for chatting between the user and Lili of the MeeTime application. An embodiment of this disclosure may further provide a method for opening the one-to-one chat interface for chatting between the user and Lili by the user. As shown in FIG. 7A, "You have received a message from Lili" is displayed on the lock screen, and the user may unlock the terminal device. An unlocking manner may be fingerprint unlocking, facial recognition unlocking, password unlocking, or the like, and the manner is not limited. FIG. 7B is a schematic diagram of an interface displayed after the terminal device is unlocked. As shown in FIG. 7B, the interface of the terminal of the user may include a plurality of applications, and the figure shows only an application used for making a call and the MeeTime application. In actual application, there may be another application. This is not limited in this embodiment of this disclosure. In response to an operation of tapping the MeeTime application app by the user, the terminal device may open the MeeTime application app. A schematic diagram of an interface is shown in FIG. 7C. It can be seen from FIG. 7C that, recently contacted contacts are displayed on a tab of the MeeTime Application, and the last contacted contact may be displayed on the top. As shown in FIG. 7C, when there is a new message, there may be some identifiers on a profile picture or a name of a contact, for example, there may be a small black dot or a small bubble. This is not limited in this embodiment of this disclosure. The identifier is merely used to prompt the user that there is a new unread message. The user may tap a "Lili" option on the interface shown in FIG. 7C, and in response to the operation, the terminal device opens the one-to-one chat interface for chatting between the user and Lili shown in FIG. 6B.

The terms "system" and "network" may be used interchangeably in embodiments of this disclosure. "At least one" means one or more, and "a plurality of" means two or more. In addition, "and/or" describes an association relationship between associated objects, and represents that three relationships may exist. For example, A and/or B may represent the following cases: Only A exists, both A and B exist, and only B exists, where A and B may be singular or plural. The character "/" usually indicates an "or" relationship between the associated objects. At least one of the following items (pieces) or a similar expression thereof refers to any combination of these items, including any combination of singular items (pieces) or plural items (pieces). For example, at least one item (piece) of a, b, or c may represent: a, b, c, a and b, a and c, b and c, or a, b, and c, where a, b, and c may be singular or plural.

In addition, unless otherwise specified, ordinal numbers such as "first" and "second" mentioned in embodiments of this disclosure are used to distinguish between a plurality of objects, but are not used to limit a sequence, a time sequence, priorities, or importance of the plurality of objects. For example, the first server and the second server are merely intended to distinguish between different servers, and do not indicate that the two servers have different priorities, different importance degrees, or the like.

It should be noted that, names of the foregoing messages are merely examples. With evolution of communication technologies, the name of any foregoing message may change. However, regardless of how the names of the messages change, provided that meanings of the messages are the same as those of the messages in this application, the messages fall within the protection scope of this disclosure.

The foregoing mainly describes the solutions provided in this disclosure from a perspective of interaction between the network elements. It may be understood that, to implement the foregoing functions, each network element includes a corresponding hardware structure and/or software module for implementing each function. A person skilled in the art should be easily aware that, in combination with units and algorithm steps of the examples described in embodiments disclosed in this specification, the present disclosure can be implemented by hardware or a combination of hardware and computer software. Whether a function is implemented by hardware or hardware driven by computer software depends on particular applications and design constraints of the technical solutions. A person skilled in the art may use different methods to implement the described functions for each particular application, but it should not be considered that the implementation goes beyond the scope of the present disclosure.

Figure 8:
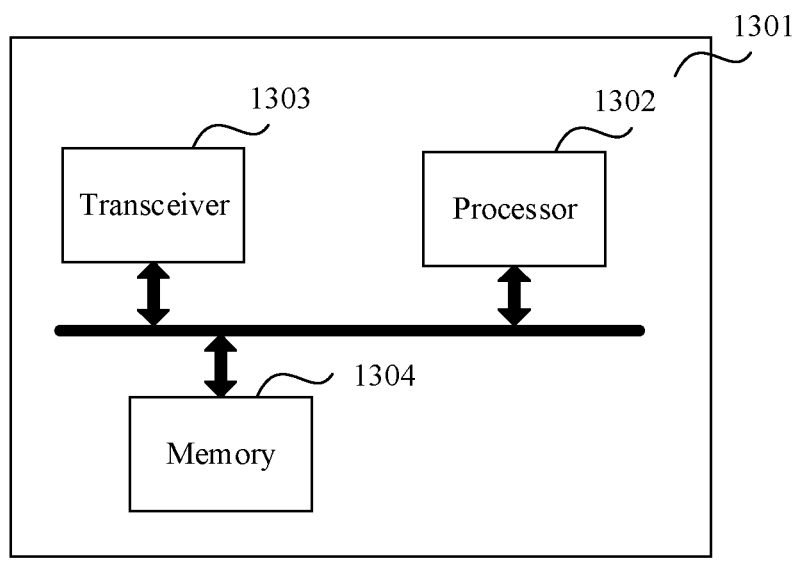
FIG. 8 is a schematic diagram of a structure of a communication apparatus according to an embodiment of this disclosure.

According to the foregoing methods, FIG. 8 is a schematic diagram of a communication apparatus according to an embodiment of this disclosure. As shown in FIG. 8, the communication apparatus may be a terminal device, or may be a chip or a circuit, for example, a chip or a circuit that may be disposed in a terminal device.

Further, the communication apparatus 1301 may further include a bus system. A processor 1302, a memory 1304, and a transceiver 1303 may be connected through the bus system. It should be understood that the processor 1302 may be the processor 110 in FIG. 1E.

It may be understood that the memory 1304 in this embodiment of this disclosure may be a volatile memory or a nonvolatile memory, or may include both the volatile memory and the nonvolatile memory. The nonvolatile memory may be a read-only memory (ROM), a programmable ROM (PROM), an erasable PROM (EPROM), an electrically erasable PROM (EEPROM), or a flash memory. The volatile memory may be a RAM, used as an external cache. By way of example, and not limitation, many forms of RAMs may be used, for example, a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), and a direct Rambus DRAM (DR RAM). It should be noted that the memory of the systems and methods described in this specification includes but is not limited to these and any memory of another proper type. The memory 1304 in this embodiment of this disclosure is the internal memory 121 in FIG. 1E.

When the communication apparatus 1301 corresponds to the terminal device in the foregoing method, the communication apparatus may include the processor 1302, the transceiver 1303, and the memory 1304. The memory 1304 is configured to store instructions. The processor 1302 is configured to execute the instructions stored in the memory 1304, to implement the related solutions of the terminal device in one or more of the corresponding methods shown in FIG. 1A to FIG. 7C.

In a possible implementation, the processor 1302 is configured to: obtain first information, where the first information includes location information of the terminal device; and display second information when the first information meets a preset first condition, where the second information includes to-be-pushed content associated with the first information or a link of the to-be-pushed content, and the first condition includes: A location corresponding to the location information of the terminal device is located in a first area, and a type of the first area is one of preset area types.

In a possible implementation, the second information is from a first server, or the second information is from information prestored in the terminal device.

In a possible implementation, the processor 1302 is specifically configured to display the second information on a chat interface of a MeeTime application.

In a possible implementation, the MeeTime application includes at least one chat group. The processor 1302 is specifically configured to determine a first chat group that meets a preset second condition, and display the second information on a chat interface of the first chat group.

In a possible implementation, the communication apparatus 1301 further includes the transceiver 1303, configured to send a second request to the second server, where the second request carries the second information, and the second request is used to request the second server to display the second information on terminal devices on which N second users log in.

In a possible implementation, the terminal devices on which the N second users log in include at least one of the following content: a smartphone, a smart screen, a smart speaker, a smart band, and a tablet computer.

For concepts, explanations, detailed descriptions, and other steps of the communication apparatus that are related to the technical solutions provided in embodiments of this disclosure, refer to the descriptions of the content in the foregoing methods or other embodiments. Details are not described herein again.

Figure 9:
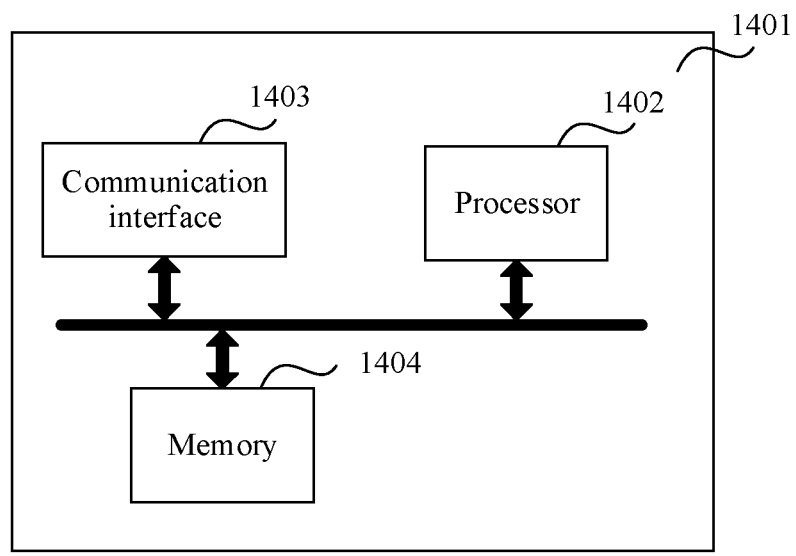
FIG. 9 is a schematic diagram of a structure of a communication apparatus according to an embodiment of this disclosure.

According to the foregoing methods, FIG. 9 is a schematic diagram of a structure of a communication apparatus according to an embodiment of this disclosure. As shown in FIG. 9, the communication apparatus 1401 may include a communication interface 1403, a processor 1402, and a memory 1404. The communication interface 1403 is configured to input and/or output information. The processor 1402 is configured to execute a computer program or instructions, to enable the communication apparatus 1401 to implement the method on the terminal device side in the related solutions in FIG. 1A to FIG. 7C, or to enable the communication apparatus 1401 to implement the method on the server side in the related solutions in FIG. 1A to FIG. 7C. In this embodiment of this disclosure, the communication interface 1403 may implement the solution implemented by the transceiver 1303 in FIG. 8, the processor 1402 may implement the solution implemented by the processor 1302 in FIG. 8, and the memory 1404 may implement the solution implemented by the memory 1304 in FIG. 8. Details are not described herein again.

Figure 10:
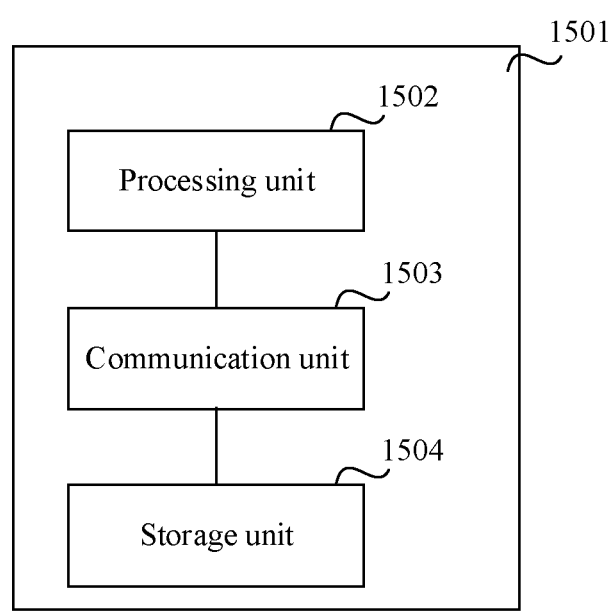
FIG. 10 is a schematic diagram of a structure of a communication apparatus according to an embodiment of this disclosure.

Based on the foregoing embodiments and a same concept, FIG. 10 is a schematic diagram of a communication apparatus according to an embodiment of this disclosure. As shown in FIG. 10, the communication apparatus 1501 may be a terminal device, or may be a chip or a circuit, for example, a chip or a circuit that may be disposed in a terminal device.

The communication apparatus may correspond to the terminal device in the foregoing methods. The communication apparatus may implement the steps performed by the terminal device in any one or more of the corresponding methods shown in the FIG. 1A to FIG. 7C. The communication apparatus may include a processing unit 1502, a communication unit 1503, and a storage unit 1504.

The processing unit 1502 may be a processor or a controller, for example, may be a general-purpose central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processor may implement or execute various example logical blocks, modules, and circuits described with reference to content disclosed in this disclosure. Alternatively, the processor may be a combination of processors implementing a computing function, for example, including a combination of one or more microprocessors, or a combination of a DSP and a microprocessor. The storage unit 1504 may be a memory. The communication unit 1503 is an interface circuit of the apparatus, and is configured to receive a signal from another apparatus. For example, when the apparatus is implemented in a form of a chip, the communication unit 1503 is an interface circuit used by the chip to receive a signal from another chip or apparatus, or is an interface circuit used by the chip to send a signal to another chip or apparatus.

The communication apparatus 1501 may be the terminal device in any one of the foregoing embodiments, or may be a chip. For example, when the communication apparatus 1501 is a terminal device, the processing unit 1502 may be, for example, a processor, and the communication unit 1503 may be, for example, a transceiver. Optionally, the transceiver may include a radio frequency circuit, and the storage unit may be, for example, a memory. For example, when the communication apparatus 1501 is a chip, the processing unit 1502 may be, for example, a processor, and the communication unit 1503 may be, for example, an input/output interface, a pin, or a circuit. The processing unit 1502 may execute computer-executable instructions stored in a storage unit. Optionally, the storage unit is a storage unit in the chip, such as a register or a cache. Alternatively, the storage unit may be a storage unit that is in the session management network element and that is located outside the chip, for example, a ROM or another type of static storage device that can store static information and instructions, or a RAM.

In a possible implementation, the processing unit 1502 is configured to: obtain first information, where the first information includes location information of the terminal device; and display second information when the first information meets a preset first condition, where the second information includes to-be-pushed content associated with the first information or a link of the to-be-pushed content, and the first condition includes: A location corresponding to the location information of the terminal device is located in a first area, and a type of the first area is one of preset area types.

For concepts, explanations, detailed descriptions, and other steps of the communication apparatus that are related to the technical solutions provided in embodiments of this disclosure, refer to the descriptions of the content in the foregoing methods or other embodiments. Details are not described herein again.

It may be understood that for functions of the units in the communication apparatus 1501, refer to implementation of a corresponding method embodiment. Details are not described herein again.

It should be understood that division into units of the communication apparatus is merely logical function division. During actual implementation, all or some of the units may be integrated into a physical entity, or may be physically separated. In this embodiment of this disclosure, the communication unit 1503 may be implemented by the transceiver 1303 in FIG. 8, and the processing unit 1502 may be implemented by the processor 1302 in FIG. 8.

According to the methods provided in embodiments of this disclosure, this disclosure further provides a computer program product. The computer program product includes computer program code or instructions. When the computer program code or the instructions is/are run on a computer, the computer is enabled to perform the method according to any one of the embodiments shown in FIG. 1A to FIG. 7C.

According to the method provided in embodiments of this disclosure, this disclosure further provides a computer-readable storage medium. The computer-readable medium stores program code. When the program code is run on a computer, the computer is enabled to perform the method in any one of embodiments shown in FIG. 1A to FIG. 7C.

According to the method provided in embodiments of this disclosure, this disclosure further provides a chip system. The chip system may include a processor. The processor is coupled to a memory, and may be configured to perform the methods in any one of embodiments shown in FIG. 1A to FIG. 7C. Optionally, the chip system further includes: a memory, where the memory is configured to store a computer program (which may also be referred to as code or an instruction); and a processor, configured to invoke the computer program from the memory and run the computer program, so that a device on which the chip system is installed performs the methods in any one of embodiments shown in FIG. 1A to FIG. 7C.

According to the methods provided in embodiments of this disclosure, this disclosure further provides a system. The system includes the foregoing one or more terminal devices and the foregoing one or more servers.

All or some of the foregoing embodiments may be implemented by using software, hardware, firmware, or any combination thereof. When software is used to implement embodiments, all or a part of embodiments may be implemented in a form of a computer program product. The computer program product includes one or more computer instructions. When the computer instructions are loaded and executed on a computer, the procedure or functions according to embodiments of this disclosure are all or partially generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

It should be noted that a part of this patent disclosure document includes copyright-protected content. The copyright owner reserves the copyright except copies are made for the patent documents or the recorded content of the patent documents in the Patent Office.

The server and the terminal device in the foregoing apparatus embodiments correspond to the server and the terminal device in the method embodiments. A corresponding module or unit performs a corresponding step. For example, a communication unit (a transceiver) performs a receiving step or a sending step in the method embodiments, and a step other than the sending step and the receiving step may be performed by a processing unit (a processor). For a function of a specific unit, refer to a corresponding method embodiment. There may be one or more processors.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and based on, for example, a signal having one or more data packets (for example, data from two components interacting with another component in a local system, a distributed system, and/or across a network such as the Internet interacting with other systems by using the signal).

A person of ordinary skill in the art may be aware that, in combination with illustrative logical blocks (illustrative logical block) described in embodiments disclosed in this specification and steps (step) may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this disclosure.

It may be clearly understood by a person skilled in the art that, for the purpose of convenient and brief descriptions, for a detailed working process of the foregoing system, apparatus, and unit, refer to a corresponding process in the foregoing method embodiments. Details are not described herein again.

In several embodiments provided in this disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this disclosure may be integrated into one processing unit, or each of the units may exist alone physically, or two or more units may be integrated into one unit.

When functions are implemented in the form of a software functional unit and sold or used as an independent product, the functions may be stored in a computer-readable storage medium. Based on such understanding, the technical solutions of this disclosure essentially, or the part contributing to the conventional technology, or some of the technical solutions may be implemented in a form of a software product. The computer software product is stored in a storage medium, and includes several instructions for instructing a computer device (which may be a personal computer, a server, a network device or the like) to perform all or some of the steps of the methods described in embodiments of this disclosure. The foregoing storage medium includes any medium that can store program code, such as a USB flash drive, a removable hard disk, a ROM, a RAM, a magnetic disk, or an optical disc.

The foregoing descriptions are merely specific implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A content pushing method implemented by a terminal device and comprising:
    obtaining first information, wherein the first information comprises location information of the terminal device; and
    displaying second information when the first information meets a preset first condition, wherein the second information is displayed on a chat interface of an application of a first chat group, the first chat group being a chat group of at least one chat group that meets a preset second condition,
    wherein the second information comprises to-be-pushed content associated with the first information or a link of the to-be-pushed content,
    wherein the first condition comprises that a location corresponding to the location information is in a first area and a type of the first area is one of a plurality of preset area types, and
    wherein the second condition comprises at least one of:
        members of the first chat group comprise a first user and N second users, wherein a distance between each second user of M second users of the N second users and the first user is less than or equal to a distance threshold, wherein N is a positive integer greater than 1, wherein M is a positive integer less than or equal to N, and wherein a ratio of M to N is greater than or equal to a preset value;
        subscription information corresponding to the first chat group comprises a type of the second information;
        a chat record of the first chat group is within a preset time period and relates to the first area; or
        a tag value of the first chat group matches the type of the second information.

2. The method of claim 1, further comprising obtaining the second information from a first server.

3. The method of claim 1, further comprising prestoring the second information on the terminal device.

4. The method of claim 1, wherein after displaying the second information on the chat interface of the first chat group, the method further comprises sending a second request to a second server, wherein the second request carries the second information, and wherein the second request requests the second server to display the second information on terminal devices on which the N second users are logged in.

5. The method of claim 4, wherein the terminal devices comprise at least one of a smartphone, a smart screen, a smart speaker, a smart band, or a tablet computer.

6. The method of claim 1, further comprising obtaining the second information after executing a predicted intent, wherein the predicted intent comprises an intent of a user that is predicted according to the location information of the terminal device.

7. The method of claim 1, wherein the first information further comprises a chat record on a chat interface of an application.

8. The method of claim 7, further comprising obtaining the second information after executing a predicted intent, wherein the predicted intent comprises an intent of a user that is predicted according to the location information and the chat record.

9. A terminal device, comprising:
    a memory configured to store instructions; and
    a processor coupled to the memory, wherein, when executed by the processor, the instructions cause the terminal device to:
        obtain first information, wherein the first information comprises location information of the terminal device; and
        display second information when the first information meets a preset first condition, wherein the second information is displayed on a chat interface of an application of a first chat group, the first chat group being a chat group of at least one chat group that meets a preset second condition,
    wherein the second information comprises to-be-pushed content associated with the first information or a link of the to-be-pushed content,
    wherein the first condition comprises that a location corresponding to the location information of the terminal device is in a first area, and a type of the first area is one of a plurality of preset area types, and
    wherein the second condition comprises at least one of:
        members of the first chat group comprise a first user and N second users, wherein a distance between each second user of M second users of the N second users and the first user is less than or equal to a distance threshold, wherein N is a positive integer, M is a positive integer less than or equal to N, and a ratio of M to N is equal to a preset value;
        subscription information corresponding to the first chat group comprises a type of the second information; or
        a chat record of the first chat group is within a preset time period relates to the first area.

10. The terminal device of claim 9, wherein the second information is from a first server or the second information is from information prestored on the terminal device.

11. The terminal device of claim 9, further comprising a transceiver configured to send a second request to a second server, wherein the second request carries the second information, and wherein the second request is to request the second server to display the second information on terminal devices on which the N second users log in.

12. The terminal device of claim 9, wherein the terminal devices comprise at least one of a smartphone, a smart screen, a smart speaker, a smart band, or a tablet computer.

13. A non-transitory computer-readable storage medium, wherein the non-transitory computer-readable storage medium stores computer-executable instructions that, when executed by a processor, cause a terminal device to:
  obtain first information, wherein the first information comprises location information of the terminal device; and
  display second information when the first information meets a preset first condition,
  wherein the second information is displayed on a chat interface of an application of a first chat group, the first chat group being a chat group of at least one chat group that meets a preset second condition,
  wherein the second information comprises to-be-pushed content associated with the first information or a link of the to-be-pushed content,
  wherein the first condition comprises that a location corresponding to the location information of the terminal device is in a first area, and a type of the first area is one of a plurality of preset area types, and
  wherein the second condition comprises at least one of:
  members of the first chat group comprise a first user and N second users, wherein a distance between each second user of M second users of the N second users and the first user is less than or equal to a distance threshold, wherein N is a positive integer, wherein M is a positive integer less than or equal to N, and wherein a ratio of M to N is equal to a preset value;
  subscription information corresponding to the first chat group comprises a type of the second information; or
  a chat record of the first chat group is within a preset time period relates to the first area.

14. The non-transitory computer-readable storage medium of claim 13, wherein the second information is from a first server or the second information is from information prestored on the terminal device or the computer-readable storage medium.

15. The non-transitory computer-readable storage medium of claim 13, wherein the terminal devices comprise at least one of a smartphone, a smart screen, a smart speaker, a smart band, or a tablet computer.

16. The non-transitory computer-readable storage medium of claim 13, wherein the second information is information obtained by performing a predicted intent, wherein the predicted intent comprises: an intent predicted according to location information of the terminal device, or an intent predicted according to a chat record of the first chat group.

17. The non-transitory computer-readable storage medium of claim 13, wherein the second information is displayed as information sent by a smart assistant, the smart assistant is not added as a member of the first chat group, the smart assistant is integrated into a system layer of the terminal device or the application, and the smart assistant does not need to be actively woken up by a user.

* * * * *

UNITED STATES PATENT AND TRADEMARK OFFICE
CERTIFICATE OF CORRECTION

PATENT NO. : 12,206,639 B2
APPLICATION NO. : 18/304941
DATED : January 21, 2025
INVENTOR(S) : Zhiwei Ma Page 1 of 1

It is certified that error appears in the above-identified patent and that said Letters Patent is hereby corrected as shown below:

In the Claims

Claim 1, Column 46, Line 4: "period and relates to" should read "period relates to"

Signed and Sealed this
Twenty-second Day of April, 2025

Coke Morgan Stewart
*Acting Director of the United States Patent and Trademark Office*